US006234348B1

(12) United States Patent
Okamura et al.

(10) Patent No.: US 6,234,348 B1
(45) Date of Patent: May 22, 2001

(54) EXTRUDING MECHANISM FOR FILM PACKS

(75) Inventors: Naomi Okamura; Kenji Matsuo; Hironobu Omura; Nobuyoshi Nishikawa; Akio Nimura, all of Tokyo (JP)

(73) Assignee: Cemedine Co., Ltd., Tokyo (JP)

( * ) Notice: Subject to any disclaimer, the term of this patent is extended or adjusted under 35 U.S.C. 154(b) by 0 days.

(21) Appl. No.: 09/341,671

(22) PCT Filed: Nov. 10, 1998

(86) PCT No.: PCT/JP98/05045

§ 371 Date: Jul. 19, 1999

§ 102(e) Date: Jul. 19, 1999

(87) PCT Pub. No.: WO99/26727

PCT Pub. Date: Jun. 3, 1999

(30) Foreign Application Priority Data

| | | |
|---|---|---|
| Nov. 25, 1997 | (JP) | 9-322826 |
| Feb. 4, 1998 | (JP) | 10-23258 |
| Jul. 21, 1998 | (JP) | 10-204921 |

(51) Int. Cl.[7] .......... G01F 11/00
(52) U.S. Cl. .......... 222/1; 222/327; 222/391
(58) Field of Search .......... 222/1, 105, 326, 222/327, 386, 391

(56) References Cited

U.S. PATENT DOCUMENTS

| | | | | |
|---|---|---|---|---|
| 4,356,938 | * | 11/1982 | Kayser | 222/391 |
| 5,332,122 | * | 7/1994 | Herold et al. | 222/326 |
| 5,492,249 | * | 2/1996 | Beach | 222/326 |
| 5,501,369 | * | 3/1996 | Brandhorst et al. | 222/326 |
| 5,536,531 | * | 7/1996 | Owen et al. | 222/326 |

FOREIGN PATENT DOCUMENTS

| | | |
|---|---|---|
| 2-265669 | 10/1990 | (JP) . |
| 4-271865 | 9/1992 | (JP) . |
| 6-77855 | 11/1994 | (JP) . |

* cited by examiner

*Primary Examiner*—Joseph A. Kaufman
(74) *Attorney, Agent, or Firm*—Arent Fox Kintner Plotkin & Kahn, PLLC

(57) ABSTRACT

An extruding mechanism for a tubular bag and a method of extruding the contents of a tubular bag are provided, by which a sealing material or the like is extruded and discharged from a tubular bag with an extruding gun for a cartridge container, and which reduces the amount of discarded waste, thereby serving as one solution to environmental problems. The extruding mechanism includes an extruding gun having a holding base, and a stationary holding plate disposed on a front end portion of the holding base. The holding plate is provided with a notched portion opened upward. An extruding rod is equipped at its leading end with a pressing plate. A cylindrical member having a cylinder body is set on the holding base and accommodates the tubular bag and is opened at both ends, and a piston body is inserted into the cylinder body. A head adapter includes a base plate and has an outer surface side located on an inner surface of the stationary holding plate, an inner surface side thereof with which the opening end portions of the cylinder body are brought into contact, and an opening portion. A nozzle body has a discharge hole at its leading end, the nozzle body being attached to the opening portion of the head adapter.

19 Claims, 54 Drawing Sheets

(a)

(b)

(c)

EXTRUDING MECHANISM FOR FILM PACKS

TECHNICAL FIELD

The present invention relates to an extruding mechanism for tubular bags, which is used for extruding contents, such as a sealing material agent or the like, from a tubular bag that packages with a film a largely tacky material, such as the sealing material, the adhesive agent or the like used mainly for construction or the like, and a method of extruding the contents from the tubular bags.

BACKGROUND ART

As shown in FIG. 52, a conventional extruding gun 10*a* used for extruding a sealing material or the like from a tubular bag includes an extruding rod 28 having a pressing plate 42 at its leading end, a main body portion 14 which moves forward the extruding rod 28 by the action of a hand-operated means such as a lever 22, (or an electric-powered means), a tubular cylinder 16*a* which is removably mounted on the front side of the main body 14, and a nozzle 98 which is removably mounted on the leading end of the cylinder 16*a* via a nozzle mounting cap 96 The extruding gun 10*a* is designed such that a tubular bag accommodated within the cylinder 16*a* is pressed by the pressing plate 42 being moved forward along with the pressing rod 28 so that the sealing material or the like filled in the tubular bag is extruded from the nozzle 98. This conventional type of the extruding gun is disclosed, for instance, in Japanese Patent Laid-Open Publication Nos. 4-279458, 5-301064, etc.

This conventional extruding gun 10*a* for the tubular bag is used in the following manner. First of all, the nozzle 98 is removed from the cylinder 16*a*. The tubular bag is inserted into the cylinder 16*a* through the leading end portion of the cylinder 16*a* in a state that the extruding rod 28 is pulled rearward of the main body portion. After the leading end of the tubular bag is opened with scissors or the like, the nozzle 98 is mounted on the cylinder 16*a*. The setting of the tubular bag to the extruding gun 10*a* is completed in this manner.

With the operation of the lever 22 of the main body portion 24, the extruding rod 28 is moved forward so that the pressing plate 42 mounted on the leading end of the extruding rod 28 presses the sealing material or the like together with the tubular bag, whereby the sealing material or the like filled in the tubular bag is extruded from the nozzle 98.

This extruding gun 10*a* requires the installation of the tubular cylinder 16*a*, and thus has a disadvantage of an increased cost in comparison with an extruding gun described later in which a holding base is installed. Further, in this extruding gun 10*a*, when the extruding rod 28 is moved forward to press the tubular bag with the pressing plate 42, the film of the tubular bag may be bitten and clogged into a space between the inner wall of the cylinder 16*a* and the outer circumferential surface of the pressing plate 42. This biting of the film leads disadvantageously to the heavy and sluggish movement of the extruding rod 28 (see Japanese Patent Laid-Open Publication Nos. 4-271864~5).

An extruding mechanism associated with the extruding rod 28 in the extruding gun 10*a* is the same as that in an extruding gun 10 described later, and thus a detailed explanation therefor is omitted here.

As means for containing the sealing material, the adhesive agent or the like, a hard cartridge container is used other than the above-noted soft tubular bag. As shown in FIG. 53, the cartridge container 100 is constructed by a cylindrical container main body 104 and an extruding nozzle 106 which are integrally formed together. A slidable piston 102 is disposed within the cylindrical container main body 104. This cartridge container 100 is designed such that forward movement of the extruding rod 28 of the extruding gun 10 leads forcibly to forward movement of the piston 102 so that contents C, such as a sealing material, are extruded or discharged from the extruding nozzle 106. The extruding gun 10, which is used for extruding the contents C, such as the sealing material, in this cartridge container 100, only requires the installation of a semi-cylindrical holding base 16 instead of the cylindrical cylinder 16*a* that is required as an essential element in the extruding gun 10*a* for the tubular bag, since the sealing material or the like has been already filled in the hard cartridge container 100 and thus need not to use the tubular cylinder 16*a*. Accordingly, the manufacture of the extruding gun 10 is effected more easily and has an advantage of reduction in cost in comparison with the manufacture of the extruding gun 10*a*.

However, as a matter of course, the extruding gun 10 for the cartridge container 100 can not be used as an extruding gun for a tubular bag. Hence, under the present state of the art, the extruding gun 10*a* for the tubular bag and the extruding gun 10 for the cartridge container are manufactured and used individually.

For example, in a case where an extruding gun for a cartridge container has already been purchased and possessed, an extruding gun for a tubular bag must be newly purchased if the sealing material or the like in the form of the tubular bag is used.

Further, in a case where both of the film container and the tubular bag are to be used in a job site using the sealing material or the like, one kind of the extruding gun is insufficient and both of the extruding guns for the cartridge container as well as for the tubular bag must be carried to the job site.

On the other hand, in a case of the cartridge container 100, if the piston 102 is moved from one end to the other end and thus all of the sealing material or the like filled therein is discharged and used up, the empty container is discarded as it is. In a case of the tubular bag, if all of the sealing material or the like filled therein is discharged, the tubular bag is in a squashed state, and then discarded in this state.

Upon comparing the tubular bag with the cartridge container, the manufacturing cost of the tubular bag is lower than that of the cartridge container, and with respect to waste disposal, the cartridge container is bulky, whereas the tubular bag is convenient from the viewpoints of transportation and processing since the tubular bag is compactly squashed. The environmental contamination due to discarded wastes is a current world-wide problem. The amount of the discarded wastes of the tubular bags is remarkably smaller than that of the cartridge container, and thus the tubular bag is preferable from this point.

As noted above, the tubular bag is inexpensive, and advantageous from the viewpoint of the disposal thereof in comparison with the cartridge container, but the problem resides in that the tubular bag requires a special type of the extruding gun for extruding the contents from the tubular bag.

In view of the above-noted problems, the present applicant already proposed an extruding mechanism for a tubular bag and a method of extruding contents in a tubular bag, which enable the effective use of the tubular bag with a usual extruding gun for a cartridge container instead of the special type of the extruding gun (Japanese Patent Lain-Open Publication No. 9-314012).

In the above proposal, there remains room for improvement with respect to a mechanism for picking up and discarding a squashed and used up tubular bag, a mechanism for removably mounting a cylinder body inside of which the tubular bag is accommodated onto a holding base of an extruding gun and so on. Upon continuously studying with respect to these mechanisms, the present inventors have newly proposed improved mechanisms.

On the other hand, as shown in FIG. 54, an extruding mechanism for a tubular bag is known, which includes (a) an extruding gun 10 having a holding base 16, a stationary holding plate 46 disposed on the front end portion of the holding base 16, and an extruding rod provided at its leading end with a pressing plate 42 and arranged movably back and forth on the holding base 16, (b) a cylindrical member 11 having a cylinder body 82 capable of being set on the holding base 16 and accommodating the tubular bag F therein and opened at its both ends, and a piston body 83 slidably inserted into the cylinder body 82, and (c) a nozzle body 106 having a discharge hole 106*a* at its leading end, a through discharge passage 108 formed therein for contents C, and the rear end capable of being removably brought into contact with the leading end opening portion of the cylinder body 82, and removably mounted on the stationary holding plate 46.

In this case, the cylindrical member 11 into which the piston body 83 is slidably inserted is first prepared at the rear end opening portion of the cylinder body 82. In a state where the rear end of the cylinder body 82 is placed on the holding base 16 of the extruding gun 10, a tubular bag F is inserted into the inside of the cylinder body 82 through the front end opening portion of the cylinder body 83, and the leading end portion of the tubular bag F is cut and opened with scissors or the like. In general, in this opening work, the leading end caulking portion K, which is caulked with the use of a caulking member such as an aluminum wire or the like, remains attached to the leading end from the viewpoints of avoiding generation of wastes.

The caulking portion K attached to the leading end of the tubular bag F is a cause for the disadvantage such as leakage of the contents from the cylindrical member 11, since the caulking portion K narrows or clogs the flow path of the through discharge passage 108 of the nozzle body 106 during the course of squashing the tubular bag as shown in FIG. 54.

The present applicant proposed, taking the above-noted problem into consideration, a novel extruding mechanism for a tubular bag, which can avoid the inconvenience, such as the liquid leakage of the contents by preventing narrowing or clogging of the flow path of the through discharge passage by the caulking portion of the tubular bag (Japanese Patent Applicaiton No. 9-322826).

In the conventional extruding mechanism for the tubular bag, when the cylindrical member is set on the holding base of the extruding gun, the cylindrical member is necessarily set on the holding base in a state where the cylindrical member is brought into contact with the inner surface of a head adapter fixed to the stationary holding plate. In order to facilitate the insertion and attachment of the cylindrical member, a contact member such as an annular flange is generally provided on the inner surface of the head adapter. The presence of this type of the annular flange or the like requires the cylindrical member to be inserted into and attached to the contact member such as the annular flange in a state where it is held in parallel with the holding base as much as possible, and from a state in which it is spaced from the contact member such as the annular flange. Therefore, the operation of inserting the cylindrical member into the contact member such as the annular flange while setting the cylindrical member in the horizontal state as much as possible is troublesome. Further, the length of the holding member of the extruding gun must be set to be considerably longer than the length of the cylindrical member and thus the cost of the material is inevitably increased, and the extruding gun is inconvenient in handling.

Taking the above-noted problems into consideration, the present applicant proposed a novel extruding mechanism for a tubular bag, wherein the inner surface of the head adapter is turned obliquely upward, so that the cylindrical member can be very easily inserted and attached to the inner surface of the head adapter and set onto the holding base, the cost of the material can be saved because the length of the holding base can be set close to the length of the cylindrical member, and the handling of the extruding gun is facilitated because the entire length of the extruding gun can be made smaller (Japanese Patent Application No. 10-232588).

The present applicant has continuously made various investigations and researches on the above-noted and already proposed patent applications to further improve the performance, and provided a further proposal (Japanese Patent Application No. 10-204921). The present applicant now combines these three patent applications together and adds a novel improvement thereto to provide a new proposal as the present patent application.

A first object of the present invention is to provide an extruding mechanism for a tubular bag and a method of extruding contents of a tubular bag, wherein a sealing material or the like is extruded and discharged from a tubular bag with the use of an extruding gun for a cartridge container so that it becomes unnecessary to additionally purchase an extruding gun for the tubular bag if the extruding gun for the cartridge container is possessed, it becomes possible to continuously use a cylindrical member made up of a cylinder body and a piston body so that it is sufficient to discard only the used up tubular bag in the same manner as the extruding gun for the tubular bag, even after the contents of the tubular bag are extruded, only a nozzle body becomes stained and the inner surface of a head adapter is prevented from becoming stained, with the result that only the stained nozzle body is discarded after the extruding operations are carried out for predetermined times and the head adapter without any stain can be repeatedly used for many times to reduce the waste material amount that is a factor of generating the poisonous gas such as dioxin when incinerating the waste material, to thereby serve as one of the solutions for the environmental problems.

A second object of the present invention is to provide an extruding mechanism for a tubular bag and a method of extruding contents of a tubular bag, wherein an inner surface of a head adapter can be turned obliquely upward to make it remarkably easy to insert and attach a cylindrical member to the inner surface of the head adapter and set the cylindrical member on a holding base as well as to make it possible to set the length of the holding base close to the length of the cylindrical member to save the material cost and manufacture the extruding gun with the entire length shortened to facilitate the handling thereof, and by which the biting of the film of the tubular bag is effectively prevented to make it possible to efficiently use the tubular bag, and the narrowing and the clogging of the flow path of a through discharge passage by a caulking portion of the tubular bag is prevented to avoid the liquid leakage of the contents as well as the squashed and used up tubular bag can be easily picked up and discarded.

DISCLOSURE OF THE INVENTION

In order to solve the problems, an extruding mechanism for a tubular bag according to the present invention is an extruding mechanism adapted to discharge contents filled in a tubular bag, the extruding mechanism for the tubular bag comprising:

(a) an extruding gun having a holding base, a stationary holding plate disposed on a front end portion of the holding base and provided at its central portion with a notched portion opened upward, and an extruding rod equipped at its leading end with a pressing plate and arranged movably back and forth on the holding base;

(b) a cylindrical member having a cylinder body capable of being set on the holding base and accommodating the tubular bag therein and opened at its both ends, and a piston body slidably inserted into the cylinder body, both end surfaces thereof serving as pressing surfaces;

(c) a head adapter including a base plate having an outer surface side thereof being located on an inner surface side of the stationary holding plate, an inner surface side thereof with which the opening end portions of the cylinder body can be brought into contact, and an opening portion at its central portion;

(d) a nozzle body having a discharge hole at its leading end, and a through discharge passage formed therein for contents, the nozzle body being attached to the opening portion of the head adapter so as to communicate the through discharge passage with the cylinder body.

The head adapter is preferably attached to both end edge portions of the notched portion of the stationary holding plate through a suitable engagement means. Of course, it is also applicable that the base plate of the head adapter may be simply positioned on the inner surface side of the stationary holding plate without such an engagement means, as far as the function of receiving the cylinder body of the cylindrical member is not sacrificed.

If the nozzle body is removably attached to the head adapter, these can be dealt with individually, and hence the handling of them is advantageously facilitated.

If the head adapter is rotatable up and down attached to both end edge portions of the notched portion of the stationary holding plate, and an inner surface of the base plate can be turned obliquely upward, there is provided an advantage in that the insertion and attachment of the cylindrical member to the inner surface of the head adapter as well as the setting of the cylindrical member on the holding base can be remarkably facilitated.

If the proximal outer surface portion of the nozzle body corresponds in configuration to an inner surface of the head adapter, and the nozzle body is attached to the head adapter such that the nozzle body is inserted into the opening portion of the head adapter from an inner side of the head adapter to fit the inner surface side of the head adapter with the proximal outer surface portion of the nozzle body, the discharge of contents leads to the fact that the inner surface of the nozzle body fittingly attached to the inner surface side of the head adapter is stained with the contents but the inner surface side of the head adapter is not stained at all with the contents since the inner surface side of the head adapter is completely covered by the nozzle body.

Therefore, the nozzle body is discarded after an appropriate number of discharging operations are carried out, but as the head adapter is not stained at all, it is enough to discard only the nozzle body. The same head adapter can be repeatedly used, so it is possible to reduce the waste material amount to thereby serve as one of the solutions for the environmental problems.

If the head adapter is designed to include a stepped portion formed on the outer surface side of the base plate such that the stepped portion is outward protruded to be insertable into the notched portion of the stationary holding member from the central portion of the base plate, and a stepped portion space formed inside the stepped portion integrally with the opening portion, an outer opening portion being formed at the leading end portion of the stepped portion, there is provided a sufficient space in which a metal caulking portion left on the leading end portion as a result of opening the tubular bag can be accommodated, and hence the through hole and the through discharge passage are not clogged with the left metal caulking portion.

It is preferable that the head adapter further has a nozzle body mounting portion formed protrusively on the outer surface side of the base plate, and provided with a through hole apertured therein and communicated with the opening portion, the nozzle body being attached to the head adapter through the nozzle body mounting portion.

If the head adapter includes a stepped portion formed on the outer surface side of the base plate such that the stepped portion is outward protruded to be insertable into the notched portion of the stationary holding member from the central portion of the base plate, and a stepped portion space formed inside the stepped portion integrally with the opening portion, the nozzle body mounting portion being protrusively provided on the leading end portion of the stepped portion, communicating the stepped portion space with the through hole, and the stepped portion space being made larger than the through hole, a sufficient space is provided in which a metal caulking portion left on the leading end portion as a result of opening the tubular bag can be accommodated, and hence the through hole and the through discharge passage are not clogged with the left metal caulking portion.

Such an arrangement may be adopted that the head adapter has an engagement member rotatably provided on the upper end portion of the base plate through a hinge means and engageable with both end edge portions of the notched portion of the stationary holding plate, and the inner surface of the base plate can be rotatably turned obliquely upward when the head adapter is attached to the stationary holding plate in a manner that the engagement member is engaged with both the end edge portions of the notched portion of the stationary holding plate.

It is preferable that the head adapter has a bent spring piece attached to the upper end portion of the base plate and bent outward, and an engagement member provided on the leading end portion of the bent spring piece and engageable with both end edge portions of the notched portion of the stationary holding plate, and the inner surface of the base plate is constantly urged to be turned obliquely upward by a spring action of the bent spring piece when the head adapter is attached to the stationary holding plate in a manner that the engagement member is engaged with both the end edge portions of the notched portion of the stationary holding plate.

If the head adapter has an annular flange portion formed on the inner surface side of the base plate and insertable into and attachable to the opening end portion of the cylinder body, the insertion and attachment operation of the cylinder body to the opening portion is facilitated.

If a wall surface connecting the annular flange portion to the stepped portion space is formed as a slope surface, and a dome-like receiving slope surface for facilitating to receive the leading end portion of the tubular bag is formed, the leading end portion of the tubular bag is smoothly received by the receiving slope surface, and thus the extruding operations of the tubular bag become smoother.

If a large number of protruding ribs are formed longitudinally on the inner circumferential surface of the cylinder body, and a large number of recessed grooves are formed in a sliding direction on the outer circumferential surface of the piston body corresponding to the protruding ribs, the biting of the tubular bag into a space between the inner circumferential surface of the cylinder body and the outer circumferential surface of the piston body is more effectively avoided.

If the protrusion-like stoppers are protrusively provided in the vicinities of both the end portions of the inner circumferential surface of the cylinder body, there is provided an advantage in that the piston body cannot be removed easily from the cylinder body when the piston body is inserted into and slidably attached to the inner circumferential surface of the cylinder body.

If both the end portions of the inner circumferential surface of the cylinder body are made smooth, there is provided an advantage in that the insertion and attachment operation is facilitated when the piston body is inserted into and attached to the inner circumferential surface of the cylinder body.

If the piston body includes a circular plate having a hole apertured at its central portion and an annular rim provided on the outer circumferential surface of the circular plate, when the proximal end portion of the tubular bag is pressed by the piston body the caulking portion of the base end portion of the tubular bag is located within the hole so as not to hinder the pressing motion of the piston body.

The nozzle body may be formed separately from the head adapter and then removably attached thereto or may be attached integrally to the head adapter.

An extruding method for a tubular bag according to the present invention is a method of extruding contents from the tubular bag with the extruding mechanism for the tubular bag described above, wherein the piston body is positioned at the rear end opening portion of the cylinder body of the cylindrical member whereas the tubular bag, the leading end portion of which is opened, is accommodated within the cylinder body through the front end opening portion, the extruding gun in which the head adapter is positioned on the inner surface side of the stationary holding plate is prepared, the cylindrical member is then set on the holding base of the extruding gun such that the leading end of the cylindrical member accommodating therein the tubular bag is brought into contact with the inner surface of the base plate, the piston is moved forward by moving the extruding rod forward to discharge the contents of the tubular bag from the nozzle body, the piston body reaches the front end opening portion of the cylinder body so as to. squash the tubular bag and discharge all the contents of the tubular bag, after the used up tubular bag pressed against the head adapter is discarded, the empty cylindrical member is reversed to replace its front end portion with its rear end portion with the result that a beginning state of use is set in a manner that the piston body is located at the rear end opening portion of the cylinder body, a new tubular bag, the leading end of which is opened, is accommodated within the cylinder body through the front end opening portion, and the cylindrical member is set again on the extruding gun, and the extruding procedures recited above are repeated to extrude the contents of the new tubular bag, whereby contents of a plurality of tubular bags are consecutively extruded by the same cylindrical member.

In a case where the nozzle body designed to be removably attached to the opening portion of the head adapter is used, after the extruding procedures described above are repeated with the same cylindrical member, the nozzle body is stained by the contents but the head adapter is not stained, only the stained nozzle body after being used is discarded and a new nozzle body is again attached to the head adapter which is clean, and then the extruding procedures described above can be repeated. In this case, it is unnecessary to discard the cylindrical member and further there is no need to discard the head adapter, so it is possible to remarkably reduce the waste material amount that is a factor of generating the poisonous gas such as dioxin when incinerating the waste material.

As a tubular bag used for the extruding mechanism for the tubular bag as described above, it is preferably to use one in which the tubular film body is filled with contents and then both the ends of the tubular film body are caulked by caulking members to hermetically fill the contents therein.

BEST MODE FOR CARRYING OUT THE INVENTION

Figure 53:
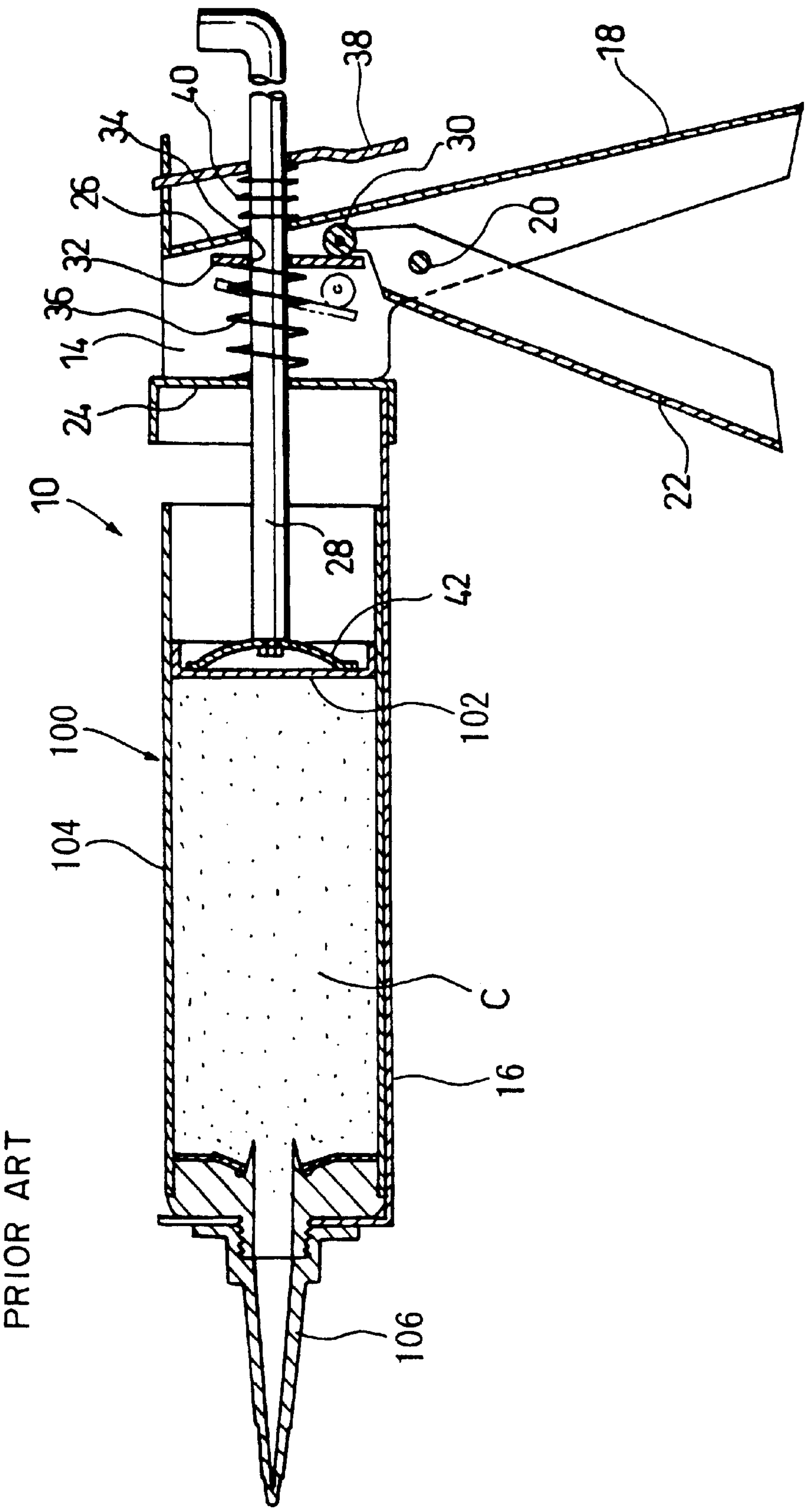
FIG. 53 PRIOR ART
FIG. 53 is a sectional explanatory view showing a state where contents are extruded with a conventional extruding gun for a cartridge container.
Figure 54:
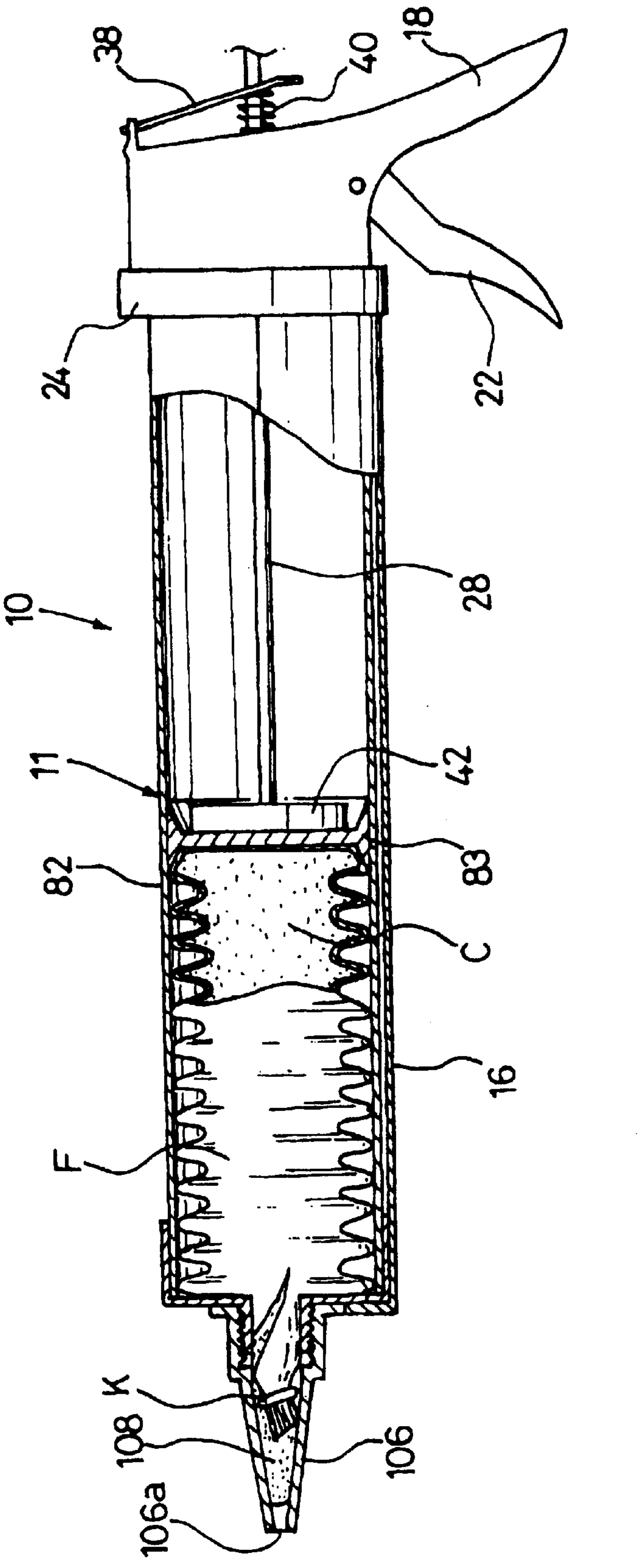
FIG. 54 PRIOR ART
FIG. 54 is a sectional explanatory view showing a state in which contents are extruded from the tubular bag with a conventional extruding gun for a cartridge container.

An embodiment of the present invention will be described hereinafter with reference to FIGS. 1 to 30 of the accompanying drawings. In FIGS. 1 to 30, components identical with or similar to those shown in FIGS. 53 to 54 may be denoted by the same reference numerals. In the above description in connection with FIG. 53, there are some components just illustrated and the explanations of their reference numerals omitted. Since the used reference numerals, functions and so on of the extruding gun 10 in FIG. 53 are similar to following explanations, they can be applied to the components and their functions in FIG. 53.

Figure 1:
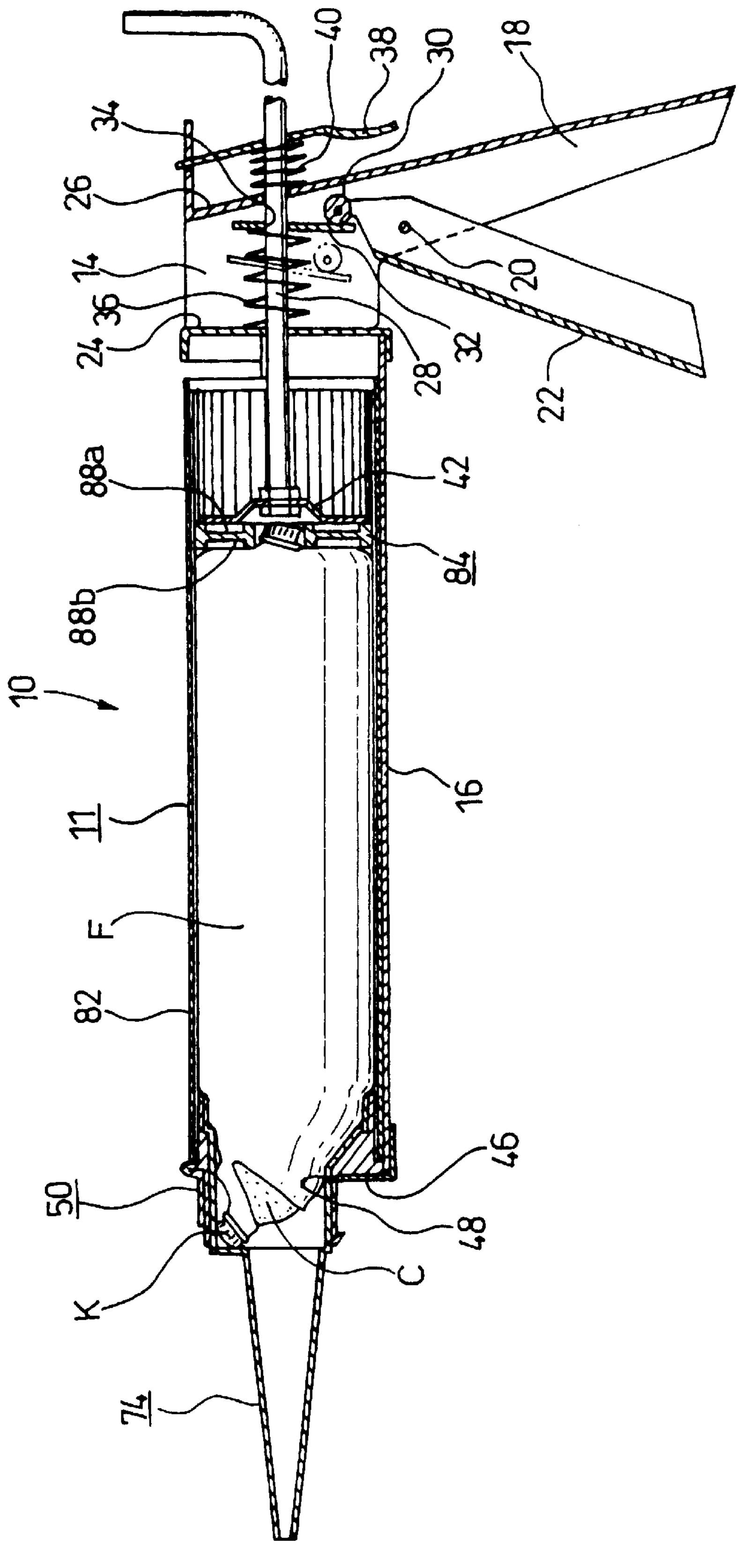
FIG. 1 is a sectional explanatory view showing a state in which a cylindrical member having a tubular bag built-in is placed on an extruding gun in a first embodiment of an extruding mechanism for a tubular bag of the present invention.

FIG. 1 shows a sectional view showing a state in which a cylindrical member 11 having a tubular bag F built-in is placed on a known extruding gun 10 for a cartridge container which is similar to the aforementioned one. This extruding gun 10 comprises a main body portion 14 for extruding contents C, such as a sealing material or the like, of the tubular bag F, and a semi-cylindrical holding base 16 provided continuously with the main body portion 14, elongated forward from the main body portion 14, and holding the cylindrical member 11. The tubular bag F is formed by filling a tubular film body with the contents C and caulking both ends of the tubular film body with caulking members K so as to hermetically contain the contents C therein.

In the lower portion of the main body portion 14, there is provided a grip portion 18 provided integrally with the main body portion 14 to extend downward therefrom, and a lever 22 that is pivotably coupled to the grip portion 18 with a pin 20. By pulling this lever 22, an extruding rod 28, which are suspended between a front plate 24 and a rear plate 26, is moved forward from the upper and rear side of the main body portion 14 to above the holding base 16.

The extruding rod 28 penetrates through an extruding plate 32 contacted with a pin 30 attached to the upper portion of the lever 22. This extruding plate 32 is pushed obliquely as shown by chain-lines through the pin 30 by pulling the lever 22, so that for every one stroke of the lever 22 the extruding rod 28 is moved forward through the friction between a through hole 34 and the extruding rod 28 against a compression spring 36 fitted on the extruding rod 28 between the front plate 24 and the rear plate 26.

Reference numeral 38 designates a braking plate provided behind the main body portion 14, which brakes the extruding rod 28 thus moved forward at the moved position, and which releases the braking to the extruding rod 28 when the braking plate 38 is pressed forward against the compression spring 40 at the time of pulling back the extruding rod 28 rearward.

Reference numeral 42 designates a piston pressing plate provided on the leading end of the extruding rod 28, which presses a piston body 84 of the cylindrical member 11 to extrude the contents C, such as the sealing material, or the adhesive agent or the like, filled in the tubular bag F accommodated within the cylindrical member 11.

Reference numeral 46 designates a stationary holding plate formed integrally with the front end of the holding base 16, which has a U-shaped notched portion 48 opened upward. Through this notched portion 48, a head adapter 50 is detachably mounted to the stationary holding plate 46. That is, this notched portion 48 serves as a mounting section for the head adapter 50.

Figure 6:
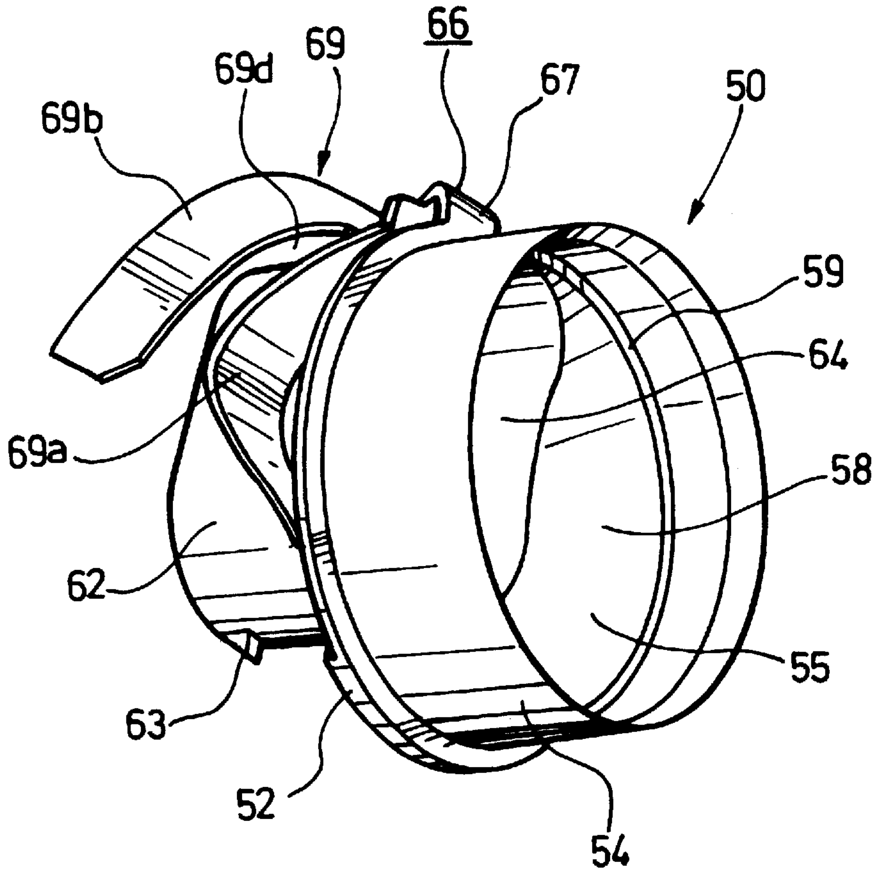
FIG. 6 is a partial, enlarged perspective view showing the head adapter of FIG. 3 as viewed from the inner surface side.

As best shown in FIG. 6, the head adapter 50 has a base plate 52 brought into contact with the inner surface side of the stationary holding plate 46. Reference numeral 54 designates an annular flange portion formed on the inner surface side of the base plate 52. The annular flange portion 54 is formed to have an outer diameter slightly smaller than an inner diameter of the cylindrical member 11 so that it can be inserted into and brought into contact with an opening end portion of the cylindrical member 11.

Reference numeral 58 designates an opening portion formed at a central portion of the base plate 52. Also the outer diameter of the annular flange portion 54 may be slightly larger than the inner diameter of the cylindrical member 11 so as to permit the cylindrical member 11 to be inserted into and brought into contact with the annular flange portion 54. Further, the provision of the annular flange portion 54 may be omitted as far as the contact state between the base plate 52 and the cylindrical member 11 can be established without hindrance.

A wall surface connecting the annular flange portion 54 to a stepped portion space 64 is formed as a slope surface, and a dome-like receiving slope surface 55 is formed to facilitate the receiving of the leading end circular portion of the tubular bag F. Hence, the leading end of the tubular bag F is smoothly received by the receiving slope surface 55, thereby making it smoother to carry out the extruding operations of the tubular bag F.

Figure 7:
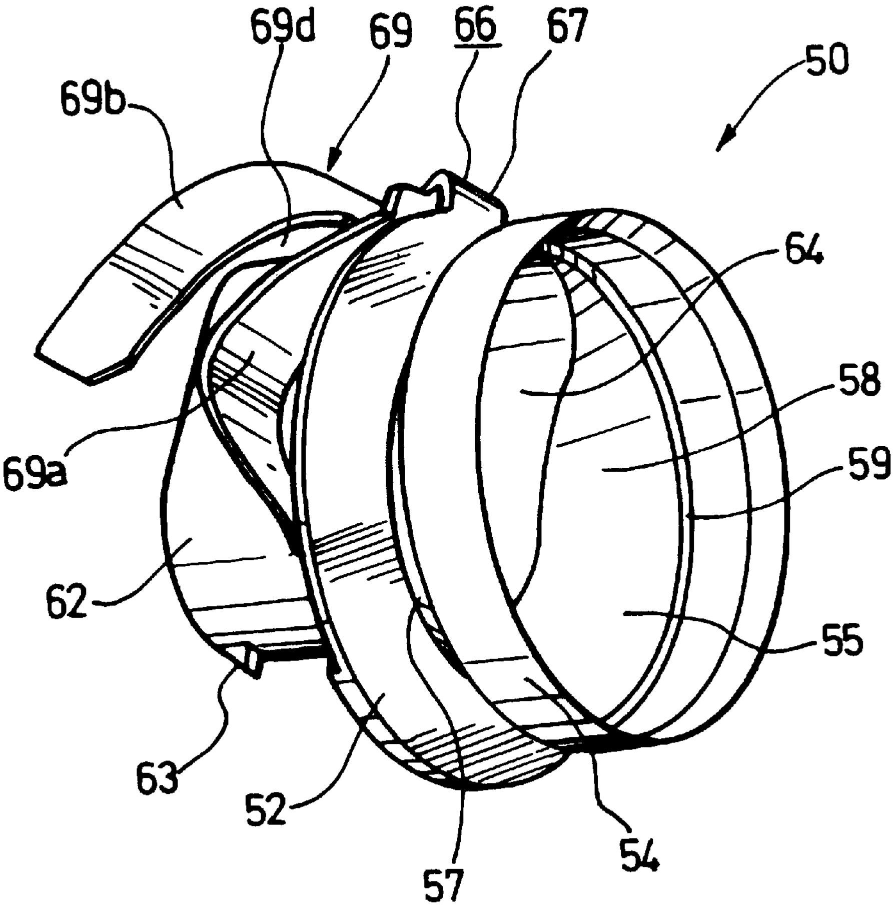
FIG. 7 is a view similar to FIG. 6, which shows another example of the head adapter.
Figure 8:
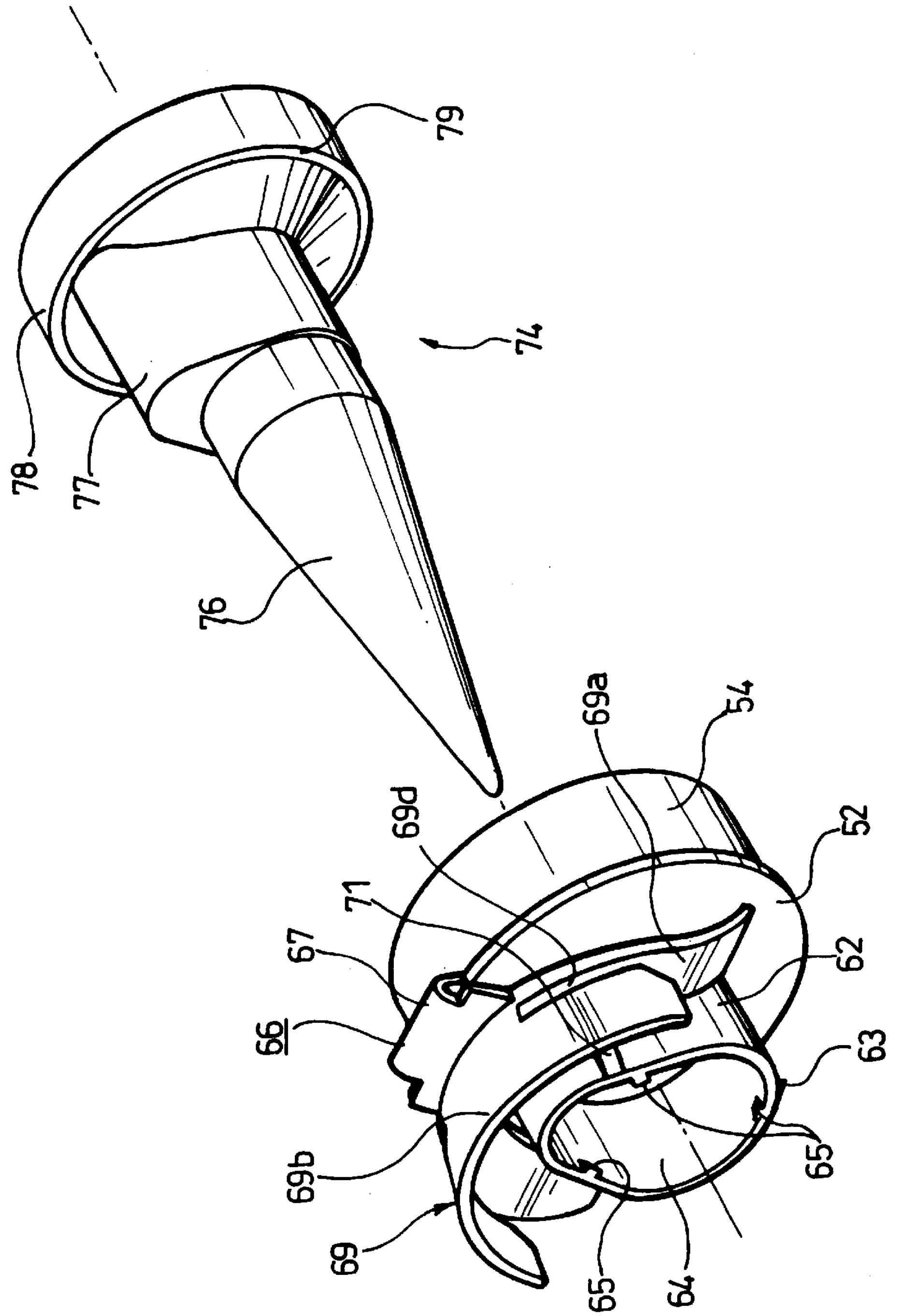
FIG. 8 is a perspective view from the outer surface side of the head adapter of FIG. 6 showing a state in which the head adapter is disposed in a manner opposing against the nozzle body.

Although the annular flange portion 54 and the base plate 52 may be connected together through a planar outer circumferential surface, in order to avoid a disadvantage in which the receiving slope surface 55 portion becomes thick and excess materials therefor are required, as shown in FIG. 7, an annular carved portion 57 is formed at the outer circumferential side of the receiving slope surface 55, so that the thickness of the receiving slope surface 55 portion is reduced to save the material cost as well as to make the weight lighter. In addition, reference numeral 59 designates an annular stepped portion formed on the upper stepped portion of the receiving slope surface 55.

Reference numeral 62 designates a stepped portion formed on the outer surface side of the base plate 52. The stepped portion 62 has such a configuration as to permit the insertion of the notched portion 48 of the stationary holding plate 46 from the central portion of the base plate 52, and is protruded outward. Reference numeral 64 designates a stepped portion space which is perforated through the inner surface side of the stepped portion 62 and opened outward.

Reference numeral 63 designates a stopper portion provided downward and vertically from the outer side of the leading end lower portion of the stepped portion 62, which is adapted to be engaged with a corresponding portion of the stationary holding plate when the head adapter 50 is rotated, to thereby restrict the excessive rotation of the head adapter.

Figure 13:
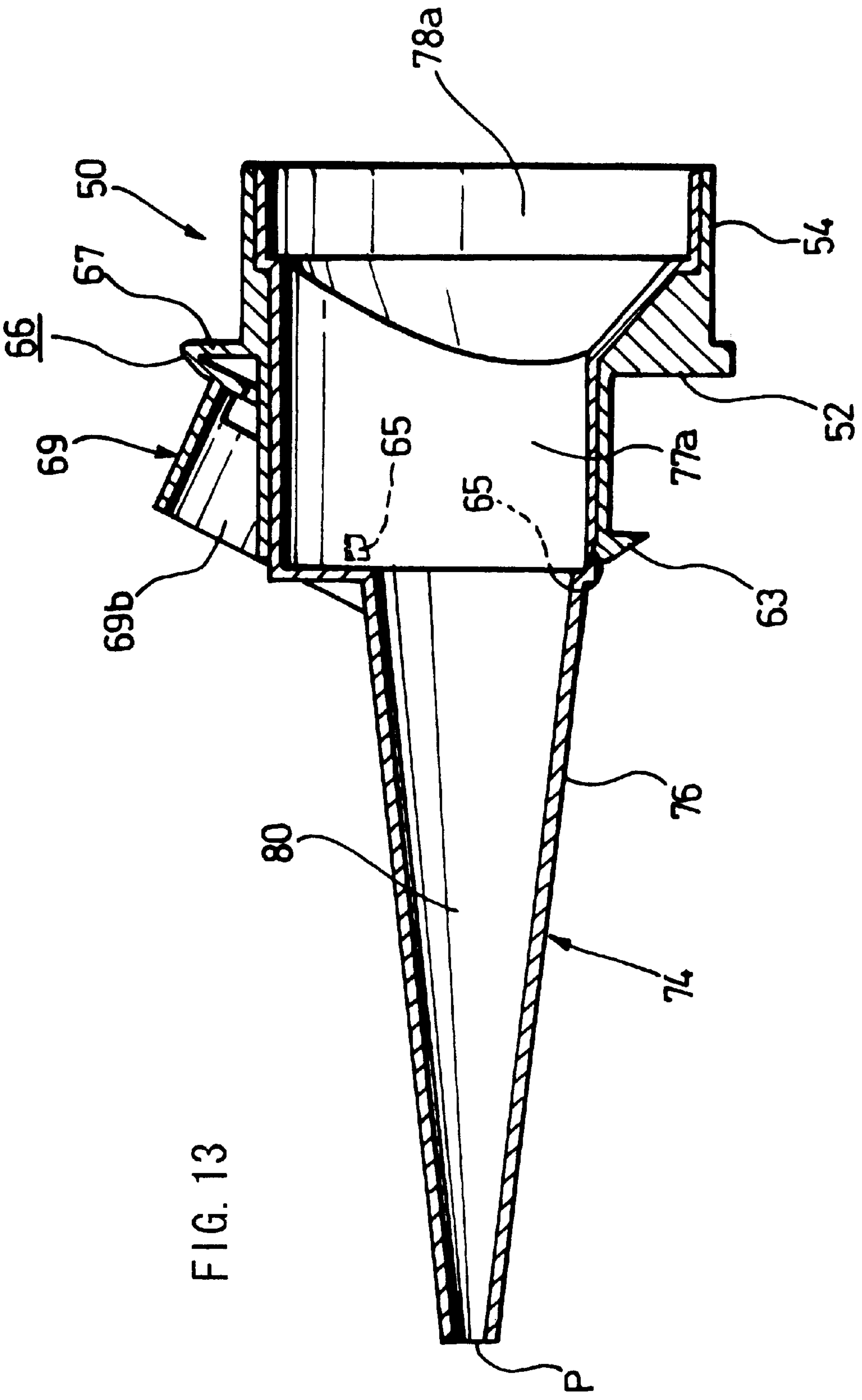
FIG. 13 is a sectional view of FIG. 12.
Figure 14:
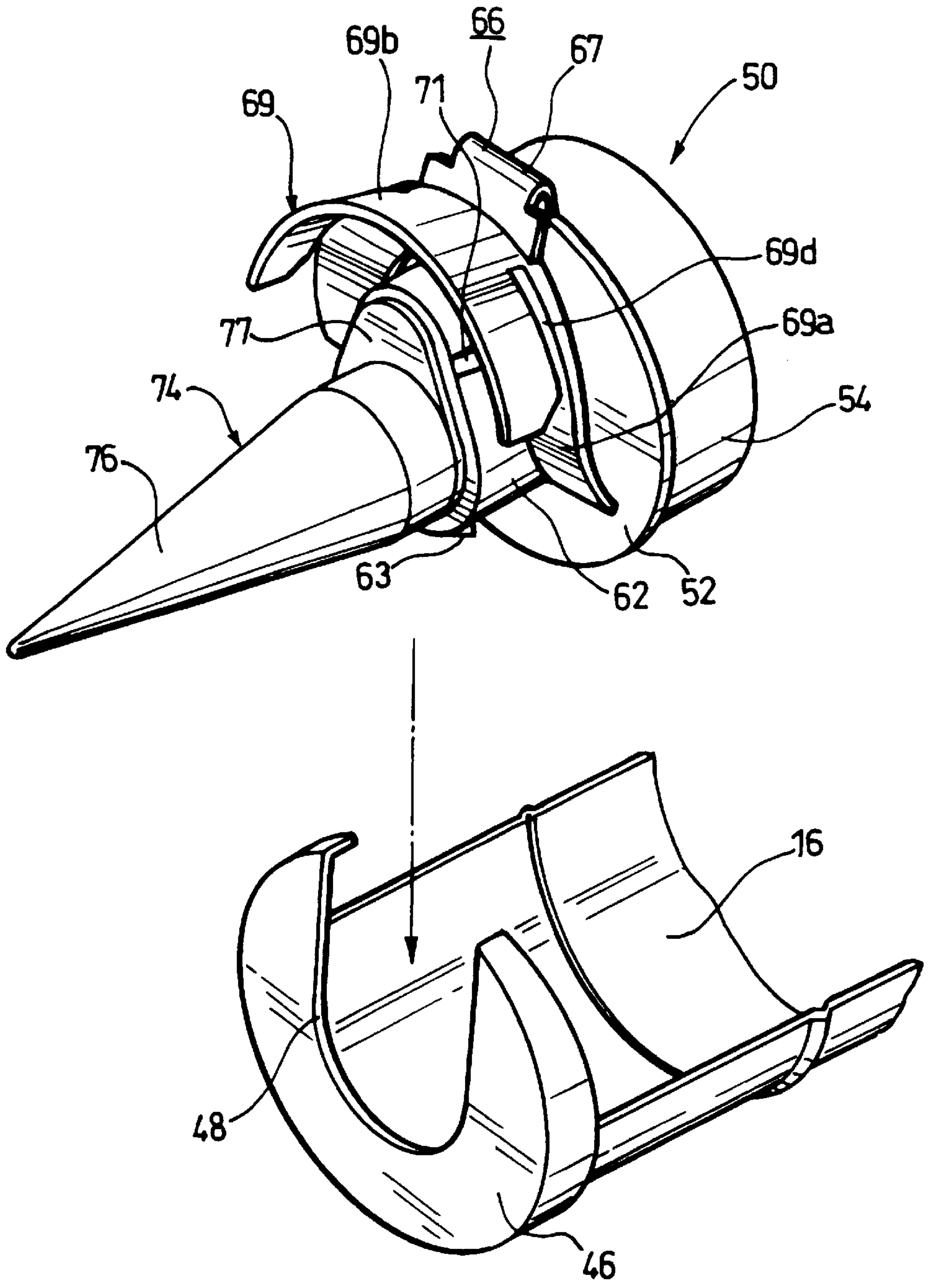
FIG. 14 is a perspective view showing a state before the insertion and attachment operation of the head adapter onto which the nozzle body is fitted and attached into the stationary holding plate is initiated.
Figure 15:
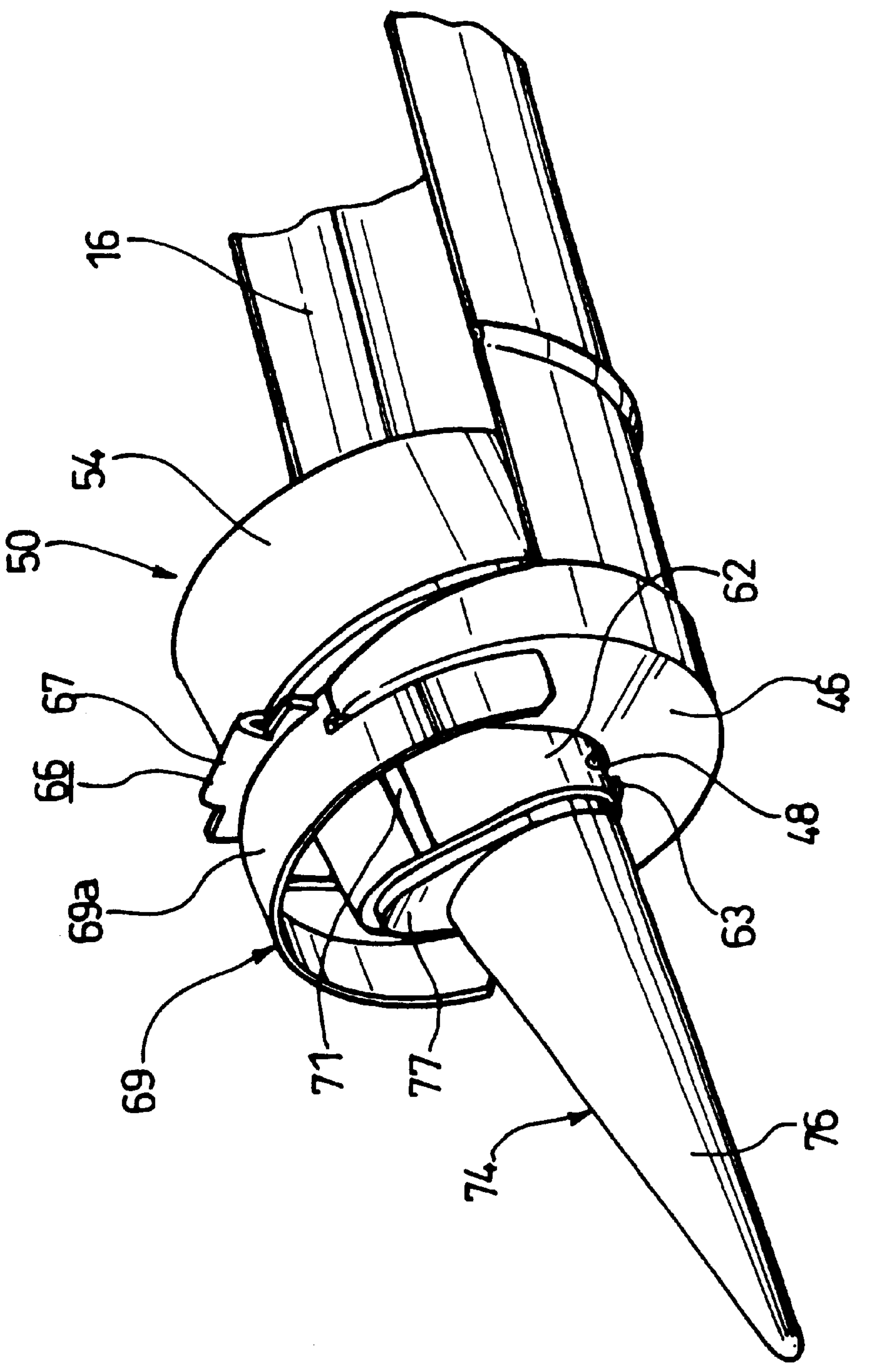
FIG. 15 is a perspective view showing a state in which the insertion and attachment operation of the head adapter onto which the nozzle body is fitted and attached into the stationary holding plate is completed.
Figure 16:
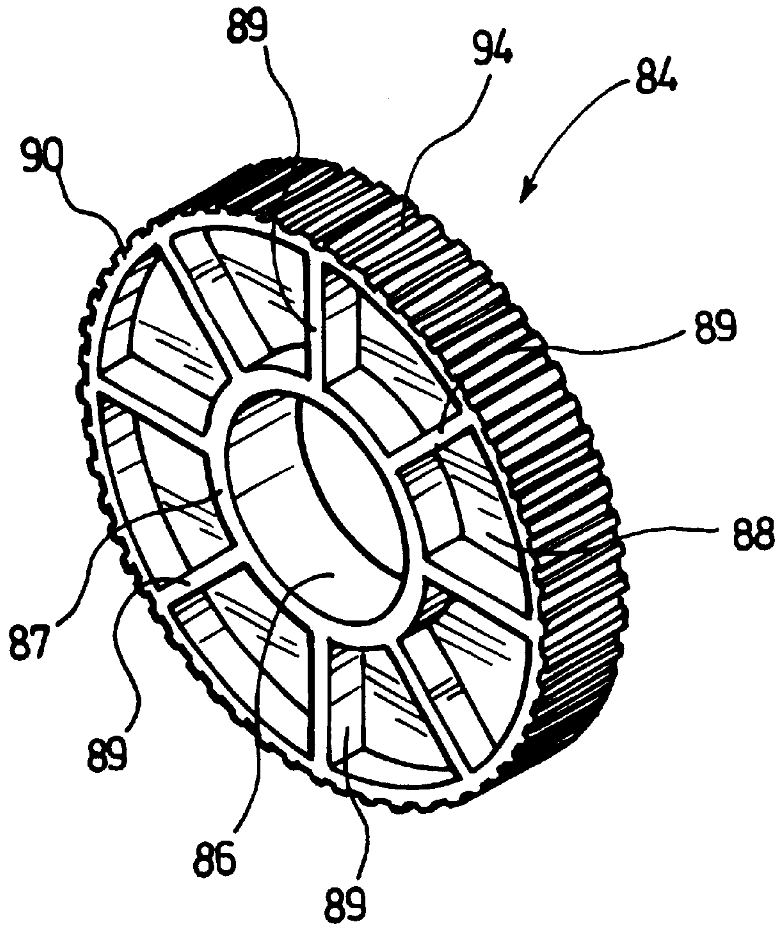
FIG. 16 is a partial, enlarged perspective view showing an example of the piston body.

Reference numeral 65 (FIG. 8) designates an appropriate number of pressing protruding portions (in the illustrated example, three pressing protruding portions are provided), which are provided on the leading end inner surface of the stepped portion 62. These protruding portions 65 forcibly clamp the leading end outer surface of a nozzle stepped portion 77 of the nozzle body 74 when the nozzle body 74 is fitted into and attached to the interior of the head adapter 50 as shown in FIG. 13, to thereby securely hold the nozzle body 74.

Reference numeral 66 designates a spring means provided on the upper portion of the base plate 52. The spring means 66 has a bent spring piece 67 that is attached to the upper end portion of the base plate 52 and that are bent outward. An engagement member 69 is provided on the leading end of the bent spring piece 67, and the engagement member 69 has a pair of inner engagement piece 69*a* and outer engagement piece 69*b* opposite to each other to define an engagement clearance 69*d* for clamping and engaging both the end edge portions of the notched portion 48.

Each of the inner engagement piece 69*a* and the outer engagement piece 69*b* may be in any configurations and should not be limited to a particular configuration as far as they can form an engagement member 69 for clamping and engaging both the end edge portions of the notched portion 48. In the illustrated example, an inverted-U-shaped planar plate member formed by elongating the leading end portion of the bent spring piece 67 in a bifurcated manner is used as the inner engagement piece 69*a*.

Further, if the leading end portion of the inner engagement piece 69*a* is curved to bring the leading end thereof into contact with the base plate portion 52, there is provided an advantage in that the insertion and attachment operation to the stationary holding plate 46 can be performed smoothly. As the outer engagement piece 69*b*, an inverted-U-shaped curved plate the upper end portion of which is connected to the upper portion of the inner engagement piece 69*a* in a manner opposing to the inner engagement piece 69*a* is used.

Reference numeral 71 designates stoppers which are protrusively provided on both sides of the leading end upper portion of the stepped portion 62. The leading end portions of the bent spring piece 67 are retained on the stoppers 71 so that the spring action of the bent spring piece 67 acts toward the base plate 52.

Hence, if the head adapter 50 is rotatably mounted to the stationary holding plate 46 in a state that engagement member 69 of the spring piece 67 is engaged with both the end edge portions of the notched portion 48, the inner surface of the base plate 52 of the head adapter 50 is constantly urged by the spring action of the bent spring piece 67 to be turned obliquely upward.

Reference numeral 74 designates a nozzle body having a nozzle portion 76 formed conically. The outer surface portion of the base portion of the nozzle body 74 is conformed in configuration to the inner surface of the head adapter 50. That is, the base portion of the nozzle body 74 is formed with a nozzle stepped portion 77 formed correspondingly to the stepped portion space 64 of the head adapter 50, and a nozzle annular protruding portion 78 formed correspondingly to the opening portion 58. Reference numeral 79 designates an annular edge portion formed correspondingly to the annular stepped portion 59 of the head adapter 50, which serves to maintain the excellent fitting and attaching condition when the nozzle body 74 is fittingly inserted into and attached to the interior of the head adapter 50. Inside the nozzle stepped portion 77 and the nozzle annular protruding portion 78, there are respectively provided a nozzle stepped portion space 77*a* and a nozzle annular protruding portion space 78*a* that are communicated with each other. A through discharge passage 80 is perforated through the inside of the nozzle portion 76, which is communicated with the nozzle stepped portion space 77*a*.

Figure 9:
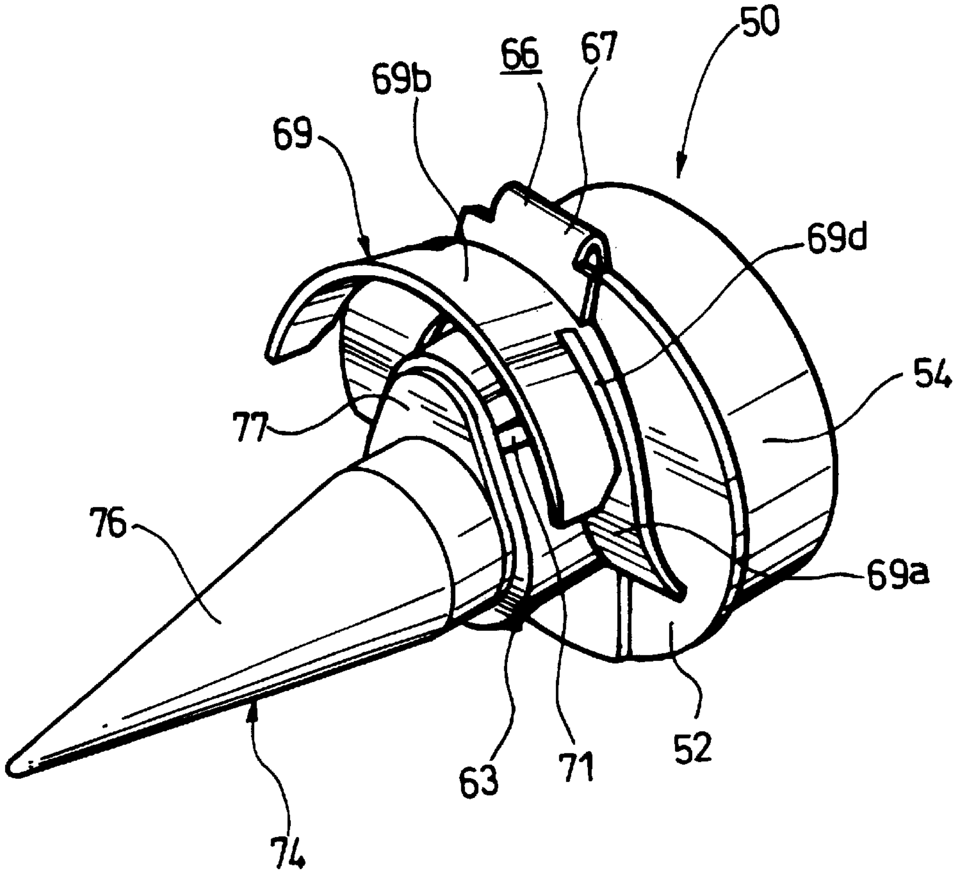
FIG. 9 is a perspective view showing a state in which the nozzle body of FIG. 8 is fittingly attached to the head adapter.
Figure 10:
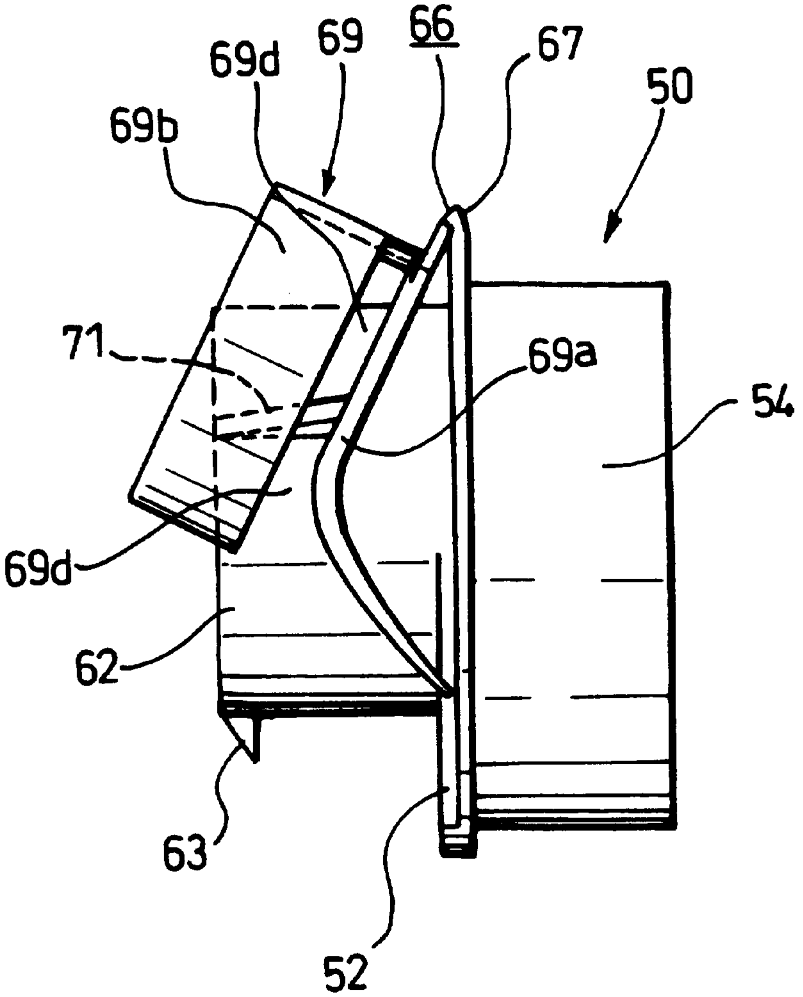
FIG. 10 is a side view of the head adapter shown in FIG. 6.
Figure 11:
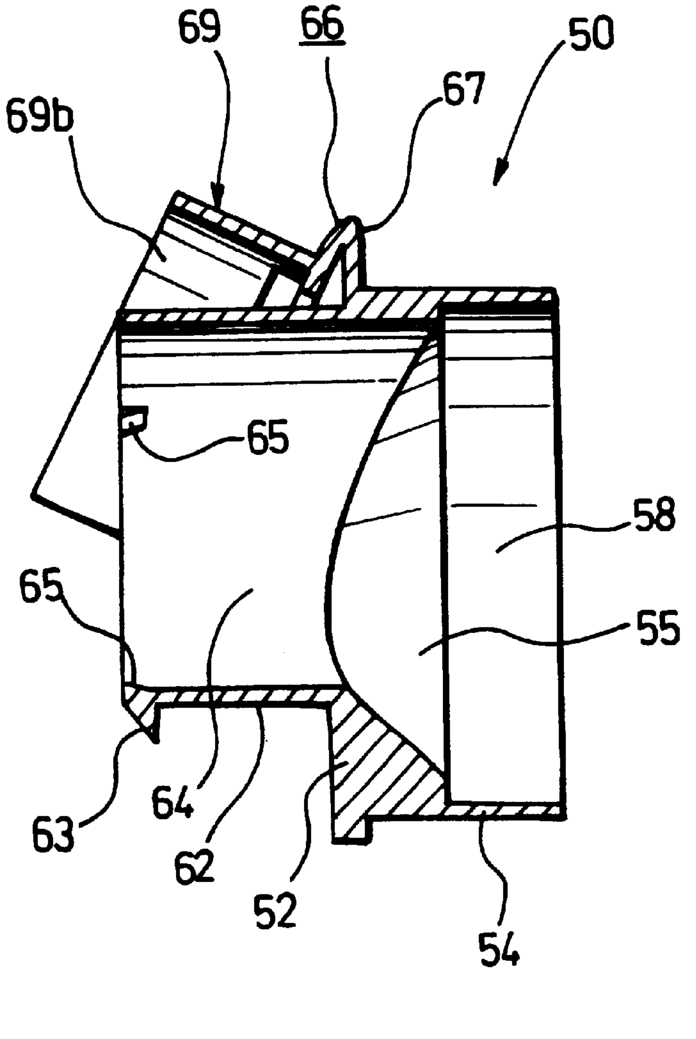
FIG. 11 is a sectional view of FIG. 10.
Figure 12:
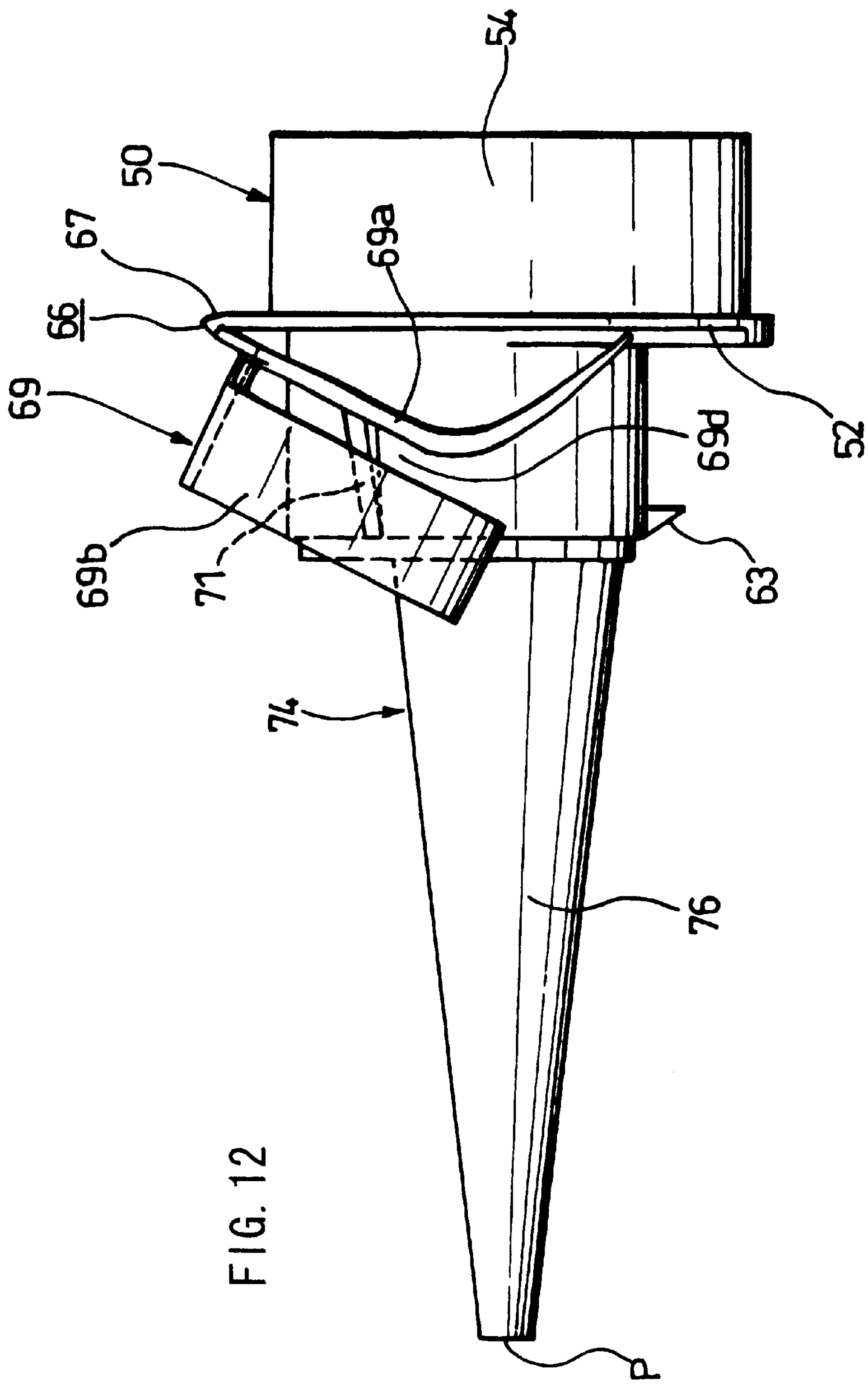
FIG. 12 is a side view showing a state in which the nozzle body is inserted into and attached to the head adapter.

By inserting the nozzle body 74 thus constructed into the interior of the head adapter 50, they are removably fitted and attached together (FIGS. 9, 12 and 13). In this case, since the caulking portion K left on the leading end portion as a result of the opening of the tubular bag F is accommodated within the stepped portion space 64, there is no fear that the caulking portion K will clog the through hole 72 and the through discharge passage 80.

When using, the leading end portion of the nozzle body 74 is cut to form a discharge hole P at the leading end of the through discharge passage 80 of the nozzle body 74 as shown in FIGS. 12 and 13. Although in the illustrated example, the nozzle body 74 is removably attached to the head adapter 50, the nozzle body 74 and the head adapter 50 can, of course, be integrally formed together.

The cylindrical member 11 has a tubular cylinder body 82 opened at both ends thereof, and a disk-like piston body 84 inserted into and slidably arranged on the rear end opening portion of the cylinder body 82. The piston body 84 is made up of a circular plate 88 perforated at its central portion with a hole 86, and an annular rim 90 provided on the outer circumferential surface of the circular plate 88.

Although the circular plate 88 may be a planer plate, it is preferably to design the circular plate such that an annular wall 87 is protrusively provided on the peripheral edge portion of the hole 86, and the annular wall 87 and the annular rim 90 are connected to each other through an appropriate number of reinforcing walls 89 as shown in FIG.

Figure 17:
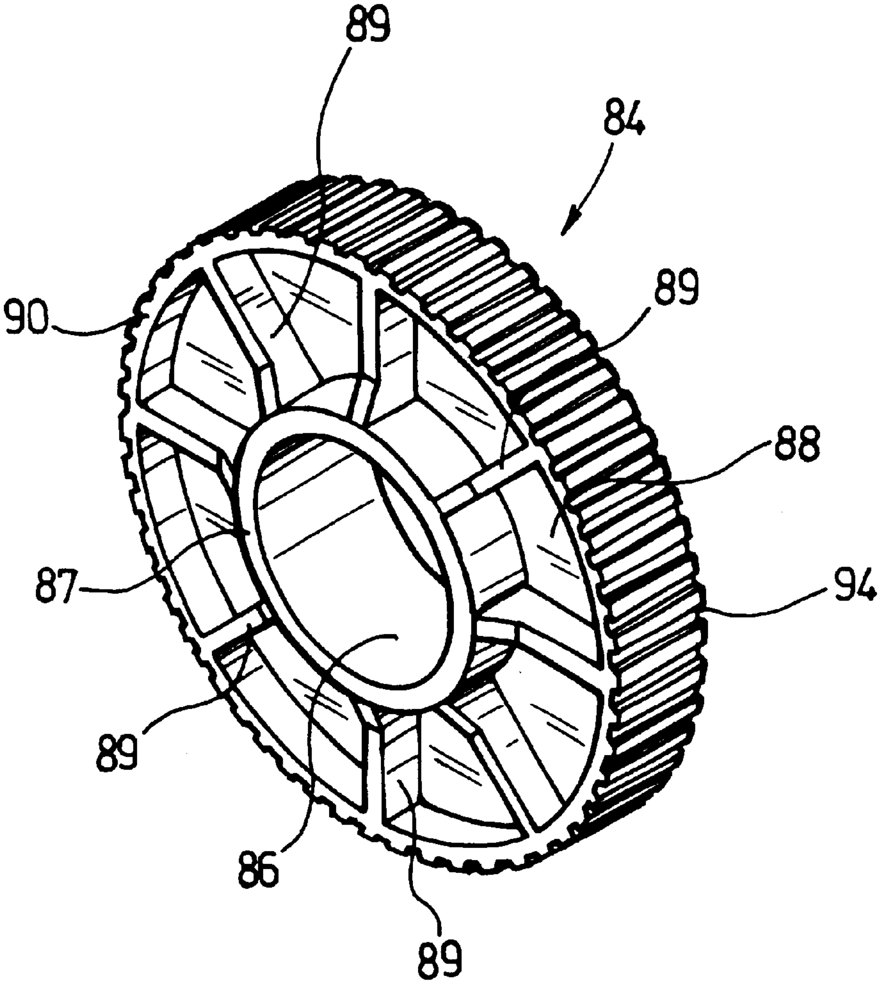
FIG. 17 is a partial, enlarged perspective view showing another example of the piston body.
Figure 18:
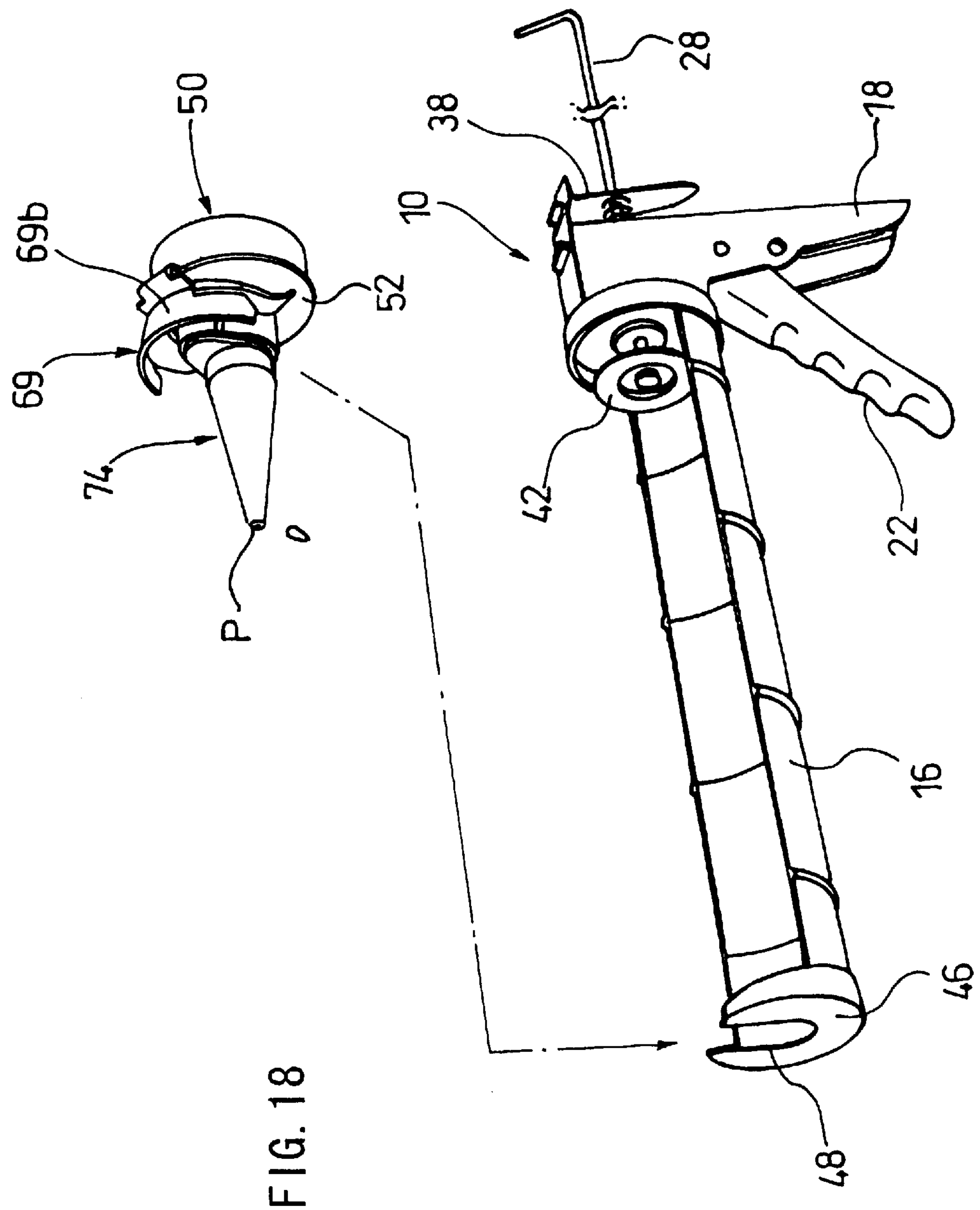
FIG. 18 is a perspective explanatory view showing a state before the head adapter onto which the nozzle body is fitted and attached is mounted to the extruding gun.

16 since this design will increases the strength of the cylinder body 82 totally. Also, if the outer surface of the annular wall 87 is protruded more outward than the outer surface of the annular rim 90 is as shown in FIG. 17, there is provided an advantage in that pressing motion can be performed efficiently when the tubular bag F is pressed by the piston body 84.

The piston body 84 is arranged slidably back and forth, and designed to have a first pressing surface 88*a* and a second pressing surface 88*b* on respective sides of the circular plate 88 to make it possible to achieve the pressing function with both sides of the piston body 84.

When the base end portion of the tubular bag F is pressed by the piston body 84, the caulking portion K of the base end portion of the tubular bag F is located within the hole 86 so as not to hinder the pressing motion of the piston 84.

Although the inner circumferential surface of the cylinder body 82 and the outer circumferential surface of the annular rim 90 of the piston body 84 may be smooth surfaces, it is preferable to provide a large number of protruding ribs 92 extending in a longitudinal direction on the inner circumferential surface of the cylinder body 82 as well as to provide a large number of recessed grooves 94 extending in a sliding direction on the outer circumferential surface of the annular rim 90 correspondingly to the protruding ribs 92 as illustrated.

This arrangement will lead to smooth folding and overlapping of the film when the contents C of the tubular bag F are discharged and the tubular bag F is folded and overlapped, and more effectively avoid biting of the tubular bag into a space between the inner circumferential surface of the cylinder body 82 and the outer circumferential surface of the annular rim 90.

Further, the protruding ribs 92 and the recessed grooves 94 cooperatively serve as a guiding operation during the sliding of the annular rim 90. For this reason, even if the width of the annular rim 90 is small, the piston body 84 can be slid in a stable manner.

Figure 5:
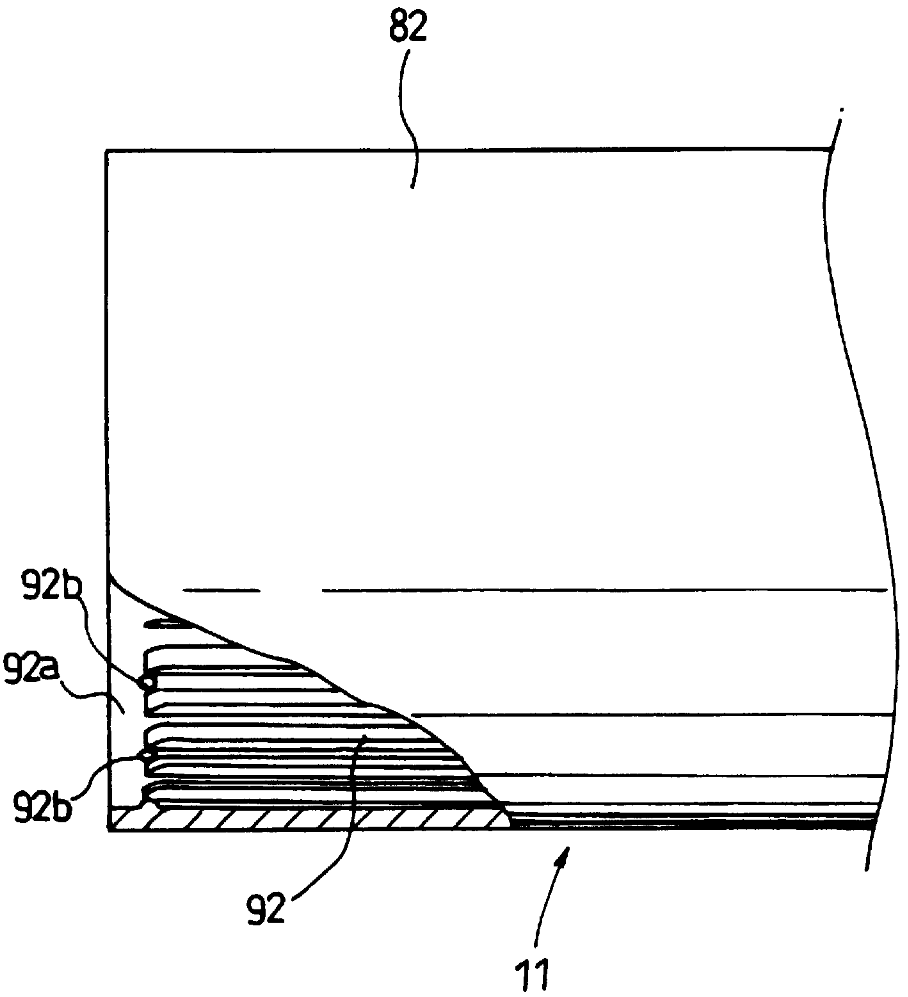
FIG. 5 is a partially cutaway, enlarged side view showing the end edge portion of the cylindrical member.

If a planar portion 92*a*, in stead of the protruding ribs 92, is formed on both longitudinal end portions of the inner circumferential surface of the cylinder body 82, there is provided an advantage facilitating the insertion and attachment operation when the piston body 84 is inserted into and attached to the inner circumferential surface of the cylinder body 82. If the protrusion-like stoppers 92*b* are protrusively provided in the vicinities of both end portions of the cylinder body 82, there is provided an advantage in that the piston body 84 is not easily removed from the cylinder body 82 in a case where the piston body 84 is inserted into and slidalby attached to the inner circumferential surface of the cylinder body 82 (FIG. 5).

Figure 2:
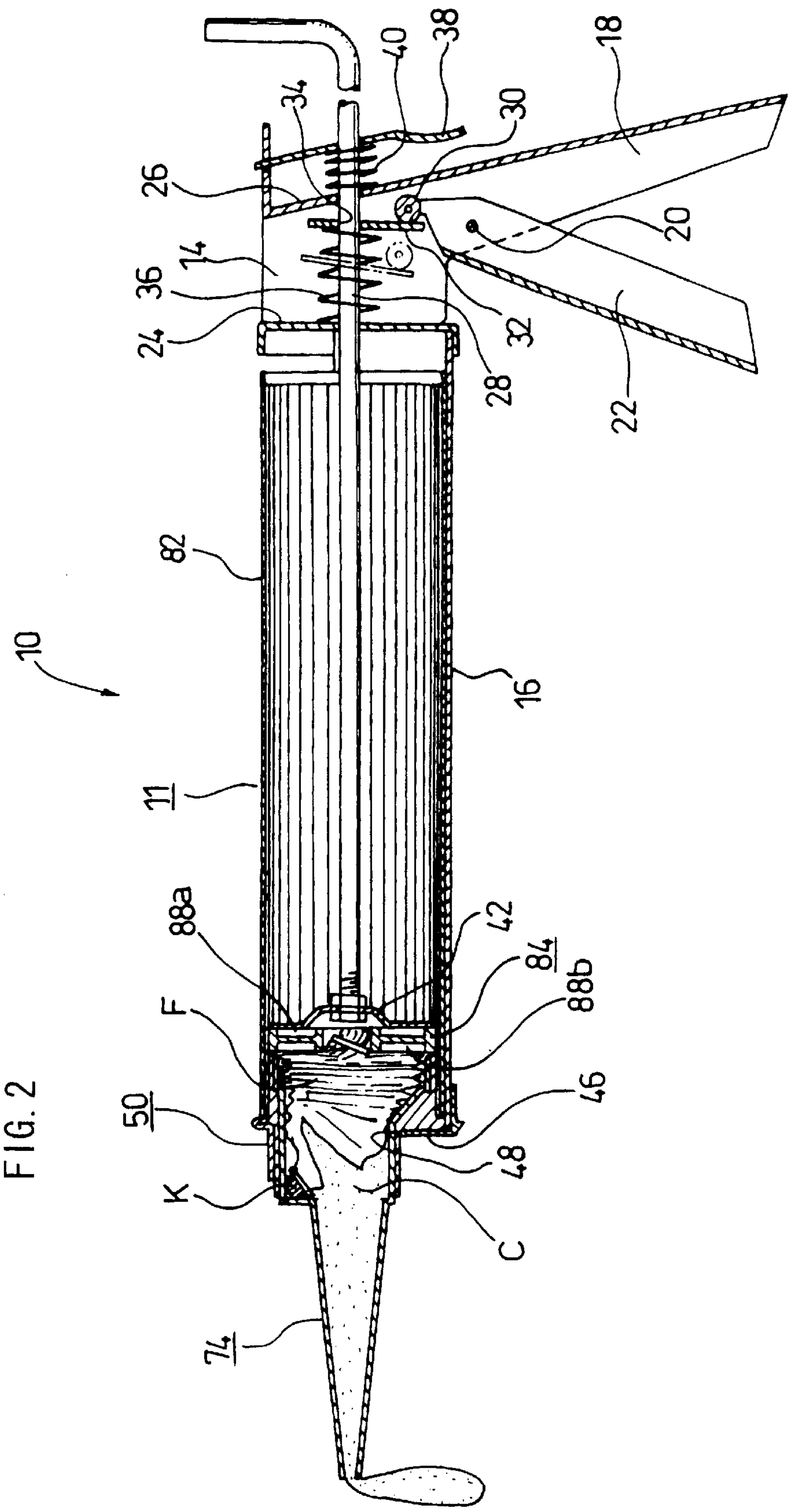
FIG. 2 is a sectional explanatory view showing a state in which contents have been all discharged by pressing the tubular bag from the state of FIG. 1.
Figure 3:
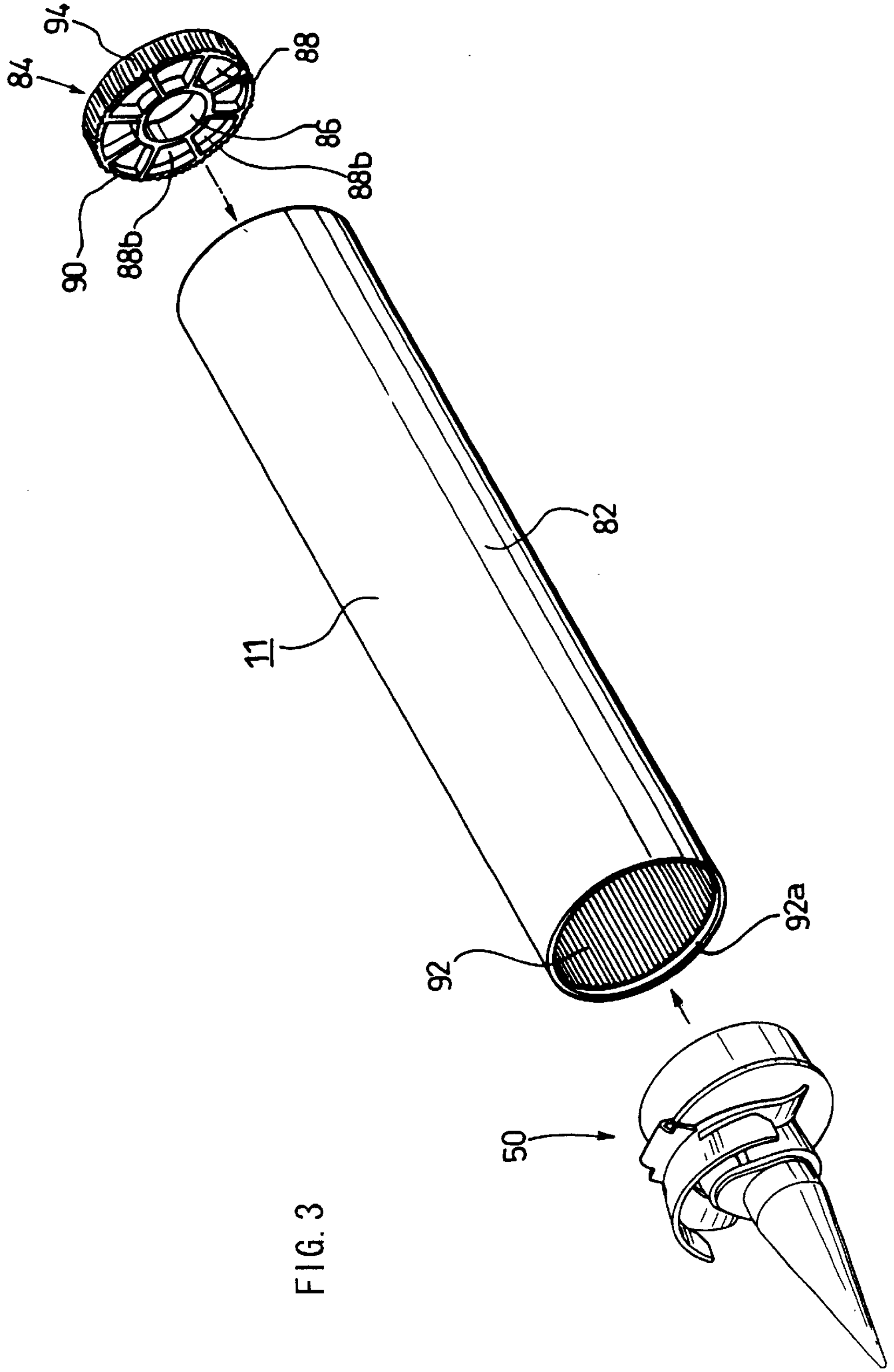
FIG. 3 is a perspective explanatory view showing a relationship among a head adapter, a cylindrical member and a piston body.
Figure 4:
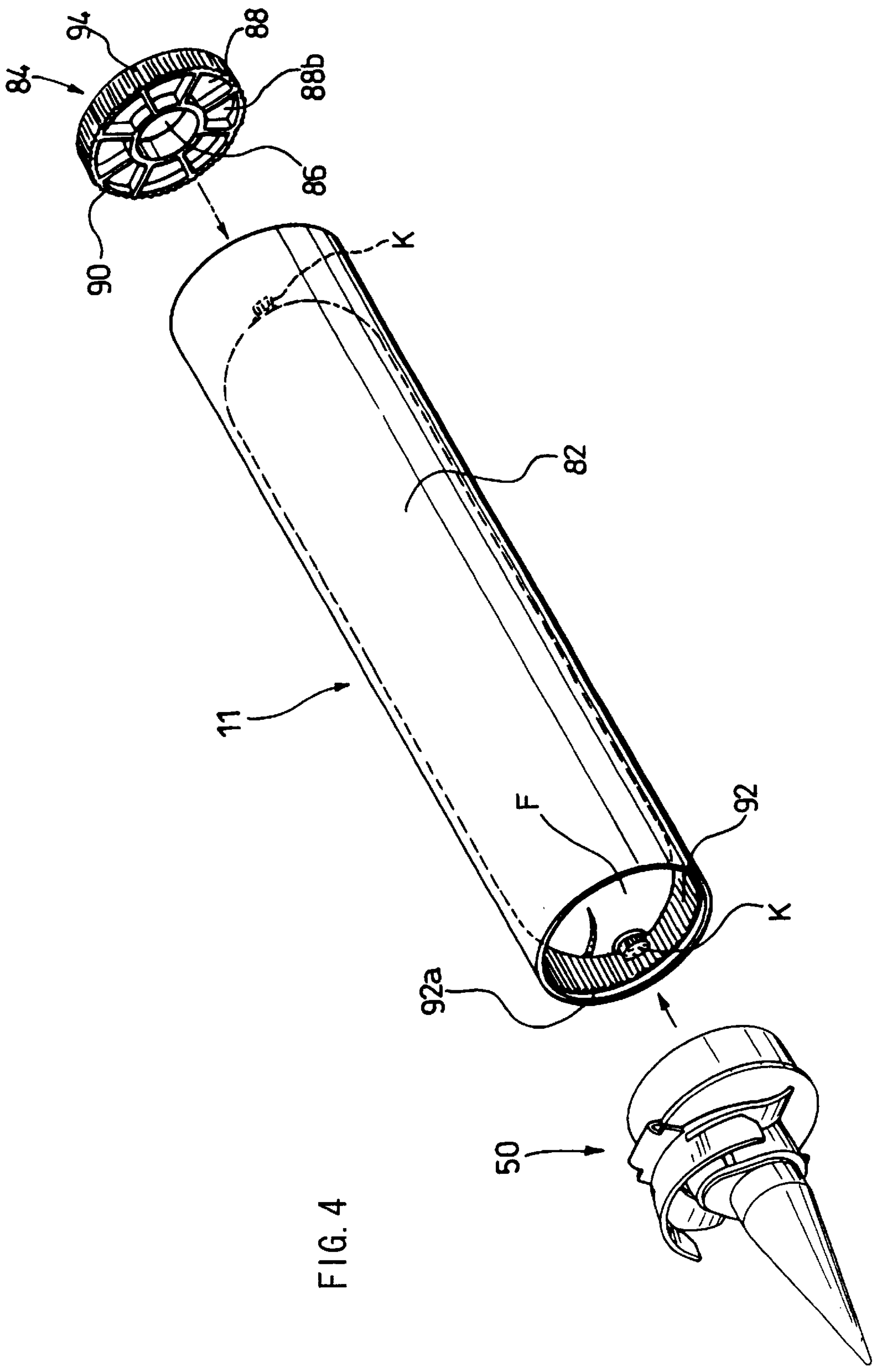
FIG. 4 is a perspective explanatory view showing a state in which the tubular bag is accommodated within the cylindrical member in the state of FIG. 3.

Since the piston body 84 is arranged slidably back and forth and both surfaces thereof are formed as the pressing surfaces, initially the piston body 84 is inserted into and attached to the rear end opening portion of the cylinder body 82, and the tubular bag F is accommodated in front of the piston body 84 as shown in FIG. 1 to discharge the sealing material or the like C from the tubular bag F by moving the piston body 84 to the front end opening portion (FIG. 2).

Then, if the cylindrical member 11 is reversed with the piston body 84 kept to be positioned at the front end opening portion (the state shown in FIG. 2), the piston body 84 is located at the rear end opening portion of the cylinder body 82 as in the beginning state of the piston body 84. Therefore, a new tubular bag can be accommodated again in front of the piston body 84, so that the cylindrical member 11 can be used again in the similar fashion. By repeating these procedures, the cylindrical member 11 can be used semi-permanently.

Since the nozzle body 74 is fitted into and attached to the inner surface side of the head adapter 50, the discharge of the contents C will stain the inner surface of the nozzle body 74 located at the inner surface side of the head adapter 50 by the contents C but will not stain the inner surface side of the head adapter 50 by the contents C since the inner surface side of the head adapter 50 is completely covered by the nozzle body 74.

Therefore, the nozzle body 74 is discarded after an appropriate number of discharge operations are carried out, but the same and one head adapter can be repeatedly used semi-permanently since the head adapter 50 is never stained. That is, since it suffices to discard only the nozzle body 74, it is possible to decrease the amount of the waste material and thus reduce the waste material amount that is a factor of generating the poisonous gas such as dioxin when incinerating the waste material, to thereby serve as one of the solutions for the environmental problems.

The operations associated with the construction as described above will be explained. First of all, as shown in FIGS. 9, 12 and 13, the nozzle body 74 is fitted into the interior of the head adapter 50 so that they are integrated together (FIGS. 18, and 30(*a*),(*b*)).

Figure 19:
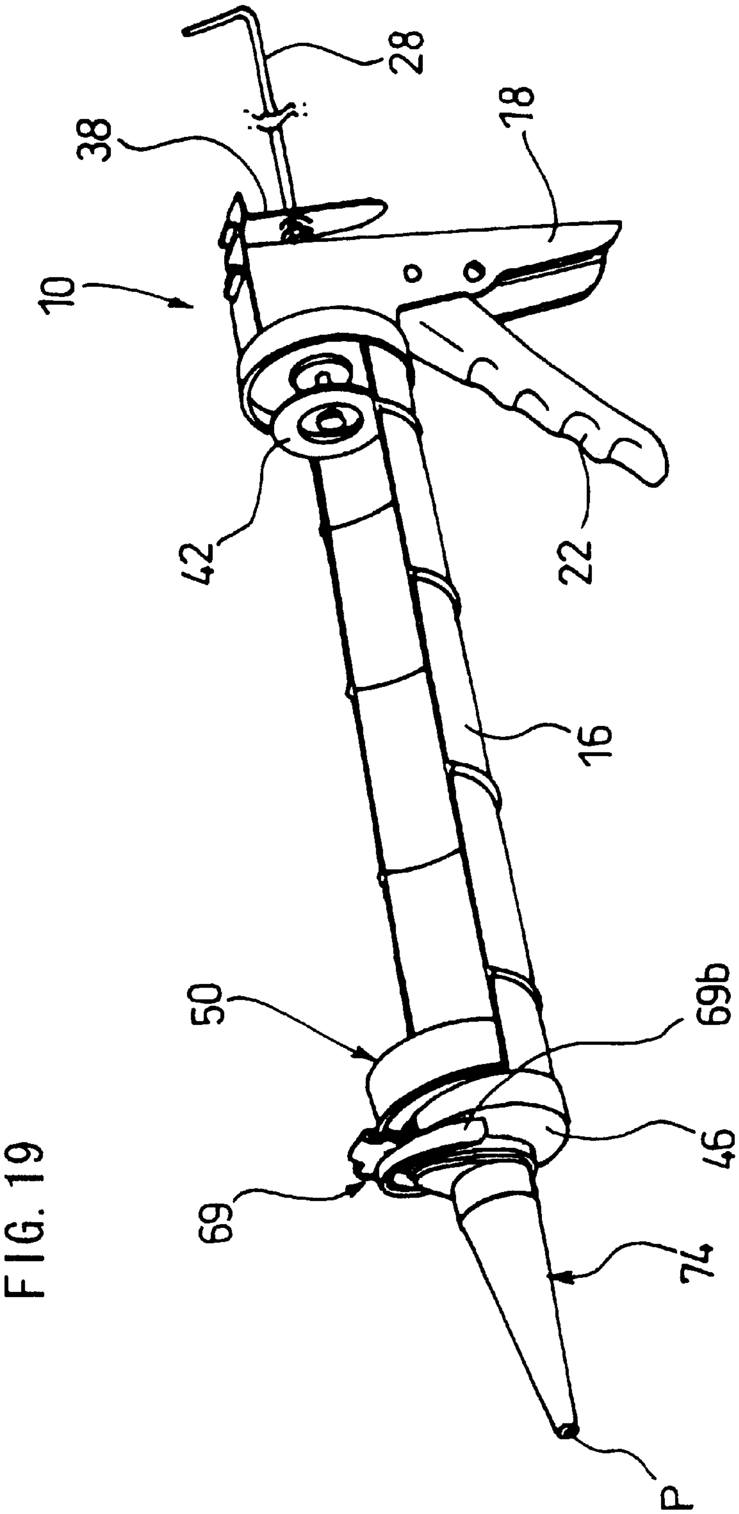
FIG. 19 is a perspective explanatory view showing a state in which the head adapter onto which the nozzle body is fitted and attached is mounted to the extruding gun.
Figure 30:
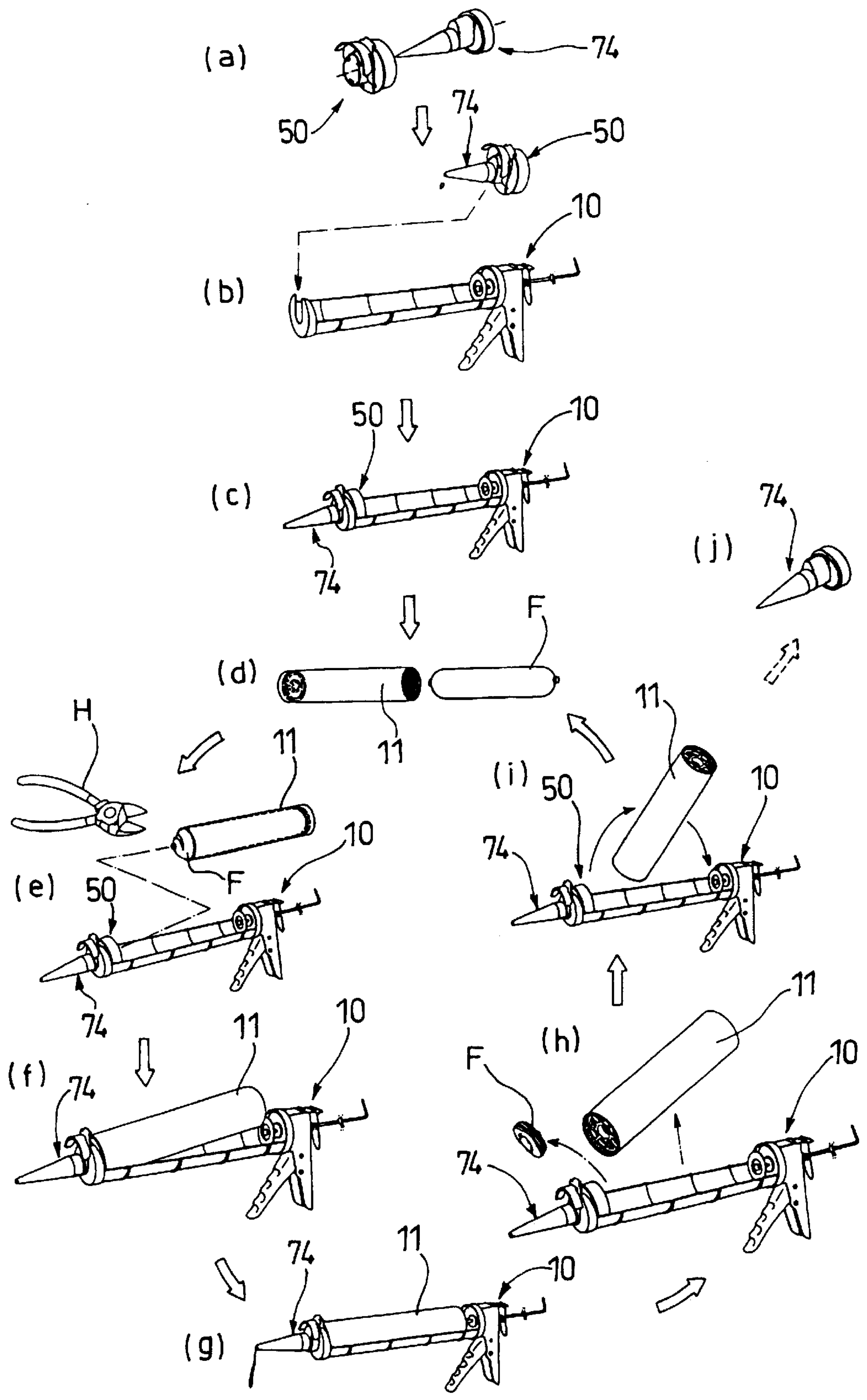
FIG. 30 is a perspective explanatory view totally showing using manners and procedures of the tubular bag extruding device according to the present invention, in which a part (a) shows a state in which the head adapter and the nozzle body are arranged opposite to each other, a part (b) shows a state before the head adapter to which the nozzle body is fitted and attached is inserted and attached to the extruding gun, a part (c) shows a state in which the nozzle body and the head adapter are inserted and attached to the extruding gun, a part (d) shows a state before the tubular bag is inserted into the cylindrical member, a part (e) shows a state before the cylindrical member, into which the tubular bag has been inserted, is inserted and attached to the head adapter of the extruding gun, a part (f) shows a state in which the cylindrical member is inserted and attached to the head adapter of the extruding gun, a part (g) shows a state in which the extruding operations of contents from the tubular bag are initiated, a part (h) shows a state in which the extruding operations of the contents from the tubular bag are completed, so that the squashed tubular bag is discarded and the empty cylindrical member is taken out of the extruding gun, a part (i) shows a state in which the empty cylindrical member is reversed for reuse, and a part (j) shows a state in which after the cylindrical member has been repeatedly used for the extruding operations of predetermined times, the stained nozzle body is detached from the head adapter and discarded.

Next, the integral assembly of the nozzle body 74 and the head adapter 50 is inserted into and attached to the stationary holding plate 46 to be rotatable up and down in a state that the stepped portion 62 of the head adapter 50 is inserted into and placed on the notched portion 48 of the stationary holding plate 46, both end edge portions of the notched portion 48 are clamped by and engaged with the engagement clearance 69*d* of the engagement member 69 and the base plate 52 is positioned on the inner surface of the stationary holding plate 46 (FIGS. 19 and 30(*c*)).

In this condition, since the spring action by the spring means 66 acts toward the base plate 52 of the head adapter 50, the inner surface of the base plate 52 is constantly urged by the action of the spring so as to be turned obliquely upward.

If the head adapter 50 is forcibly inserted such that the stepped portion 62 is inserted into the notched portion 48 and both the end edge portions of the notch portion 48 is clamped by and engaged with the engagement member 69 provided to the bent spring piece 67, the inner surface of the base plate 52 of the head adapter 50 is constantly urged by the spring action of the spring means so as to be turned obliquely upward.

Figure 20:
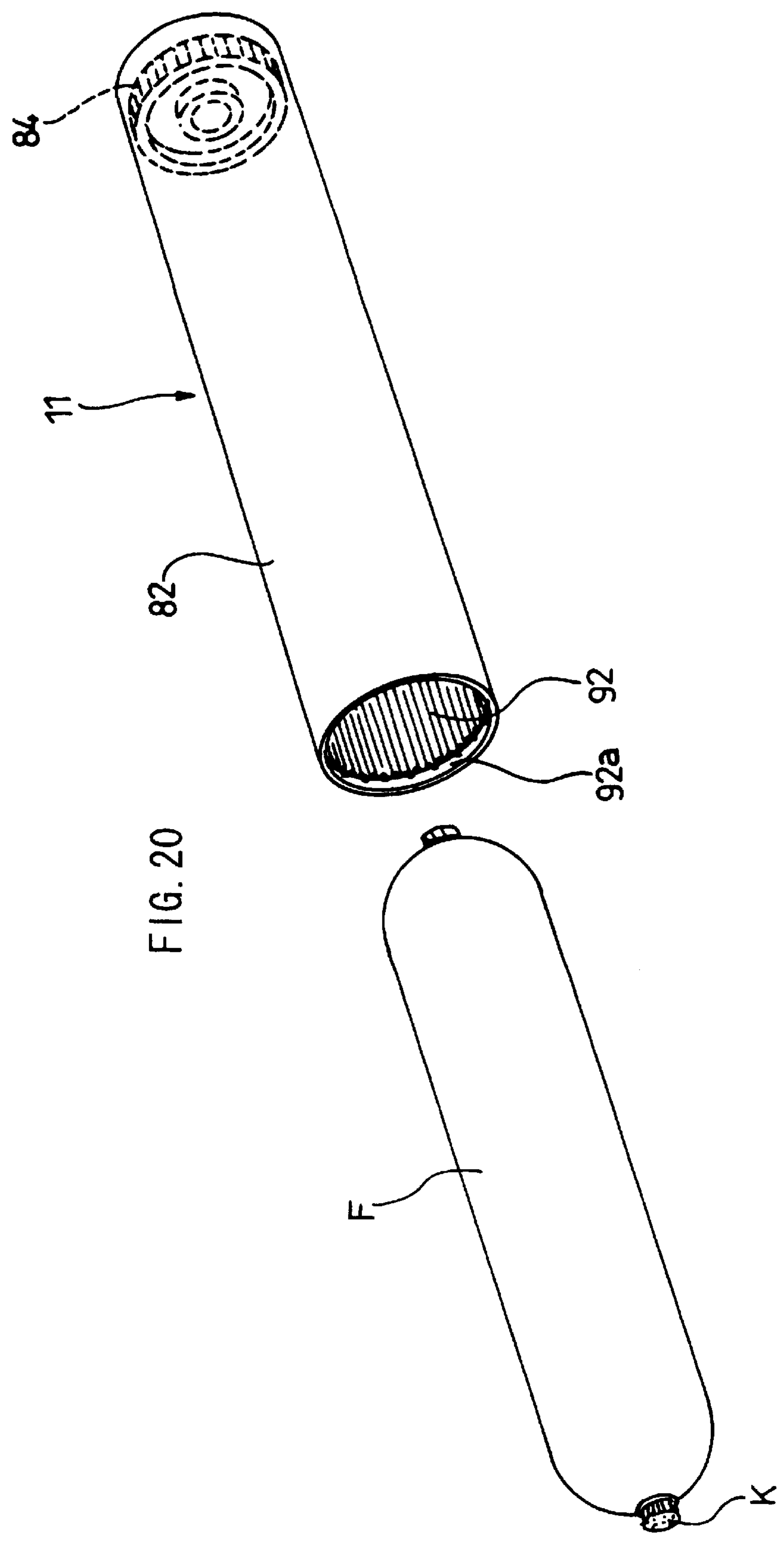
FIG. 20 is a perspective explanatory view showing a state before the cylindrical member is mounted to the extruding gun of the state shown in FIG. 19, together with the tubular bag.

Then, the cylindrical member 11 in which the piston body 84 is inserted into and slidably arranged on the rear end opening portion of the cylinder body 82 is prepared (FIGS. 20 and 30(*d*)). Thereafter, the tubular bag F is accommodated within the cylinder body 82 through the front end opening portion of the cylinder body 82, and the leading end portion of the tubular bag F is cut with a nipper or the like H to be opened (FIGS. 21 and 30(*e*)).

In this opening operation, according to normal procedures, the caulking portion K at which the leading end is caulked with the use of an aluminum wire material or the like is left attached to the leading end without being cut off therefrom. This is because if the caulking portion K is cut off therefrom, the caulking portion K becomes wastes at the working site and the tubular bag F is opened entirely. Although the caulking portion K attached to the leading end of the tubular bag F may causes a problem of narrowing or clogging the flow path of the through hole 72 and the flow path of the through discharge passage 80 during the course of the squashing the tubular bag as described above, the provision of the stepped portion space 64 on the inner surface side of the head adapter 50 as well as the nozzle stepped portion space 77*a* on the inner surface side of the nozzle body 74 as illustrated will completely avoid such accidents as to narrow and clog the flow paths since the caulking portion K is accommodated within these stepped portion space 64 and nozzle stepped portion space 77*a* (FIGS. 1 and 2).

Figure 21:
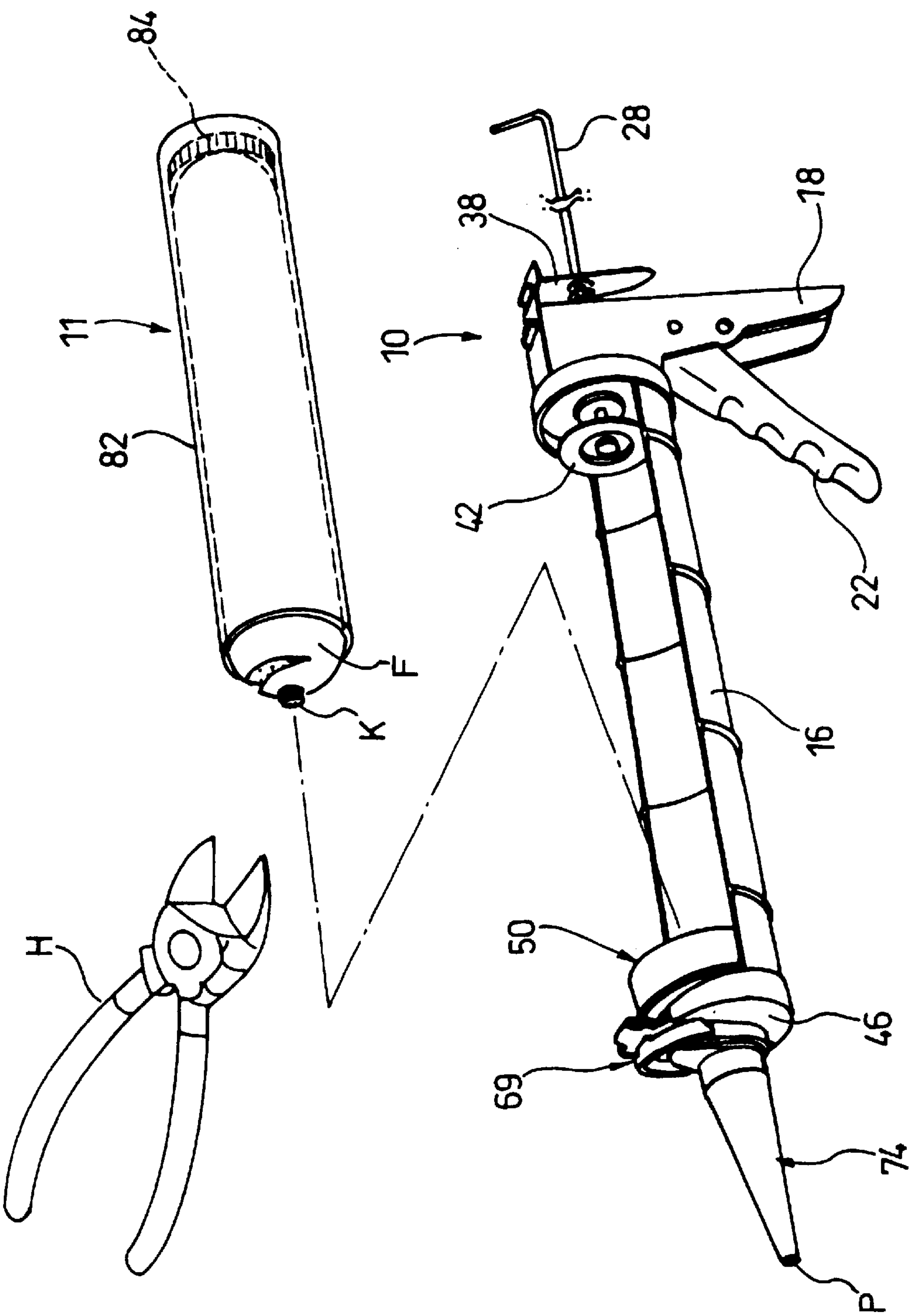
FIG. 21 is a perspective explanatory view showing a state in which the tubular bag is inserted into the cylindrical member of the state shown in FIG. 20, and the leading end portion thereof is cut.
Figure 22:
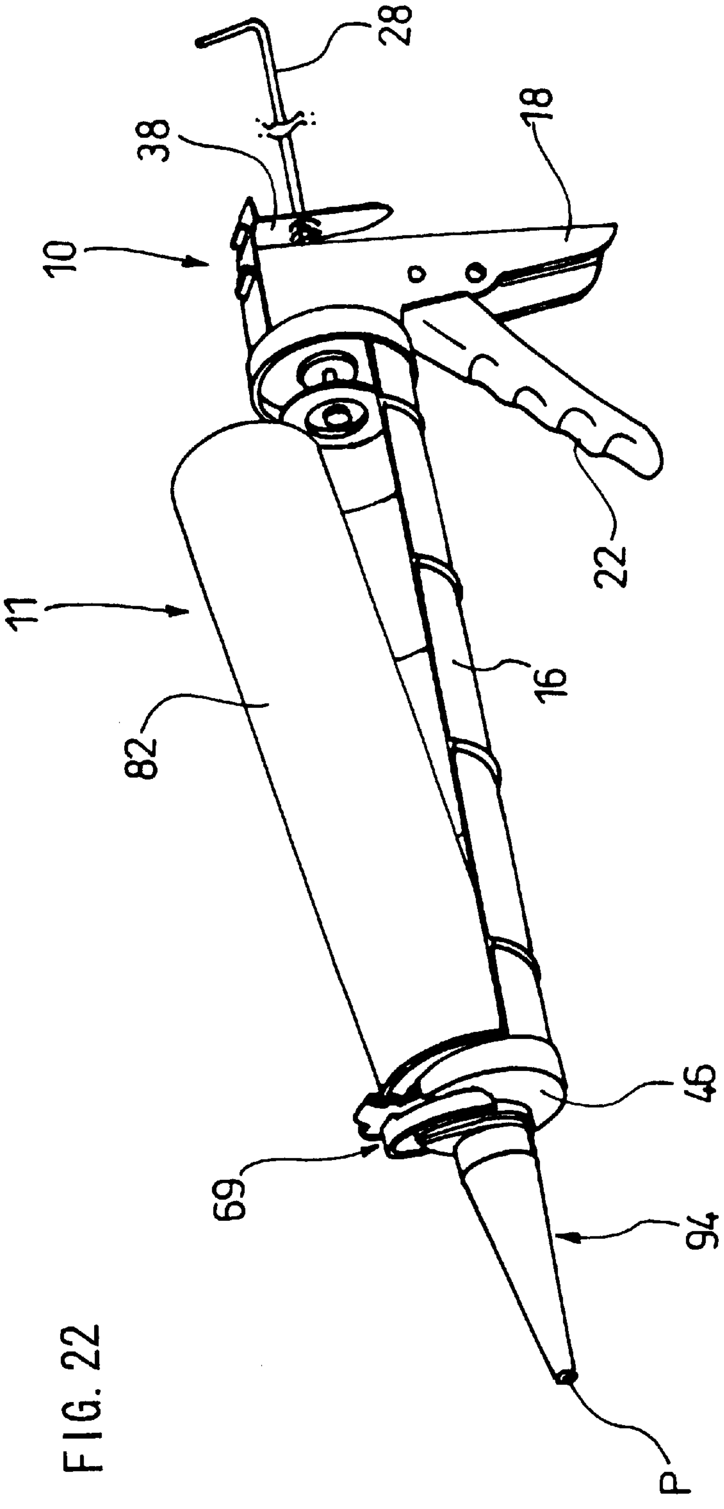
FIG. 22 is a perspective explanatory view showing a state in which the cylindrical member into which the tubular bag is inserted and attached to the head adapter.

As shown in FIGS. 19 and 21, the head adapter 50 is arranged such that the inner surface of the base plate 52 of the head adapter 50 is turned obliquely upward. The leading end circumferential portion of the cylindrical member 11 in which the tubular bag F is accommodated is fittingly inserted into the outer circumferential surface of the annular flange portion 54 on the inner surface side of the head adapter 50 thus turned obliquely upward so that they are closely contacted with and coupled to each other (FIGS. 22 and 30(*f*)), and subsequently the cylindrical member 11 is rotated downward with its leading end portion as a rotational center, whereby the cylindrical member 11 is placed on the holding base 16 of the extruding gun 10 (the state shown in FIG. 1).

Figure 23:
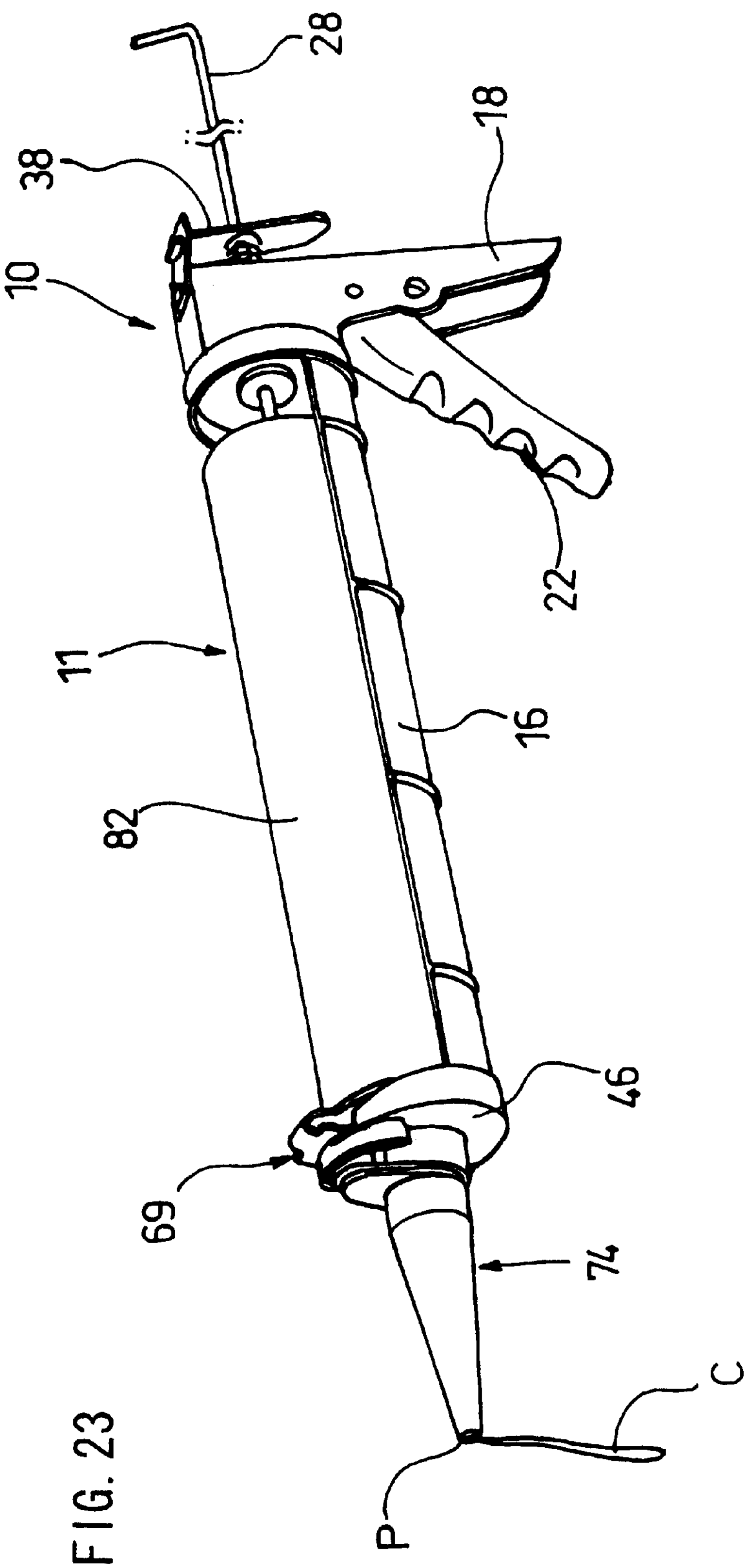
FIG. 23 is a perspective explanatory view showing a state in which the cylindrical member inserted and attached to the head adapter is mounted to the extruding gun and contents of the tubular bag accommodated within the cylindrical member is extruded.

Then, by operating the lever 22, the extruding rod 28 and the pressing plate 42 are moved forward to press the tubular bag F, thereby discharging the sealing material or the like filled in the tubular bag F while folding, overlapping and squashing the tubular bag (FIGS. 23 and 30(*g*)). In a state where all the sealing material or the like has been discharged, the piston body 84 is located at the front end opening portion of the cylinder body 82 of the piston body 84 (the state shown in FIG. 2).

The tubular bag F thus squashed, folded and overlapped, from which the contents C have been discharged completely, is forcibly pressed to the base plate 52 and annular flange portion 54 of the head adapter 50 in the state shown in FIG. 2. This used up and squashed tubular bag F can be simply taken out such that the cylindrical member 11 is rotated upward with its leading end portion as a rotational center, the leading end circumferential portion of the cylindrical member is removed from the outer circumferential surface of the annular flange portion 54 of the head adapter 50, and the tubular bag F in the state where it is forcibly pressed into the head adapter 50 is taken out therefrom to be discarded (FIGS. 24, 25(*a*), (*b*) and 30(*h*)).

Figure 26:
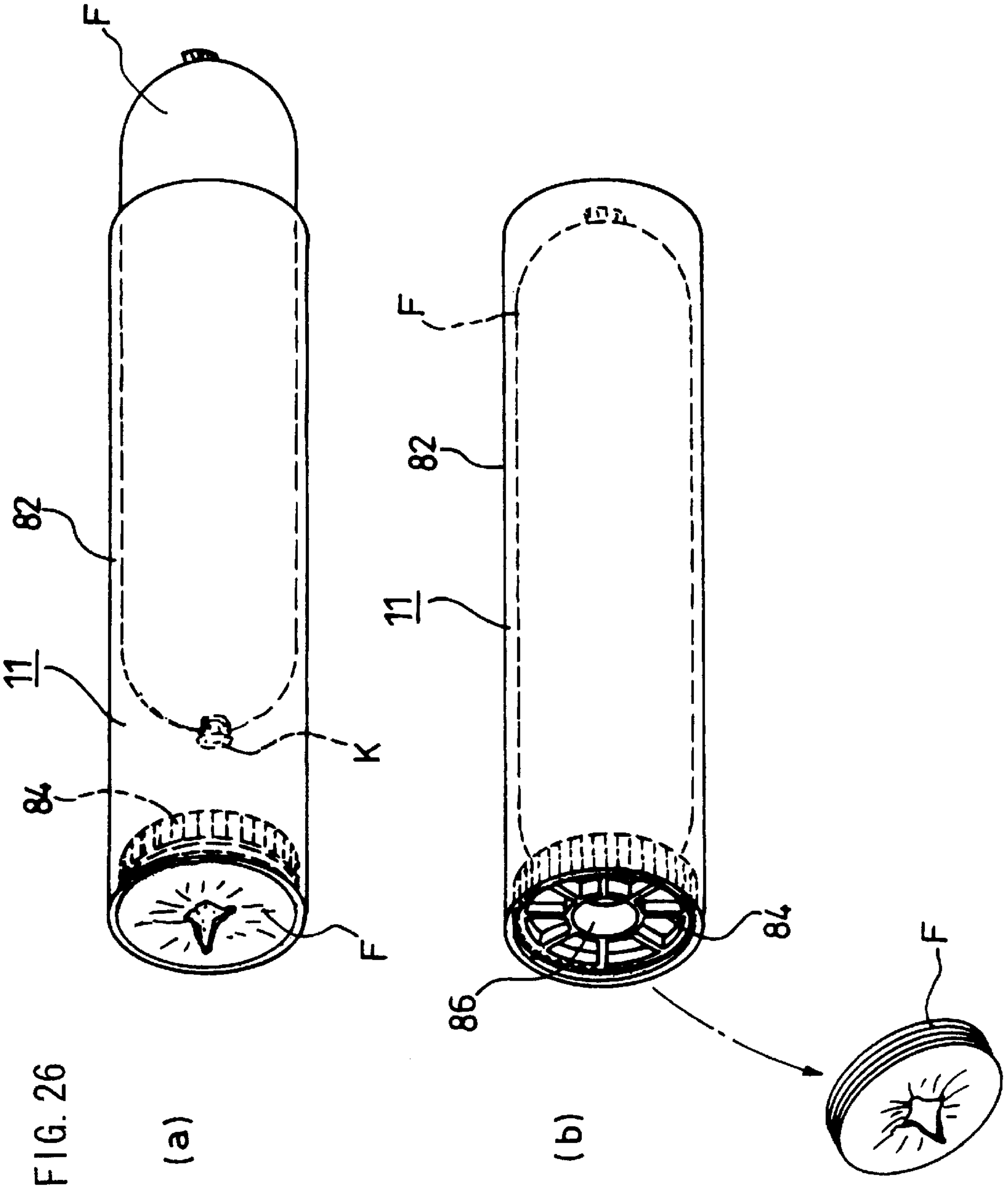
FIG. 26 is a perspective explanatory view showing a manner in which the squashed and used up tubular bag is taken out of the cylindrical member and discarded in a case where the tubular bag is adhered to the cylindrical member side, wherein a part (a) shows a state in which the squashed tubular bag is adhered to the end portion of the cylindrical member, and a part (b) shows a state in which the tubular bag is removed away from the cylindrical member.
Figure 27:
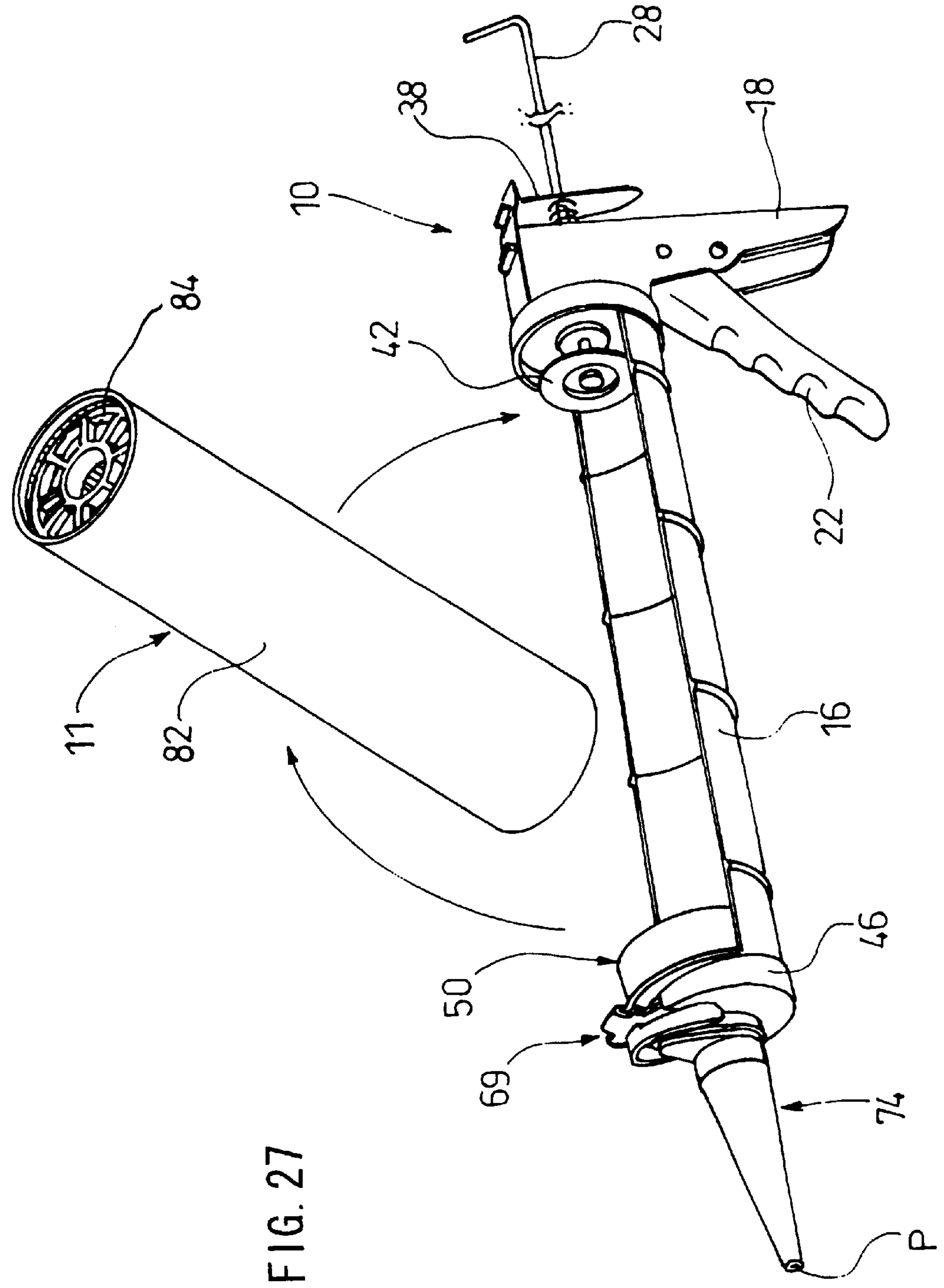
FIG. 27 is a perspective explanatory view showing a manner in which the used cylindrical member is reversed for reuse.

In a case where the squashed tubular bag F is adhered to the end portion side of the cylinder body 82 (FIG. 26(*a*)), the insertion of a new tubular bag F into the cylinder body 82 will cause the caulking portion K of the new tubular bag F to protrude from the hole 86 of the piston body 84 so as to press and drop the squashed tubular bag F. Thus, the squashed tubular bag F may be discarded simply in its dropped condition (FIG. 26(*b*)).

In a case of the conventional cartridge container, the piston is slidable in only one direction (i.e. the forward direction), and since the tacky material such as the sealing material is directly filled in the cartridge container, the inside of the cartridge container is tacky due to the adhered sealing material or the like when all the contents have been discharged from the cartridge container and the piston has reached the foremost end portion. Therefore, the cartridge container can not be used again, and is discarded in its used condition. In a case of the present invention, the piston body 84 has the pressing surfaces 88*a* and 88*b* on respective sides and arranged slidably in two directions (in forward and backward directions), and in a state where the contents of the tubular bag F have been completely discharged and the piston body 84 has reached the foremost end portion, the tubular bag F is squashed but the inner surface of the cylinder body 82 remains unchanged from the beginning of use because the contents C such as the sealing material or the like C are not directly contacted with the inner surface of the cylinder body 82 and thus is free from being adhered thereto.

Figure 24:
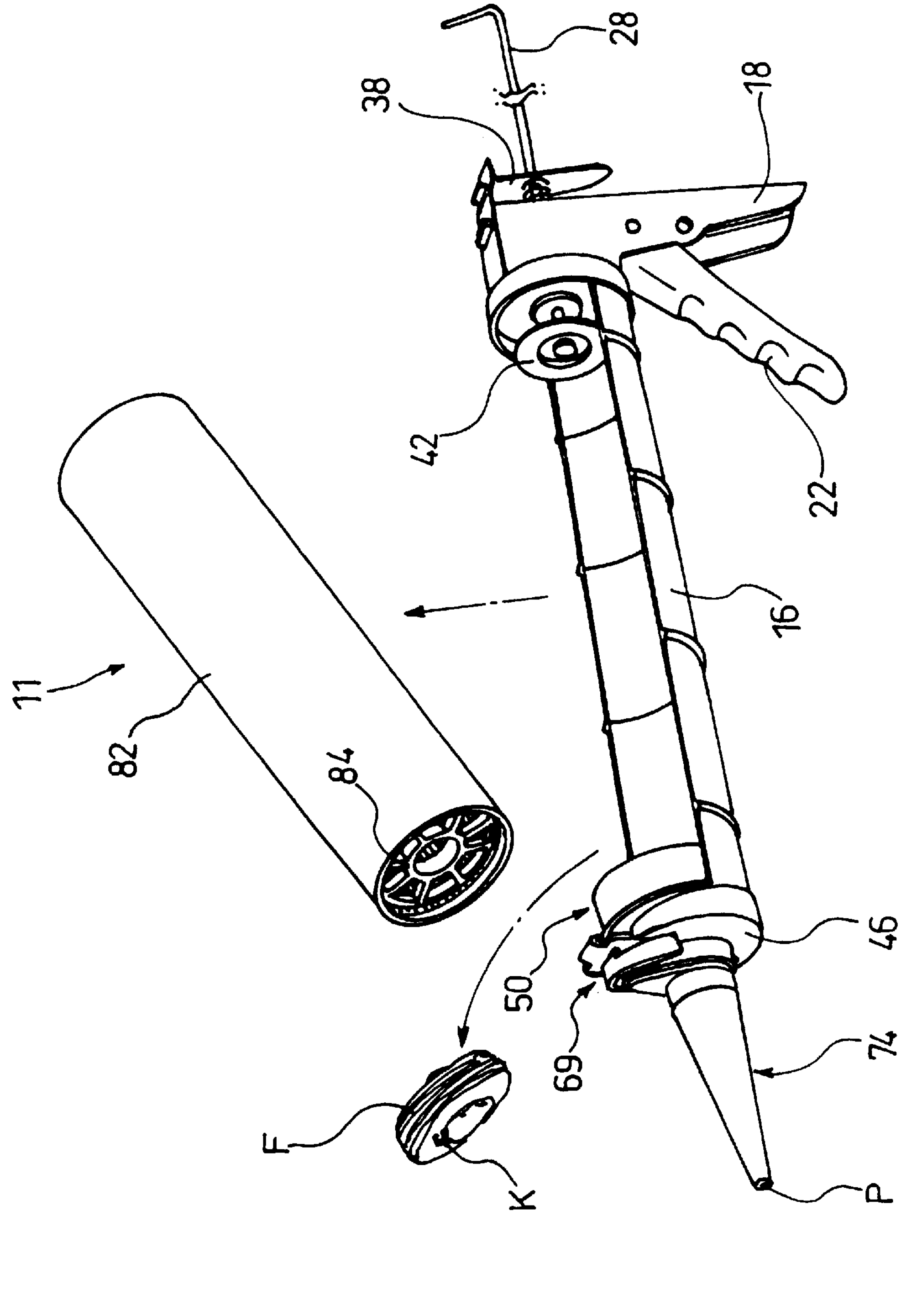
FIG. 24 is a perspective explanatory view showing a state in which the squashed and used up tubular bag is taken out of the head adapter and discarded.
Figure 25:
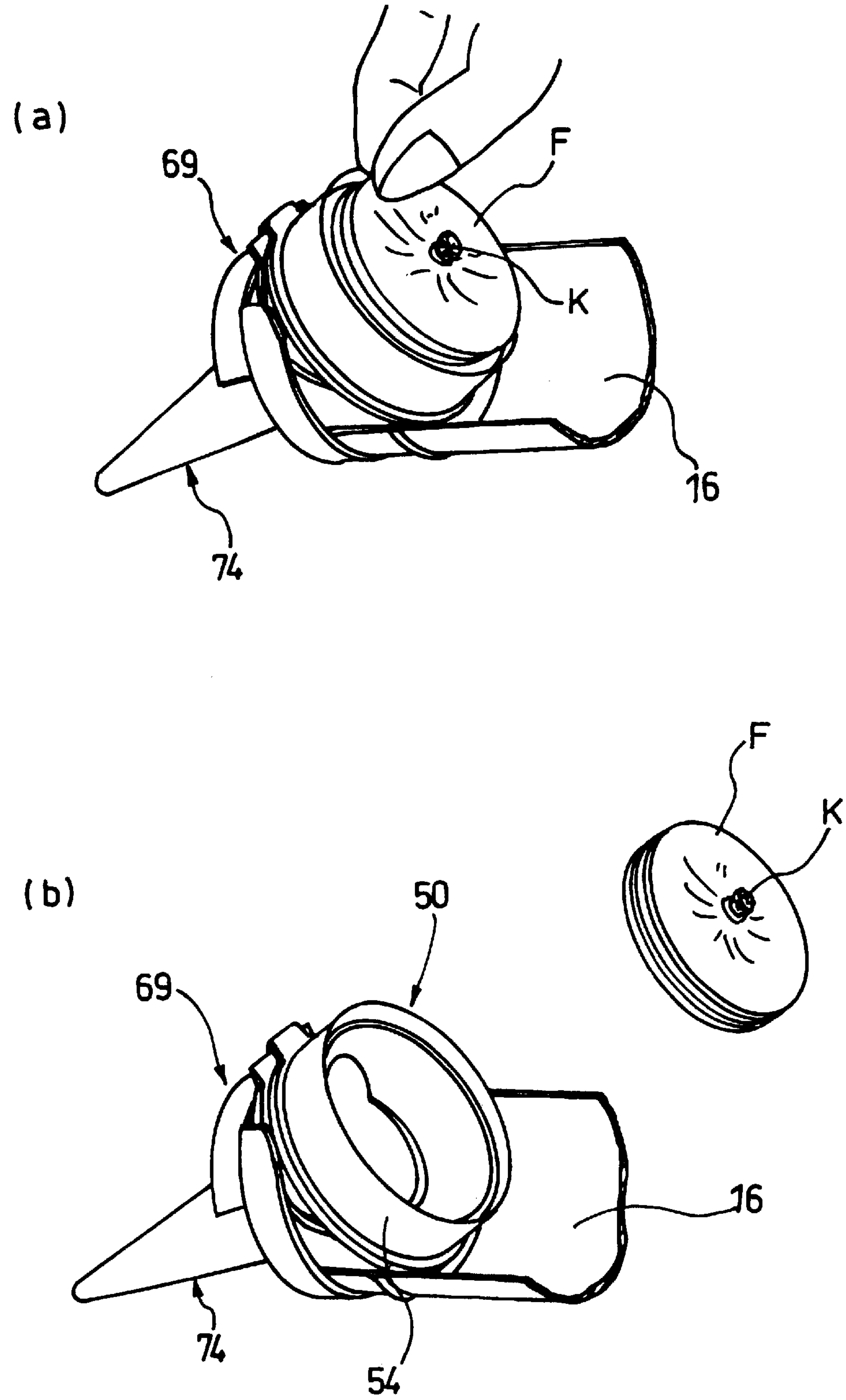
FIG. 25 is a perspective explanatory view showing a manner in which the squashed and used up tubular bag is taken out of the head adapter and discarded, wherein a part (a) shows a state where the squashed tubular bag is picked up with fingers, and a part (b) shows a state in which the squashed tubular bag is removed away from the head adapter.

A difference from the beginning of the use is that the piston body 84 is located at the front end opening portion of the cylinder body 82 as shown in FIG. 24. Since the cylinder body 82 is symmetrical bilaterally, the reversal of the cylinder body 82 may set a state completely identical to the beginning state in which the piston body 84 is located at the rear end opening portion of the cylinder 82 (FIGS. 27 and 30(*i*)).

In this state, another tubular bag F is accommodated through the front end opening portion of the cylindrical member 11 again and then the operation is carried out similarly to discharge the sealing material or the like C from another tubular bag F again by using the same cylindrical member 11. In this case, the pressing surface of the piston body 84, which is pressed by the pressing plate 42 is the second pressing surface 88*b*. The same and one cylindrical member 11 can be repeatedly used in this manner.

Even if the contents C of the tubular bag F are extruded with this operation, the inner surface of the nozzle body 74 is stained but there is no stain adhered on to the inner surface of the head adapter 50 since the inner surface of the head adapter 50 is covered completely by the nozzle body 74. After the extruding operations of predetermined times, only the stained nozzle body 74 is discarded (FIG. 30(*j*)) and a new nozzle body 74 is inserted into and attached to the head adapter 50 having no stain. In this manner, the head adapter 50 can be repeatedly used many times semi-permanently without the need of being discarded. Therefore, it is possible to reduce the waste material amount that is a factor of generating the poisonous gas such as dioxin when incinerating the waste material, to thereby serve as one of the solutions for the environmental problems.

The operation in which the integral assembly of the nozzle body 74 and the head adapter 50 is inserted into and attached to the notched portion 48 of the stationary holding plate 46 may be carried out depending on the need of the operator, and various operation procedures are conceivable. A preferable insertion and attachment operation procedures are shown in FIG. 28(*a*), (*b*), (*c*).

Figure 28:
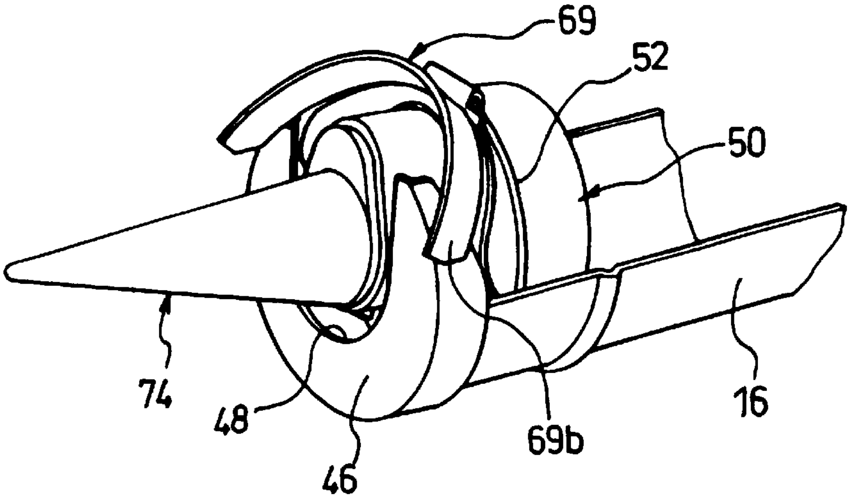
FIG. 28 is a perspective explanatory view showing a manner in which an integral assembly of the nozzle body and the head adapter is inserted and attached to the stationary holding plate of the extruding gun, wherein a part (a) shows a state in which the integral assembly of the nozzle body and the head adapter is placed on the holding base in the vicinity of the stationary holding plate, a part (b) shows a state in which the rear end portion of the annular flange of the head adapter of the state (a) is forcibly moved forward with a finger, and a part (c) shows a state in which an outer engagement piece of the head adapter is passed over an end edge portion of a notched portion and the stationary holding plate is fitted into an engagement clearance of the head adapter so that the head adapter is fitted and attached to the stationary holding plate.
Figure 28:
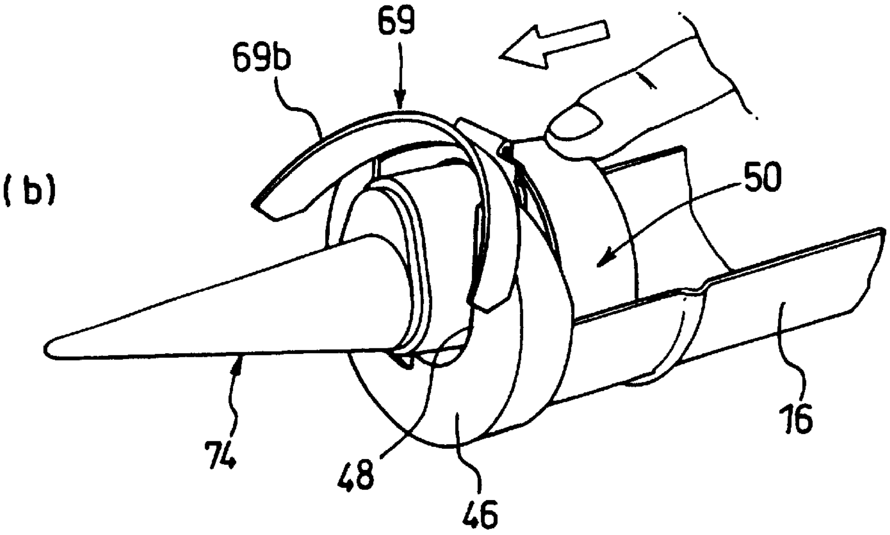
Figure 28:
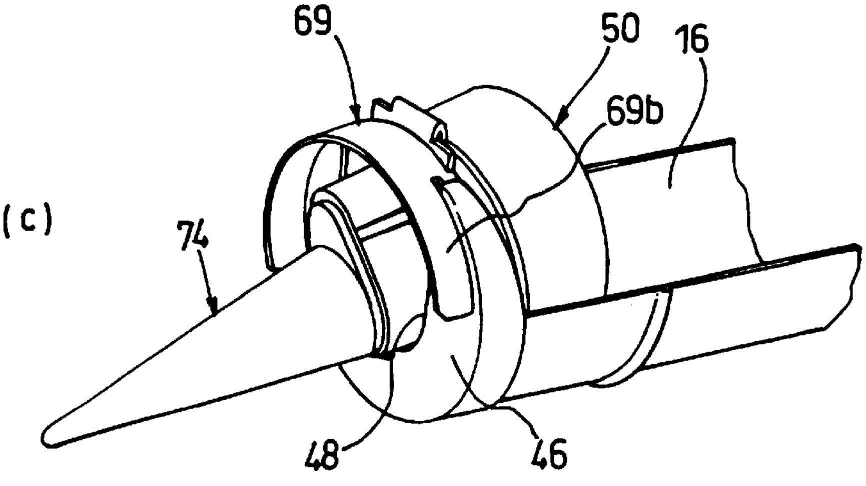

First of all, the head adapter 50 is placed on the upper surface of the holding base 16 of the extruding gun in a state where the lower surface of the outer engagement piece 69*b* of the engagement member 69 is retained on the upper end edge portions of the notched portion 48 (FIG. 28(*a*)).

Then, the rear end upper portion of the head adapter 50 is pressed forward by a finger so that the lower surface portion of the head adapter 50 is slid on the upper surface of the holding base 16 and concurrently the lower surface of the outer engagement piece 69*b* is slid on the upper end edge portions of the notched portion 48 (FIG. 28(*b*)).

From the state shown in FIG. 28(*b*), the head adapter 50 is pressed further forward, so that the outer engagement piece 69*b* is passed over the upper end edge portions of the notched portion 48, whereby the upper end edge portions of the notched portion 48 is advanced into and engaged with the engagement clearance 69*d* (FIG. 28(*c*)).

At this time, the head adapter 50 is attached to the stationary holding plate 46 in a state that the outer surface side of the base plate 52 of the head adapter 50 is positioned at the inner surface side of the stationary holding plate 46.

The operation in which the head adapter 50 inserted into and attached to the stationary holding plate 46 is removed from the stationary holding plate 46 may be carried out depending on the need of the operator. A preferable removal operation procedures are shown in FIG. 29(*a*), (*b*), (*c*).

Figure 29:
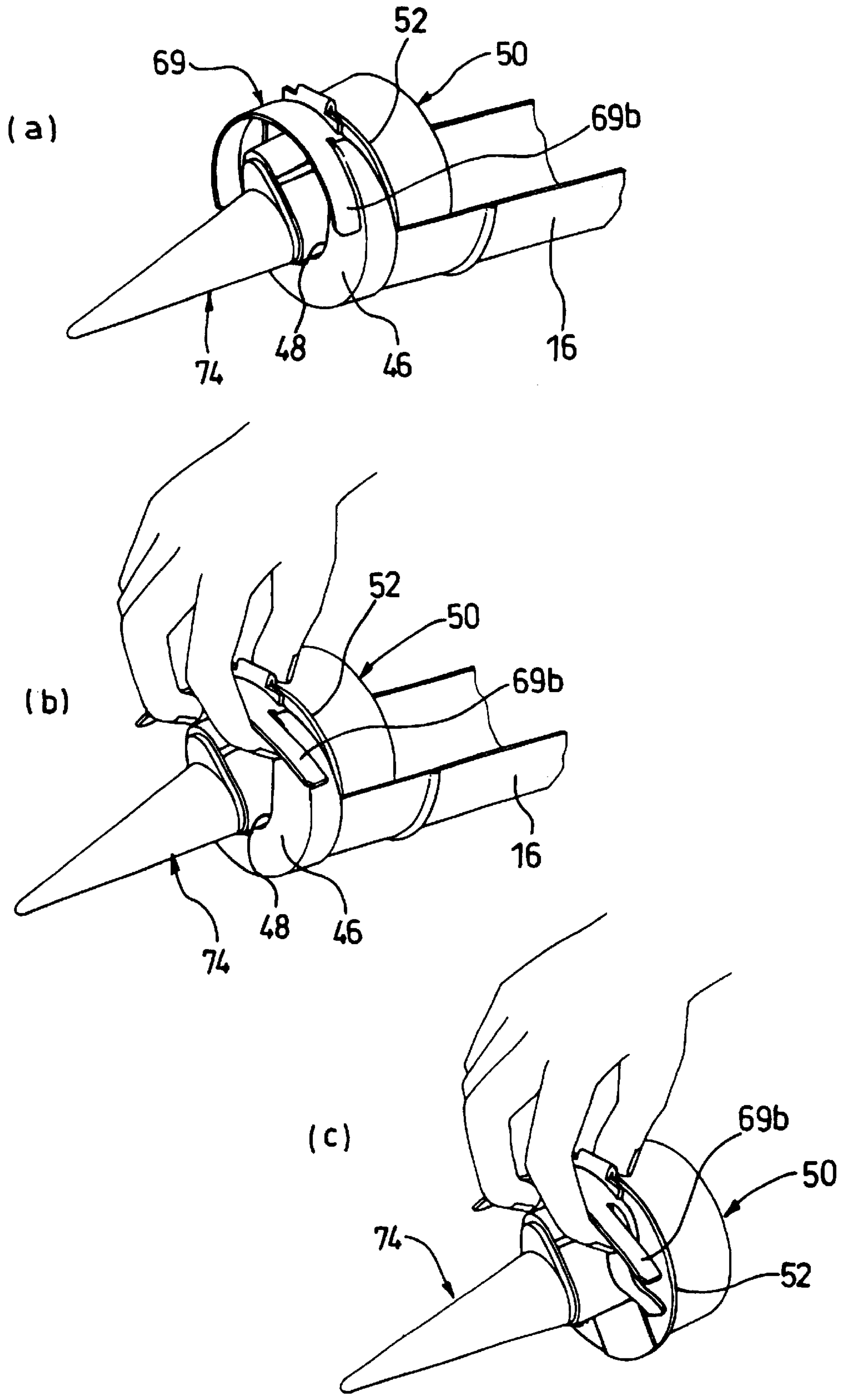
FIG. 29 is a perspective explanatory view showing a manner in which the integral assembly of the nozzle body and the head adapter inserted and attached to the stationary holding plate of the extruding gun is removed, wherein a part (a) shows a state in which the integral assembly of the nozzle body and the head adapter is inserted and attached to the stationary holding plate, a part (b) shows a state in which both end portions of the outer engagement piece of the head adapter are deformed upward with fingers, and a part (c) shows a state in which the head adapter and nozzle body in the state (b) are removed away from the stationary holding plate.

First of all, to the head adapter 50 inserted into and attached to the stationary holding plate 46 (FIG. 29(*a*)), an upward force is applied through both end portions of the outer engagement piece 69*b* with two fingers in a state where the central portion of the outer engagement piece 69*b* is pressed downward with thumb, to thereby displace both the end portions of the outer engagement piece 69*b* upward above the upper end edge portions of the notched portion 48 of the stationary holding plate 46 (FIG. 29(*b*)).

Then, the head adapter 50 is moved upward and rearward with both the end portions of the outer engagement piece 69*b* remaining displaced upward. The head adapter 50 and the nozzle body 74 are readily removed from the stationary holding plate 46 in this manner (FIG. 29(*c*)).

In connection with the embodiment described above, an example of the mounting of the nozzle body 74 to the head adapter 50 is shown, in which the base end outer surface portion of the nozzle body 74 has a shape corresponding to a shape of the inner surface of the base plate 52, the nozzle body 74 is inserted into the opening portion 58 of the base plate 52 from the inner side of the base plate 52, and the nozzle body 74 is attached to the head adapter 50 by fitting the inner surface side of the base plate 52 to the base end outer surface portion of the nozzle body 74. The manner of mounting the nozzle portion 74 to the head adapter 50 is not limited to the above example, and various other manners are applicable. FIGS. 31 to 41 show another embodiment of the present invention. In FIGS. 31 to 41, components identical with or similar to the components shown in FIGS. 1 to 30 are denoted by the same reference numerals. In FIGS. 31 to 41, components identical with or similar to the components shown in FIGS. 1 to 30 are denoted by the same reference numerals. The embodiments shown in FIGS. 31 to 41 are similar to those in FIGS. 1 to 30 in basic structures, so that a repeated description therefor is omitted here and only characterizing portions will be described hereafter.

In FIGS. 31 to 41, the head adapter 50 has a base plate 52 brought into contact with the inner surface side of the stationary holding plate 46 (FIGS. 35 to 38). Reference numeral 54 designates an annular flange portion formed on the inner surface side of the base plate 52. The annular flange portion 54 is formed to have an outer diameter slightly smaller than an inner diameter of the cylindrical member 11 so that it can be inserted into and brought into contact with an opening end portion of the cylindrical member 11. Reference numeral 58 designates an opening portion formed at a central portion of the base plate 52. Also, the outer diameter of the annular flange portion 54 may be slightly larger than the inner diameter of the cylindrical member 11 so as to permit the cylindrical member 11 to be inserted into and brought into contact with the annular flange portion 54. Further, the provision of the annular flange portion 54 may be omitted as far as the contact state between the base plate 52 and the cylindrical member 11 can be established without hindrance.

Reference numeral 62 designates a stepped portion formed on the outer surface side of the base plate 52. The stepped portion 62 has such a configuration as to permit the insertion of the notched portion 48 of the stationary holding plate 46 from the central portion of the base plate 52, and is protruded outward. Reference numeral 64 designates a stepped portion space which is formed on the inner surface side of the base plate 52 correspondingly to the stepped portion 62.

A wall surface connecting the annular flange portion 54 to a stepped portion space 64 is formed as a slope surface, and a dome-like receiving slope surface 55 is formed to facilitate to receive the leading end circular portion of the tubular bag F. Hence, the leading end portion of the tubular bag F is smoothly received by the receiving slope surface 55, thereby making it smoother to carry out the extruding operations of the tubular bag F.

Figure 35:
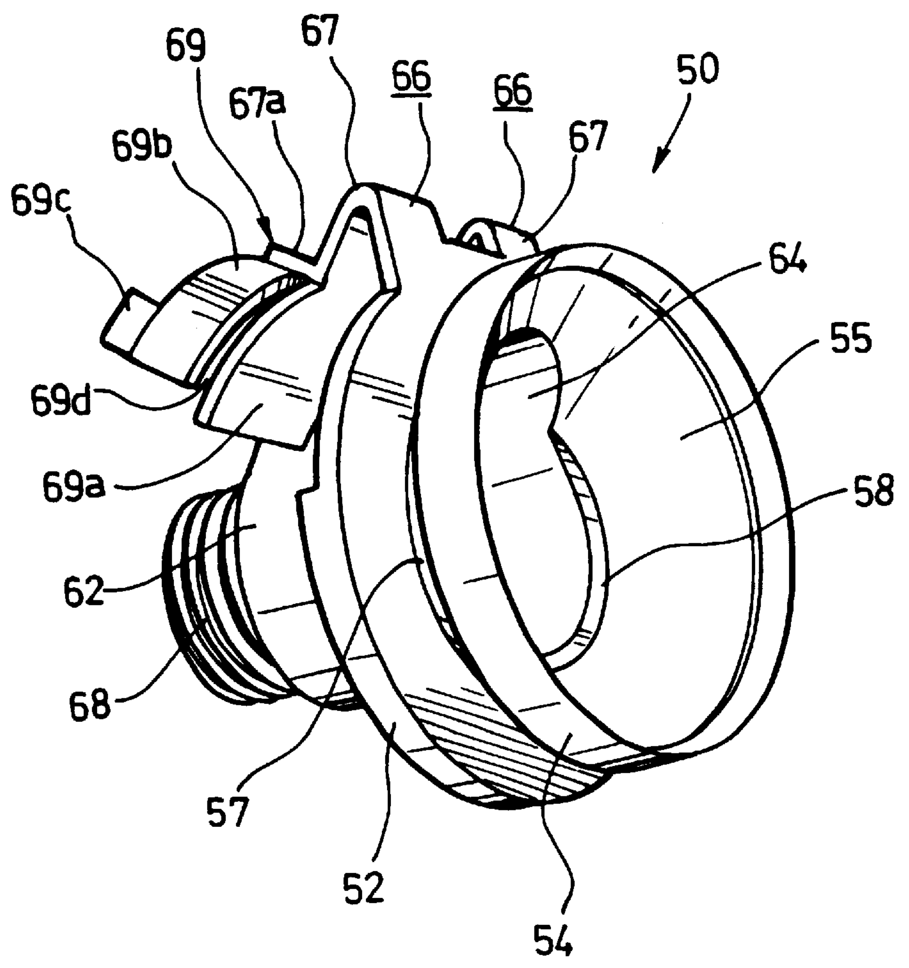
FIG. 35 is a partial, enlarged perspective view showing an example of the head adapter as viewed from the inner surface side thereof.
Figure 36:
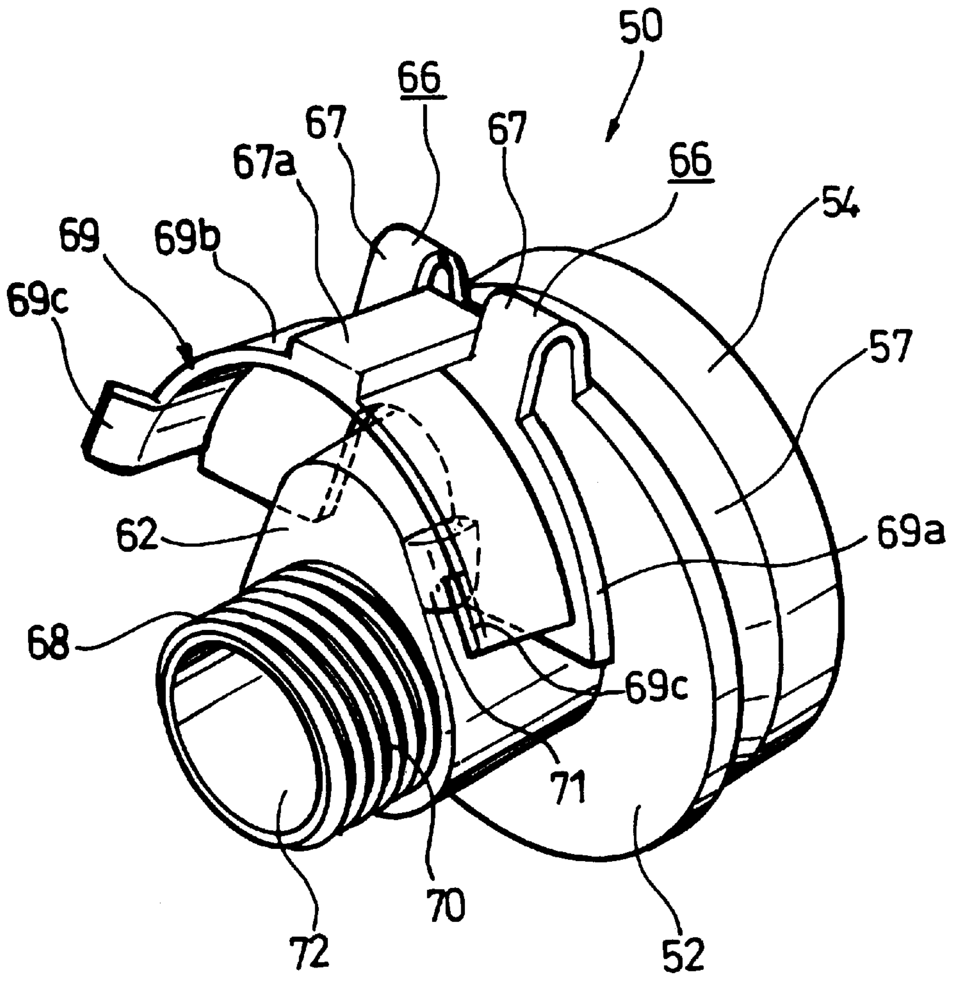
FIG. 36 is a partial, enlarged perspective view showing the head adapter viewed from the outer surface side thereof.
Figure 37:
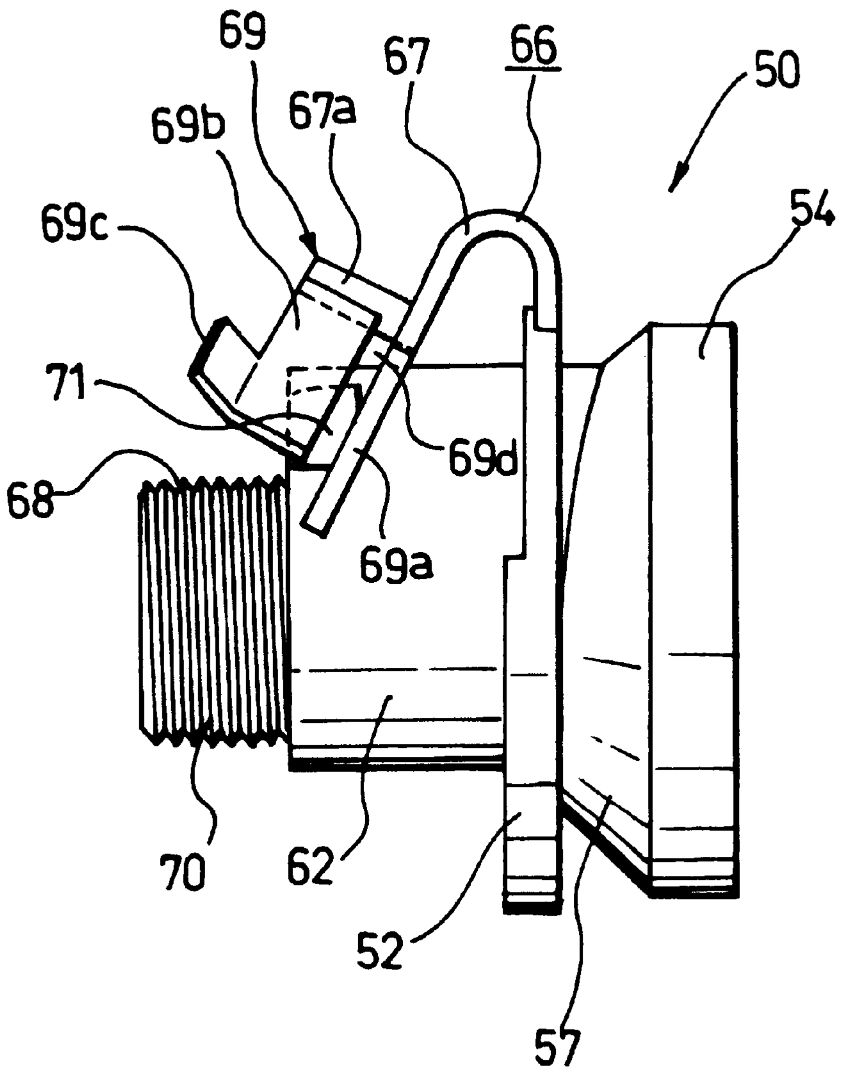
FIG. 37 is a side view of the head adapter of FIG. 35.
Figure 38:
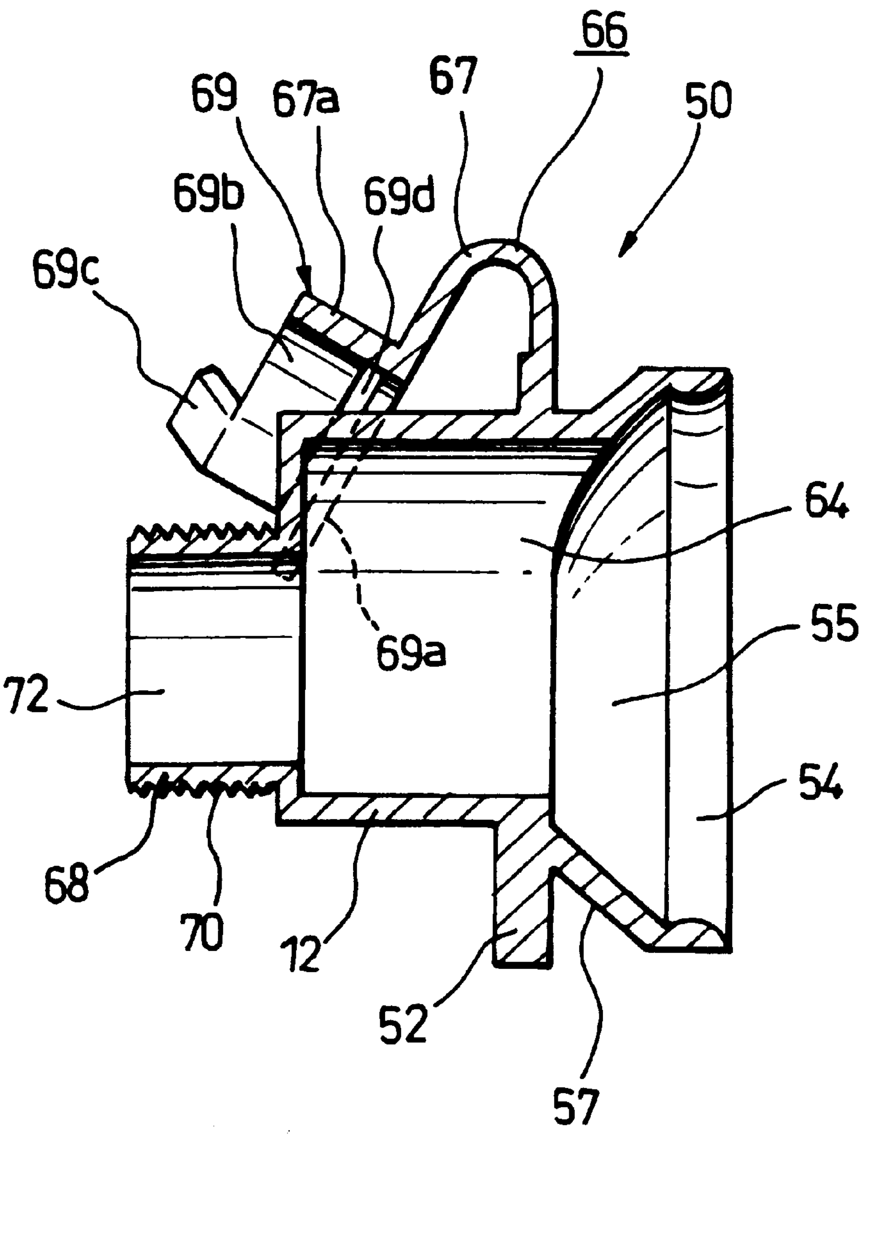
FIG. 38 is a sectional view of FIG. 37.

Although the annular flange portion 54 and the base plate 52 may be connected together through a planar outer circumferential surface, in order to avoid a disadvantage in which the receiving slope surface 55 portion becomes thick and excess materials therefor are required, as shown in FIGS. 35 and 36, an annular carved portion 57 is formed at the outer circumferential side of the receiving slope surface 55, so that the thickness of the receiving slope surface 55 portion is reduced to save the material cost as well as to make the weight lighter.

Reference numeral 66 designates a spring means provided on the upper portion of the base plate 52. The spring means 66 has a bent spring piece 67 attached to the upper end portion of the base plate 52 and bent outward. An engagement member 69 is provided on the leading end of the bent spring piece 67, and the engagement member 69 has a pair of inner engagement piece 69*a* and outer engagement piece 69*b* opposite to each other to define an engagement clearance 69*d* for clamping and engaging both end edge portions of the notched portion 48.

Each of the inner engagement piece 69*a* and the outer engagement piece 69*b* may be in any configurations and should not be limited to a particular configuration as far as they can form the engagement member 69 for clamping and engaging both the end edge portions of the notched portion 48. In the illustrated example, an inverted-U-shaped planar plate member formed by elongating the leading end portion of the bent spring piece 67 in a bifurcated manner is used as the inner engagement piece 69*a*. As the outer engagement piece 69*b*, an inverted-U-shaped curved plate the upper end portion of which is connected through a connection piece 67*a* to the upper portion of the inner engagement piece 69*a* in a manner opposing to the inner engagement piece 69*a* is used. In addition, reference numeral 69*c* designates ears provided on the front surface sides of both the lower end portions of the outer engagement piece 69*b*, which facilitate the handling operation of the outer engagement piece 69*b* when handling it.

Reference numeral 71 designates stoppers which are protrusively provided on both sides of the leading end upper portion of the stepped portion 62. The leading end portions of the bent spring piece 67 are retained on the stoppers 71 so that the spring action of the bent spring piece 67 acts toward the base plate 52.

Hence, if the head adapter 50 is rotatably mounted to the stationary holding plate 46 in a state that engagement member 69 of the spring piece 67 is engaged with both the end edge portions of the notched portion 48, the inner surface of the base plate 52 of the head adapter 50 is constantly urged by the spring action of the bent spring piece 67 to be turned obliquely upward.

Reference numeral 68 designates a nozzle body mounting portion protrusively provided on the leading end portion of the stepped portion 62. A male screw portion 70 is formed on the outer circumferential surface of the nozzle body mounting portion 68, and a through hole 72 is formed through the inside of the nozzle body mounting portion 68 to be communicated with the stepped portion space 64. The stepped portion space 64 is made larger than the through hole 72.

Therefore, since the caulking portion K left on the leading end portion as a result of the opening of the tubular bag F is accommodated within the stepped portion space 64, there is no fear that the caulking portion K will clog the through hole 72 and the through discharge passage 80.

Figure 31:
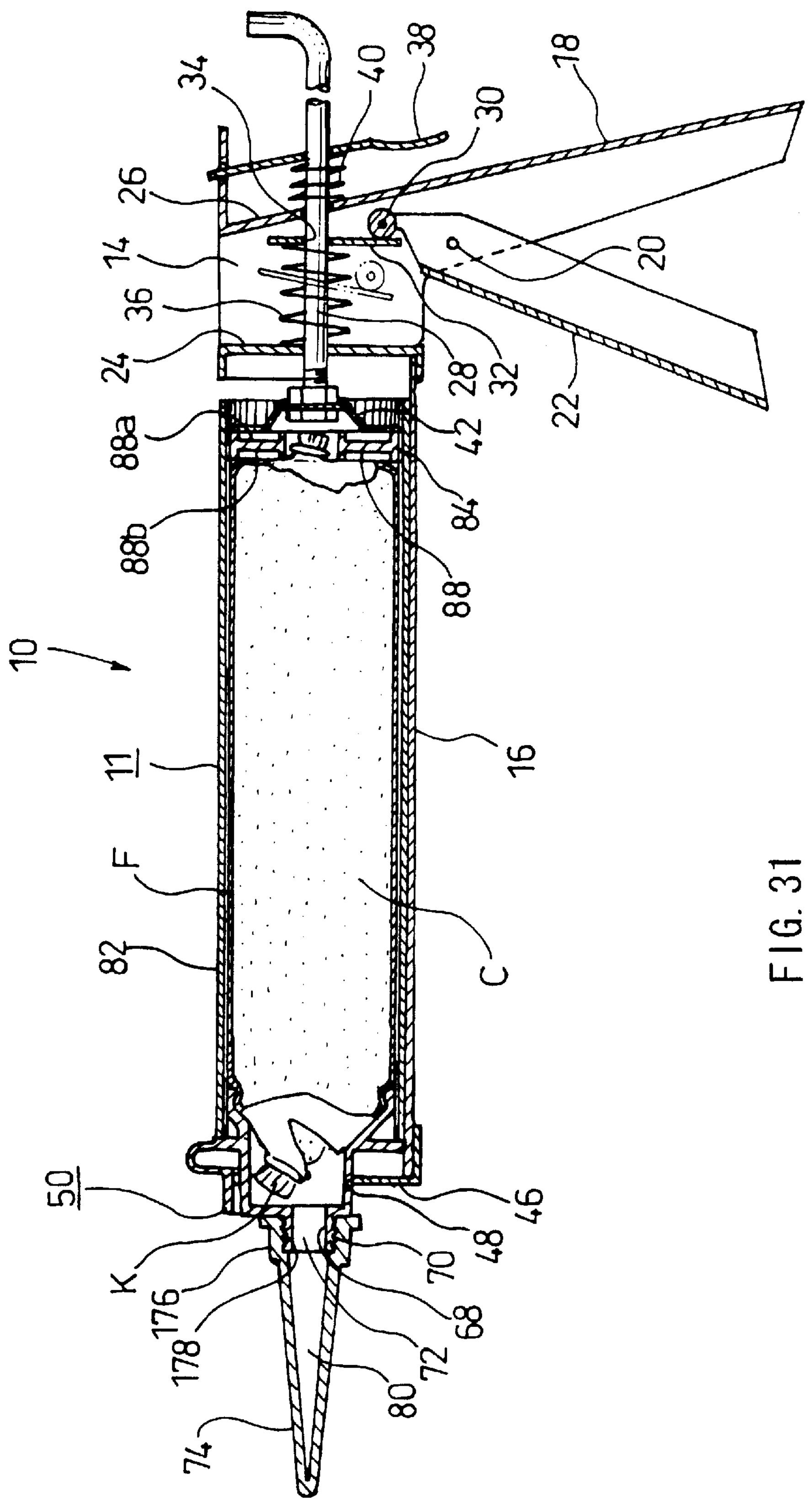
FIG. 31 is a sectional explanatory view showing a state in which the cylindrical member having the tubular bag built-in is placed on the extruding gun in a second embodiment of the extruding mechanism for the tubular bag according to the present invention.
Figure 32:
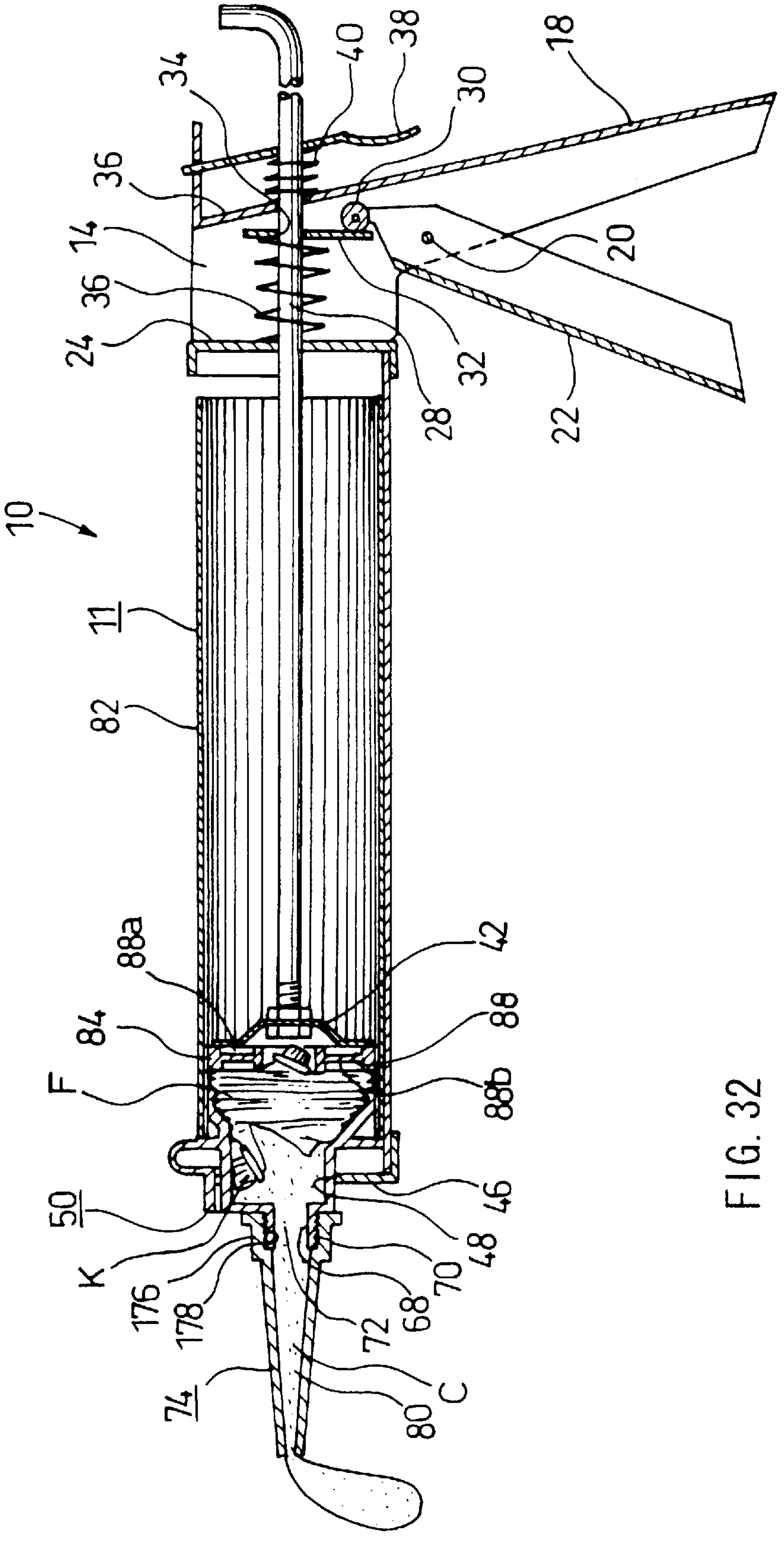
FIG. 32 is a sectional explanatory view showing a state in which from the state shown in FIG. 31 the tubular bag is pressed to discharge all of the contents therefrom.
Figure 33:
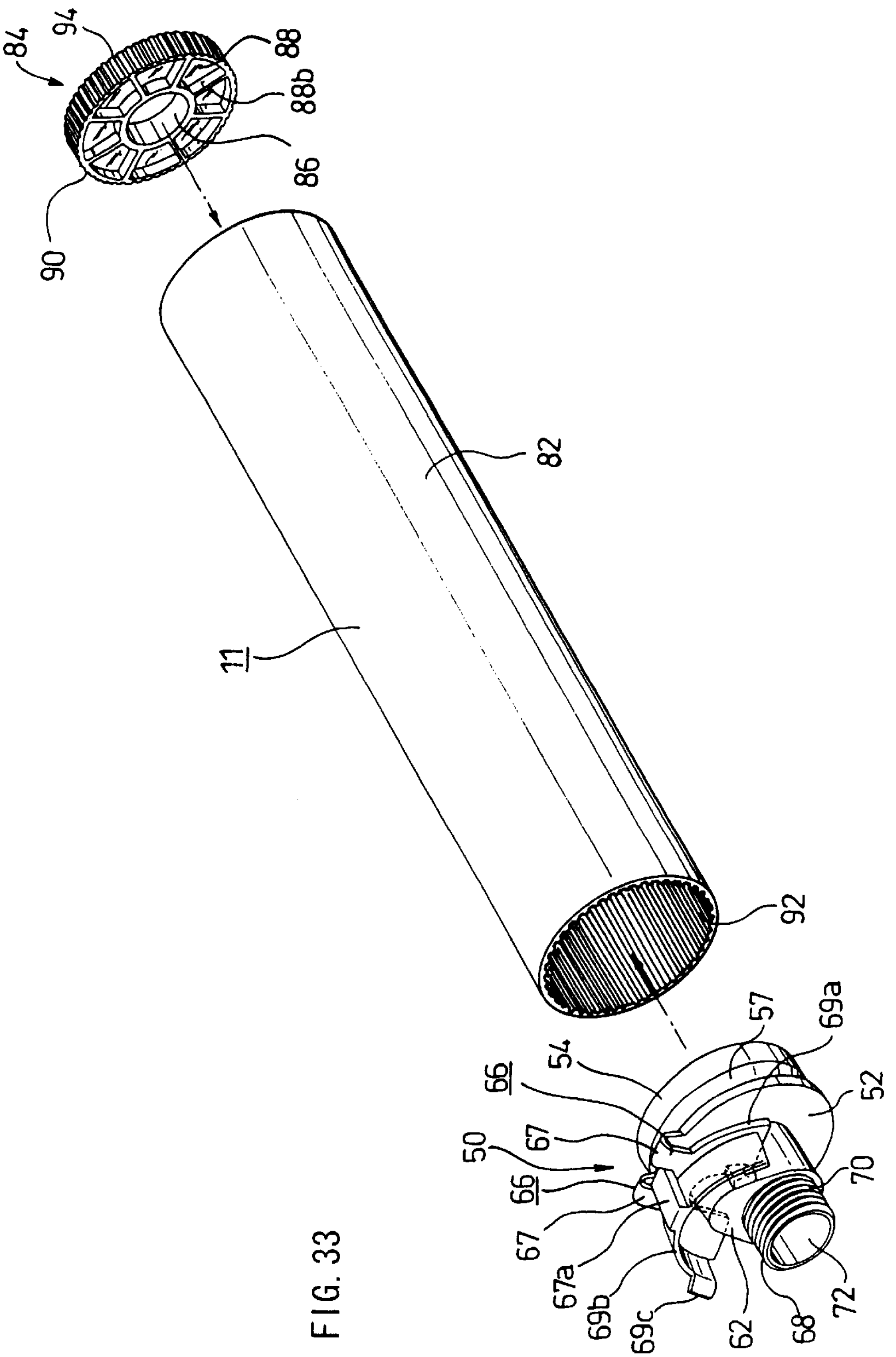
FIG. 33 is a perspective explanatory view showing a relationship among the head adapter, a partially cutaway cylindrical member and the piston body.
Figure 34:
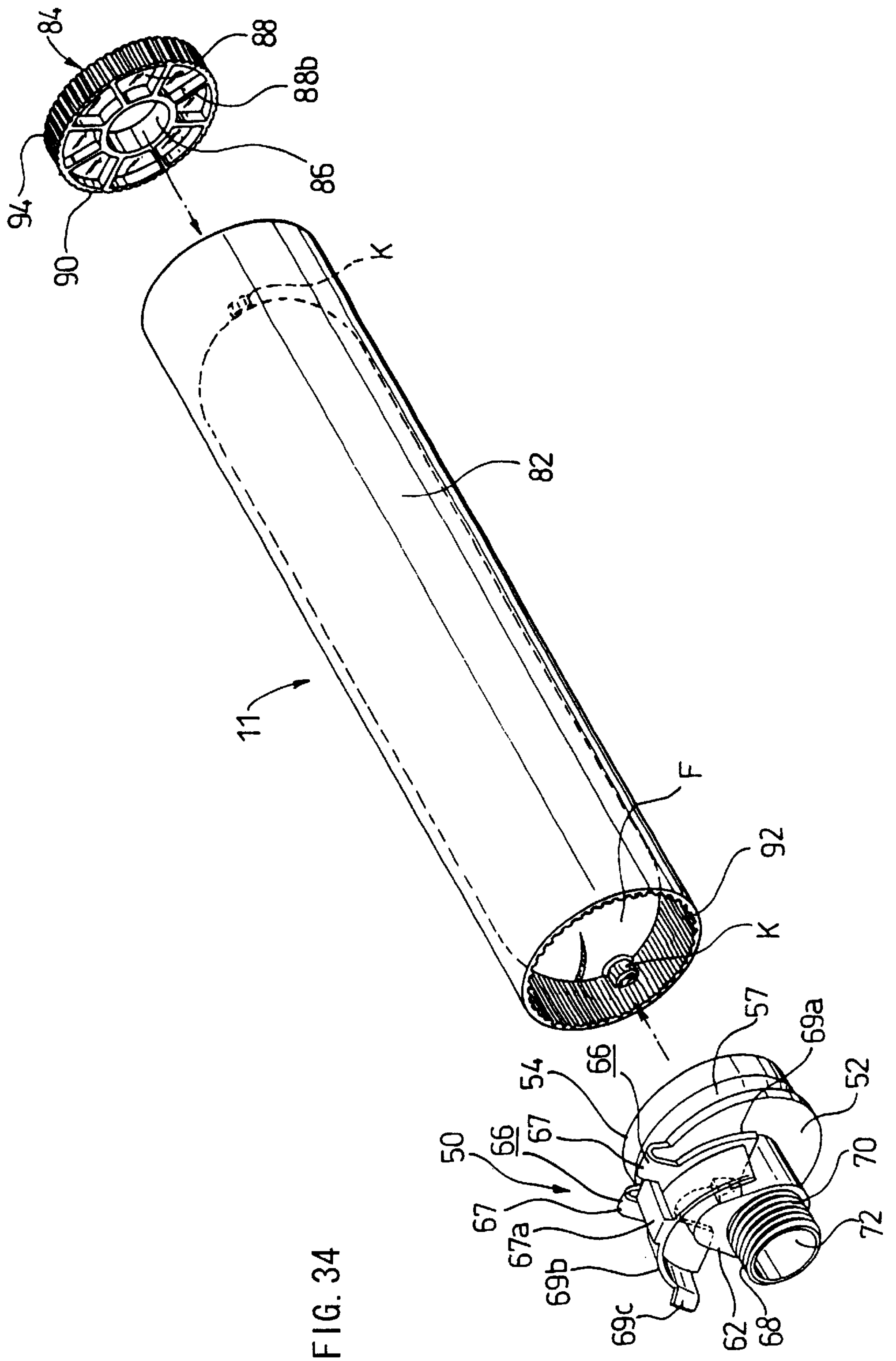
FIG. 34 is a perspective explanatory view showing a state in which the tubular bag is accommodated within the cylindrical member in the state shown in FIG. 33.
Figure 39:
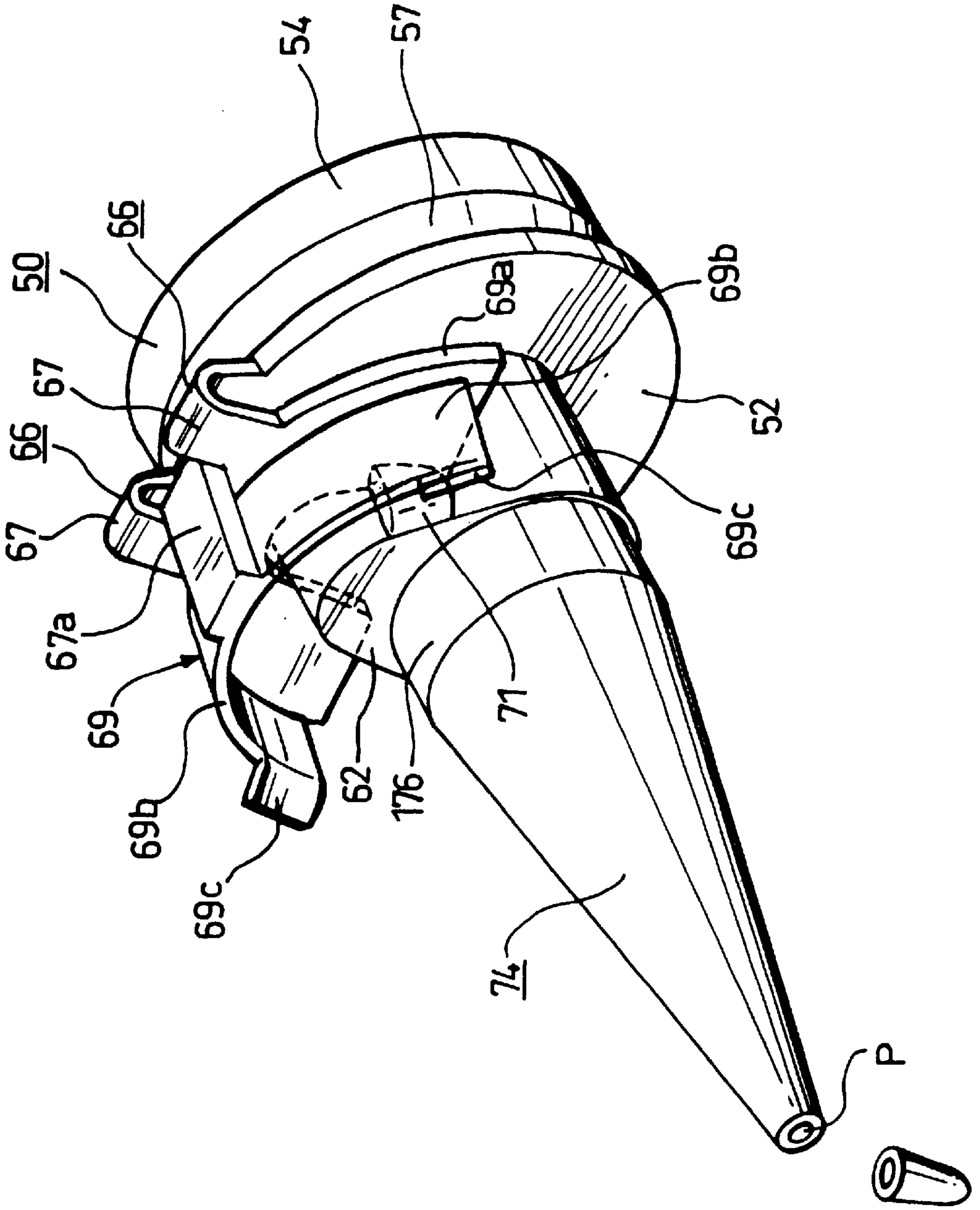
FIG. 39 is a partial, enlarged perspective view showing a state in which the nozzle body is inserted and attached to the head adapter.
Figure 40:
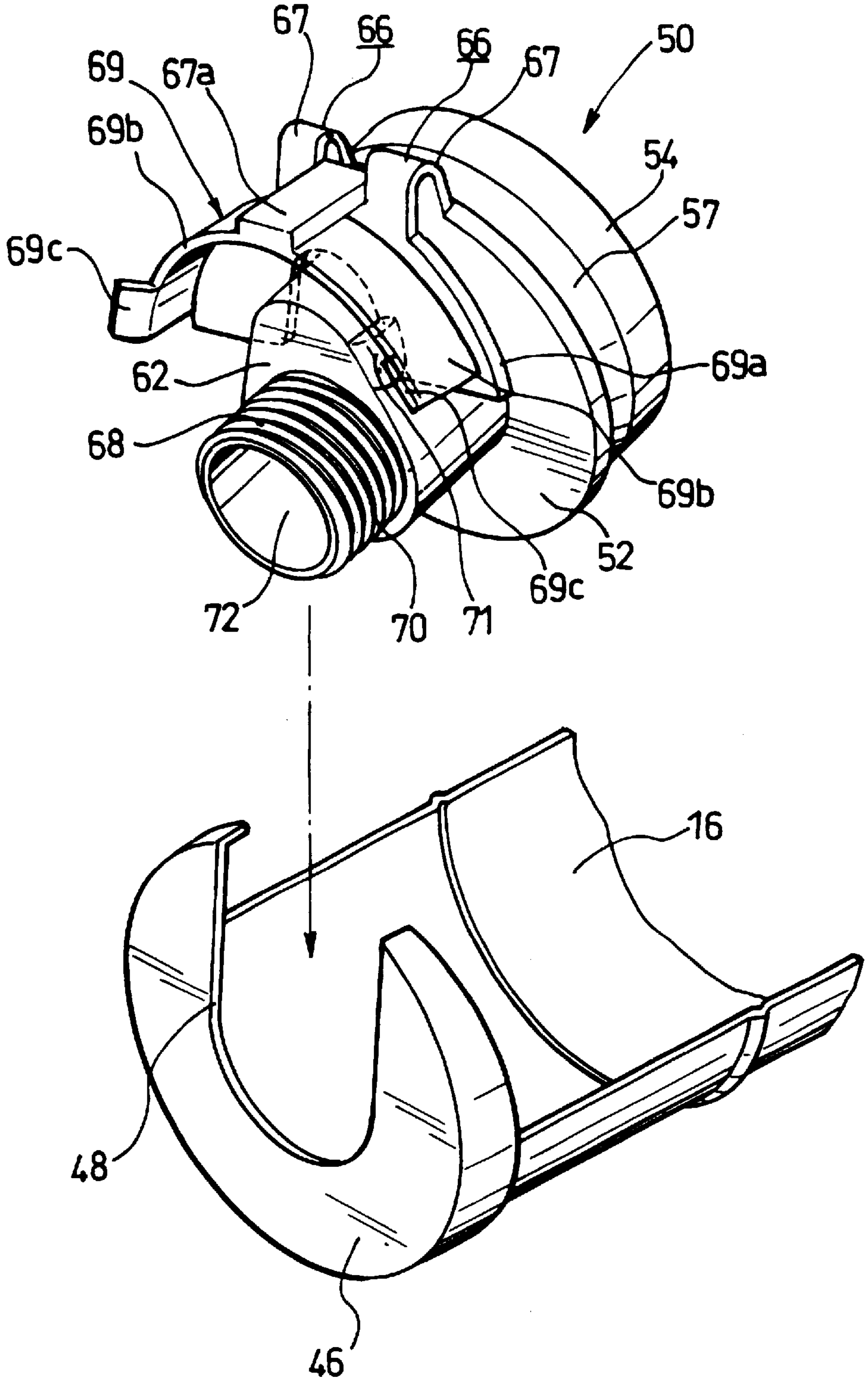
FIG. 40 is a partial, enlarged perspective view showing a state before the insertion and attachment operation of the head adapter to the stationary holding plate is to be initiated.
Figure 41:
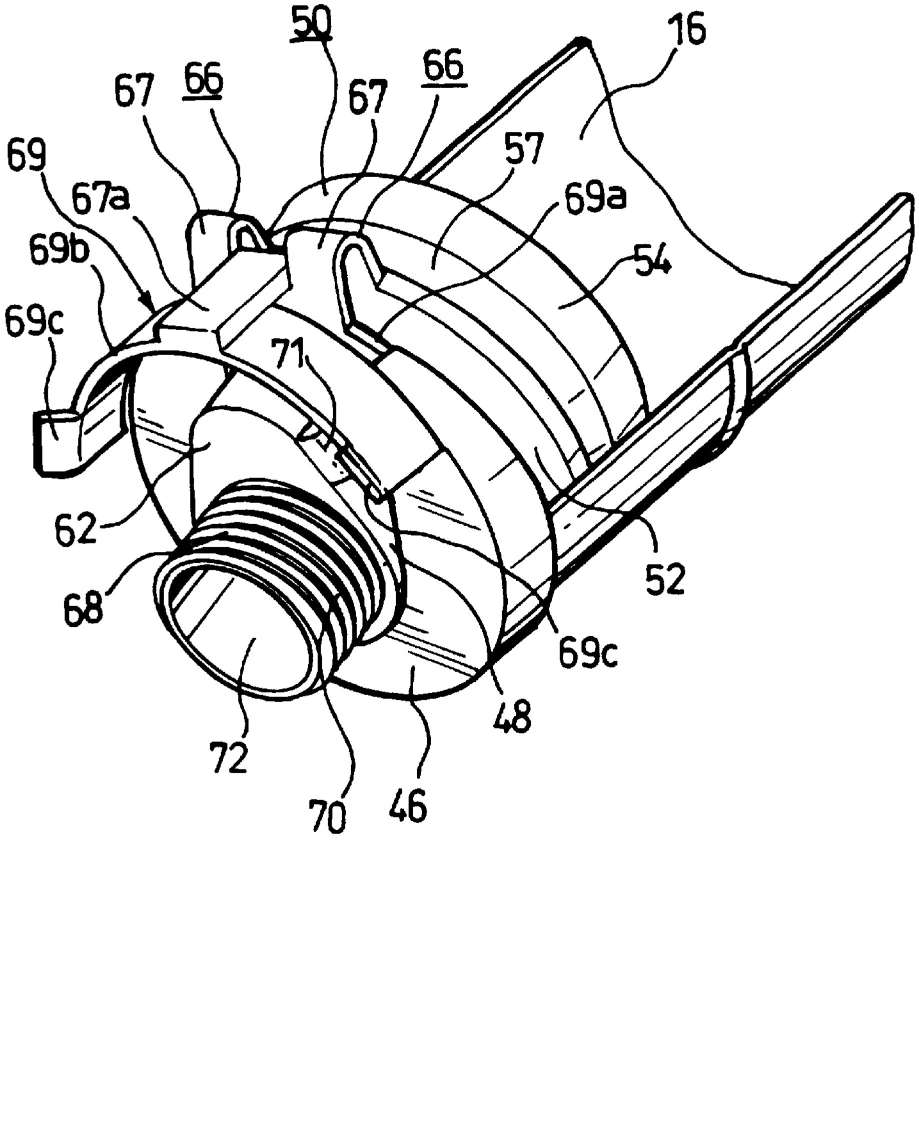
FIG. 41 is a partial, enlarged perspective view showing a state in which the insertion and attachment operation of the head adapter to the stationary holding plate is completed.

Reference numeral 74 designates a nozzle body formed conically. An annular flange 176 is provided on the base end of the nozzle body 74 along the entire circumference thereof (FIG. 39). A female screw portion 178 is formed on the inner circumferential surface of the flange 176 so as to be threadedly engaged with the male screw portion 70 provided on the outer circumferential surface of the nozzle body mounting portion 68 (FIGS. 31 and 32).

The nozzle body 74 can be attached to the head adapter 50 by threadedly engaging the nozzle body 74 with the nozzle body mounting portion 68. The through discharge passage 80 is formed through the inside of the nozzle body 74 so as to be communicated with the through hole 72.

When using, the leading end portion of the nozzle body 74 is cut to form a discharge hole P at the leading end of the through discharge passage 80 of the nozzle body 74 as shown in FIG. 39. Although in the illustrated example the nozzle body 74 is removably attached to the head adapter 50, the nozzle body 74 and the head adapter 50 can, of course, be integrally formed together.

In the embodiments described above, a case in which the engagement member 69 is attached to the base plate 52 through the bent spring plate 67 is explained as a preferable example. However, it is not necessary to constantly urge the engagement member 69 by the bent spring piece 67 so that the inner surface of the base plate 52 is turned obliquely upward. For example, it is possible to adopt an arrangement in which the engagement member 69 is simply attached rotatably to the base plate 52 with a hinge means or the like. In this case, the removal and the attachment operation of the cylinder body 82 can be carried out by manually turning the inner surface of the base plate 52 obliquely upward in accordance with necessity of the operation.

In the embodiments described above, a manner in which the head adapter 50 is attached to both the end edge portions of the notched portion 48 of the stationary holding plate 46 so as to be rotatable up and down is explained. However, in the present invention, it is not necessary to rotate up and down the head adapter 50. For example, it is possible to adopt an arrangement in which the head adapter is not rotatable as shown in FIGS. 42 to 46.

In FIGS. 42 to 46, a pair of the spring members 62*a*, 62*a* are provided on the leading end portions of the stepped portion 62. The spring members 62*a*, 62*a* serve to provide the urging force toward the base end. The spring members 62*a*, 62*a* constantly press the outer surface of the stationary holding plate 46 in a state where the head adapter 50 is attached to the stationary holding plate 46, to thereby securely fix the head adapter 50 to the stationary holding plate 46, and prevent idle movement or removal thereof.

Figure 42:
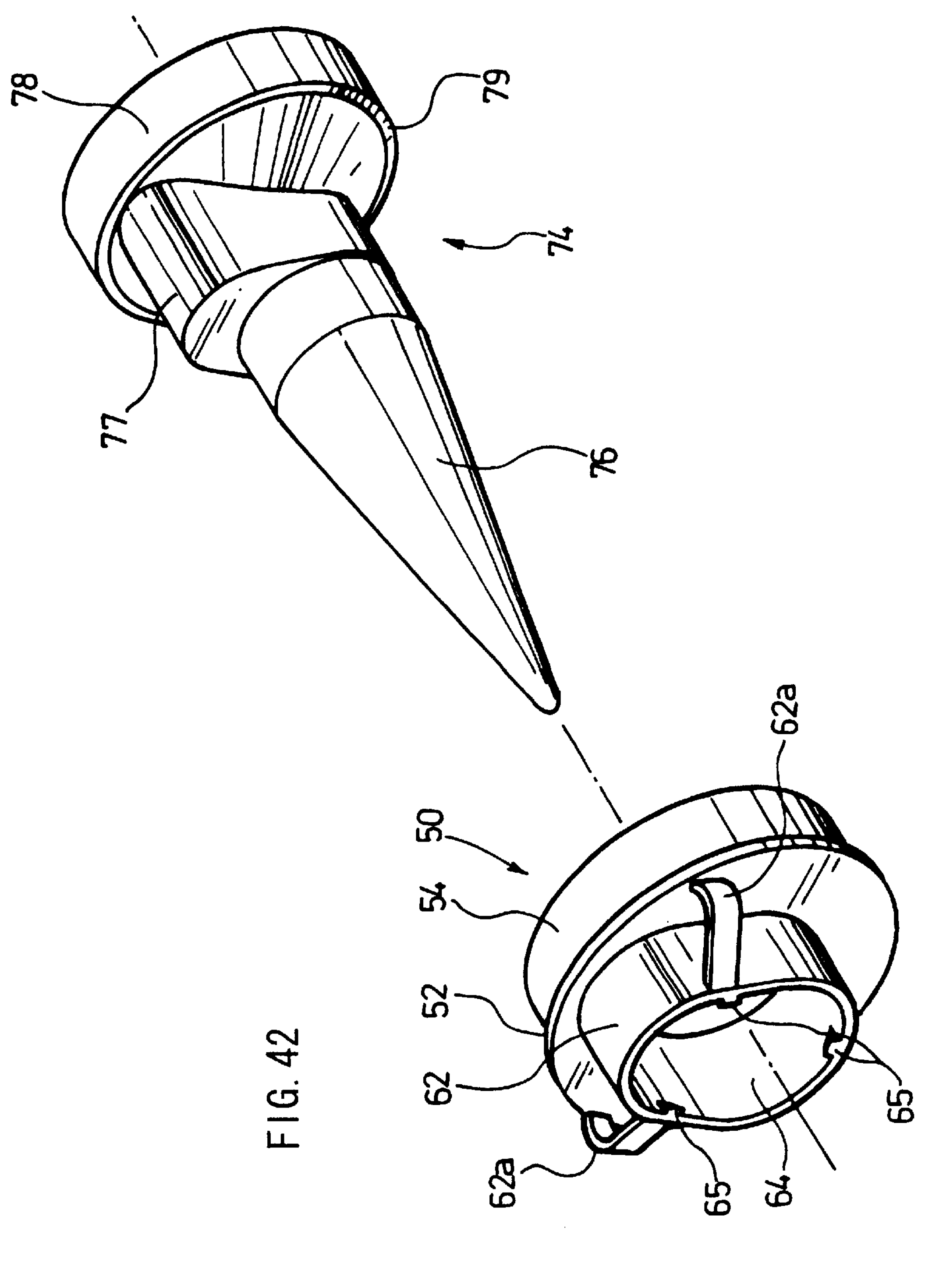
FIG. 42 is a perspective explanatory view showing another example of the head adapter together with the nozzle body.
Figure 43:
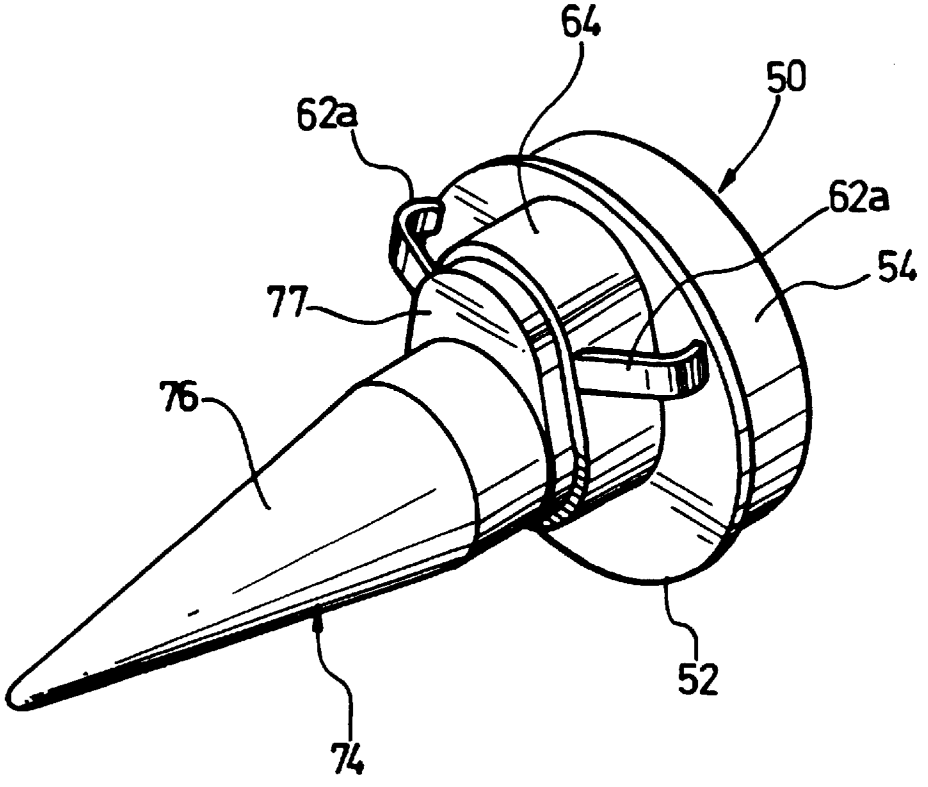
FIG. 43 is a perspective explanatory view showing a state in which the nozzle body is inserted and attached to the head adapter shown in FIG. 42.

As shown in FIGS. 42 to 43, the nozzle body 74 is first inserted into and attached to the head adapter 50 so that they are integral with each other. This integral assembly of the nozzle body 74 and the head adapter 50 is inserted into and attached to the stationary holding plate 46 in a state that the stepped portion 62 is inserted into and placed on the notched portion 48 of the stationary holding plate 46 and the base plate 52 is closely contacted with the inner surface side of the stationary holding plate 46.

Figure 44:
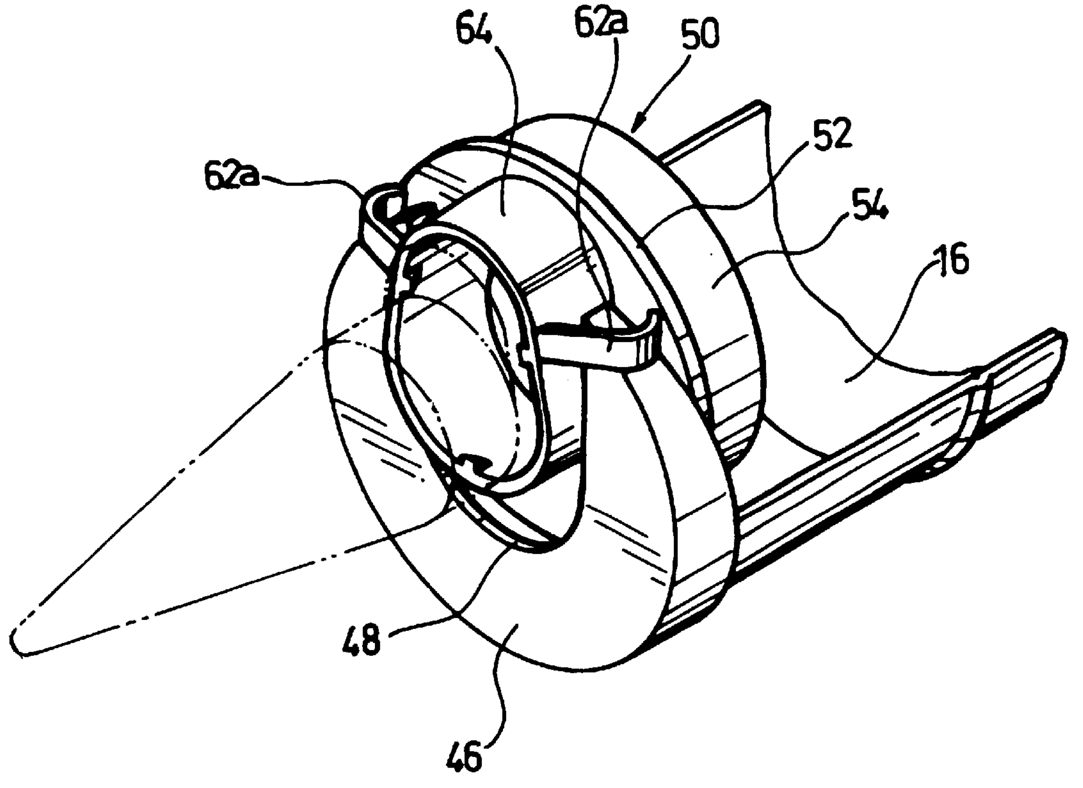
FIG. 44 is a perspective explanatory view showing a state in which the insertion and attachment operation of the nozzle body and the head adapter to the stationary holding plate is initiated.
Figure 45:
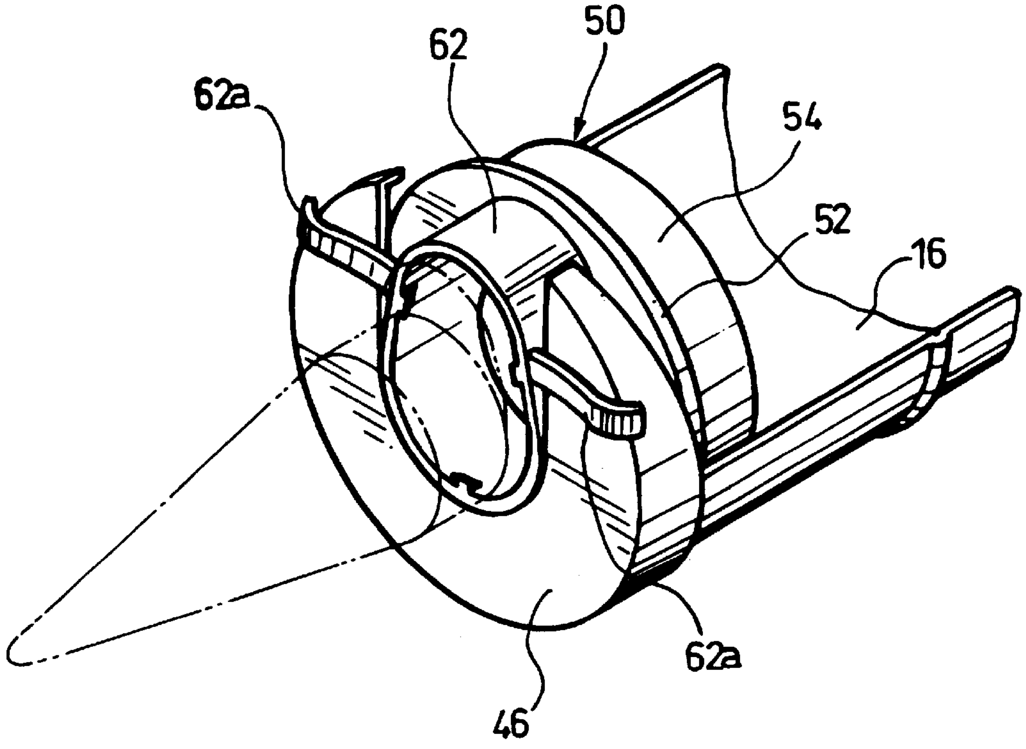
FIG. 45 is a perspective explanatory view showing a state in which the nozzle body and the head adapter shown in FIG. 43 are being inserted and attached to the stationary holding plate.
Figure 46:
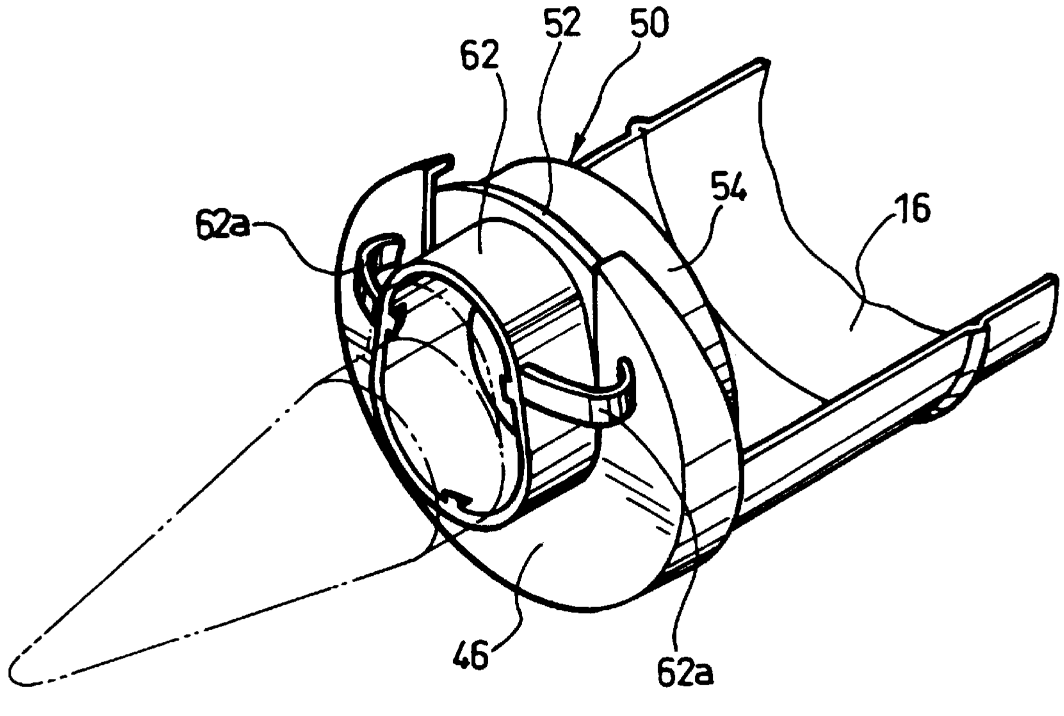
FIG. 46 is a perspective explanatory view showing a state in which nozzle body and the head adapter shown in FIG. 43 are completely inserted and attached to the stationary holding plate.

Procedures for inserting and attaching the head adapter 50 to the notched portion 48 of the stationary holding plate 46 are shown in FIGS. 44 to 46. By forcibly inserting the head adapter 50 downward such that the stepped portion 62 is inserted into the notched portion 48, the head adapter 50 is inserted into and attached to the stationary holding plate 46 in a state that the spring members 62*a*, 62*a* press and urge the outer surface of the stationary holding plate 46. In this case, since the spring member 62*a*, 62*a* constantly press the outer surface of the stationary holding plate 46, it is possible to prevent idle movement or removal of the head adapter 50.

In addition, it is possible to position the head adapter 50 on the inner surface side of the stationary holding plate 46 without using the spring members 62*a*, 62*a*, and therefore the provision of the spring members 62*a*, 62*a* may be omitted.

Figure 47:
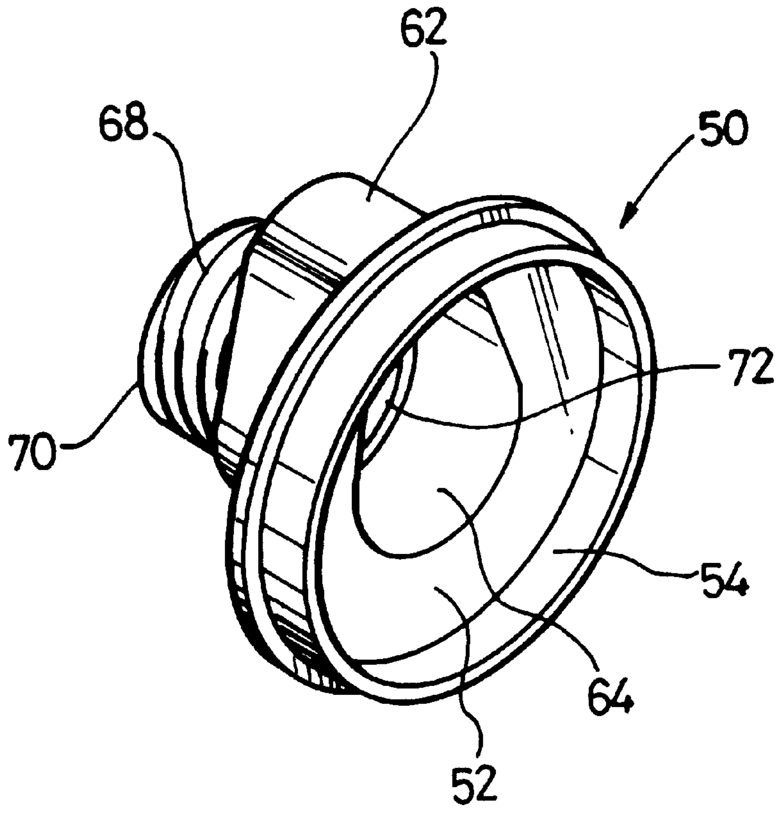
FIG. 47 is a perspective explanatory view showing another embodiment of the head adapter together with the nozzle body.
Figure 48:
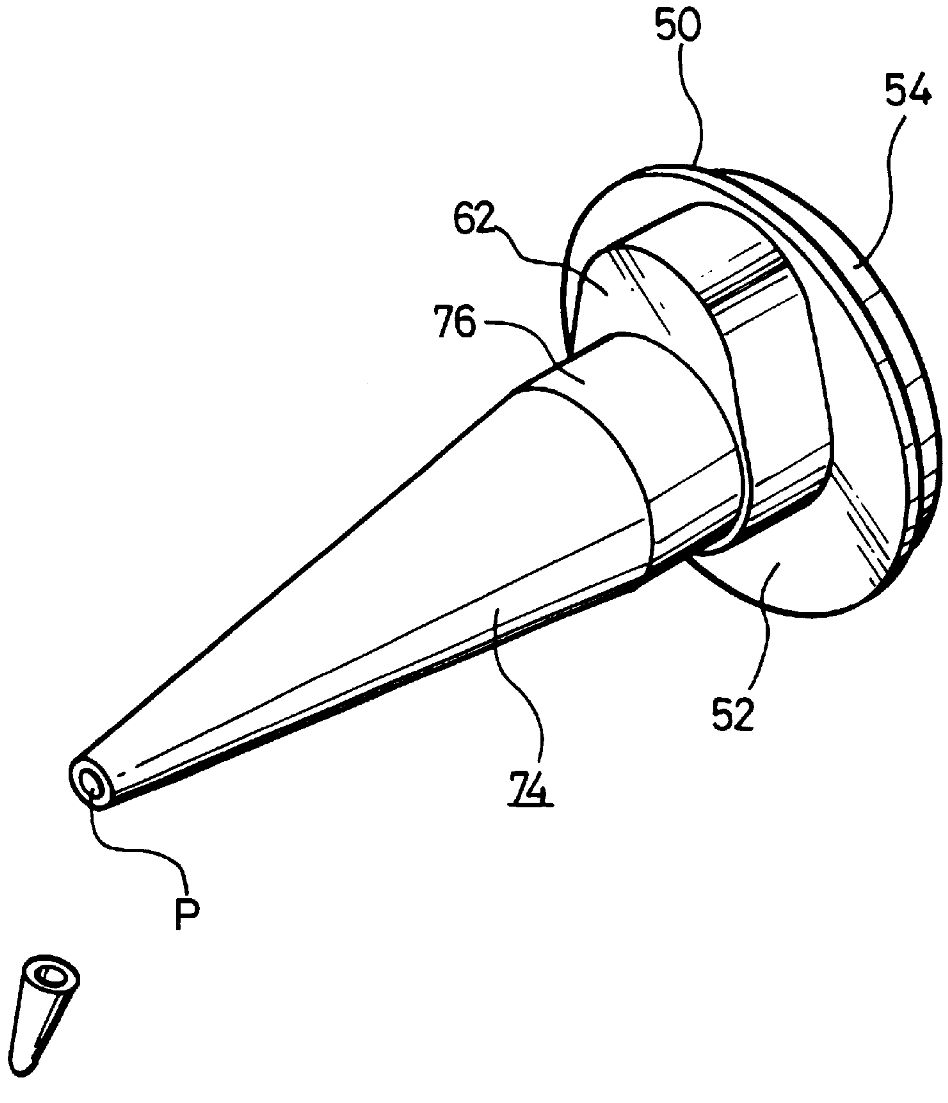
FIG. 48 is a perspective explanatory view showing a state in which nozzle body is inserted and attached to the head adapter shown in FIG. 47.
Figure 49:
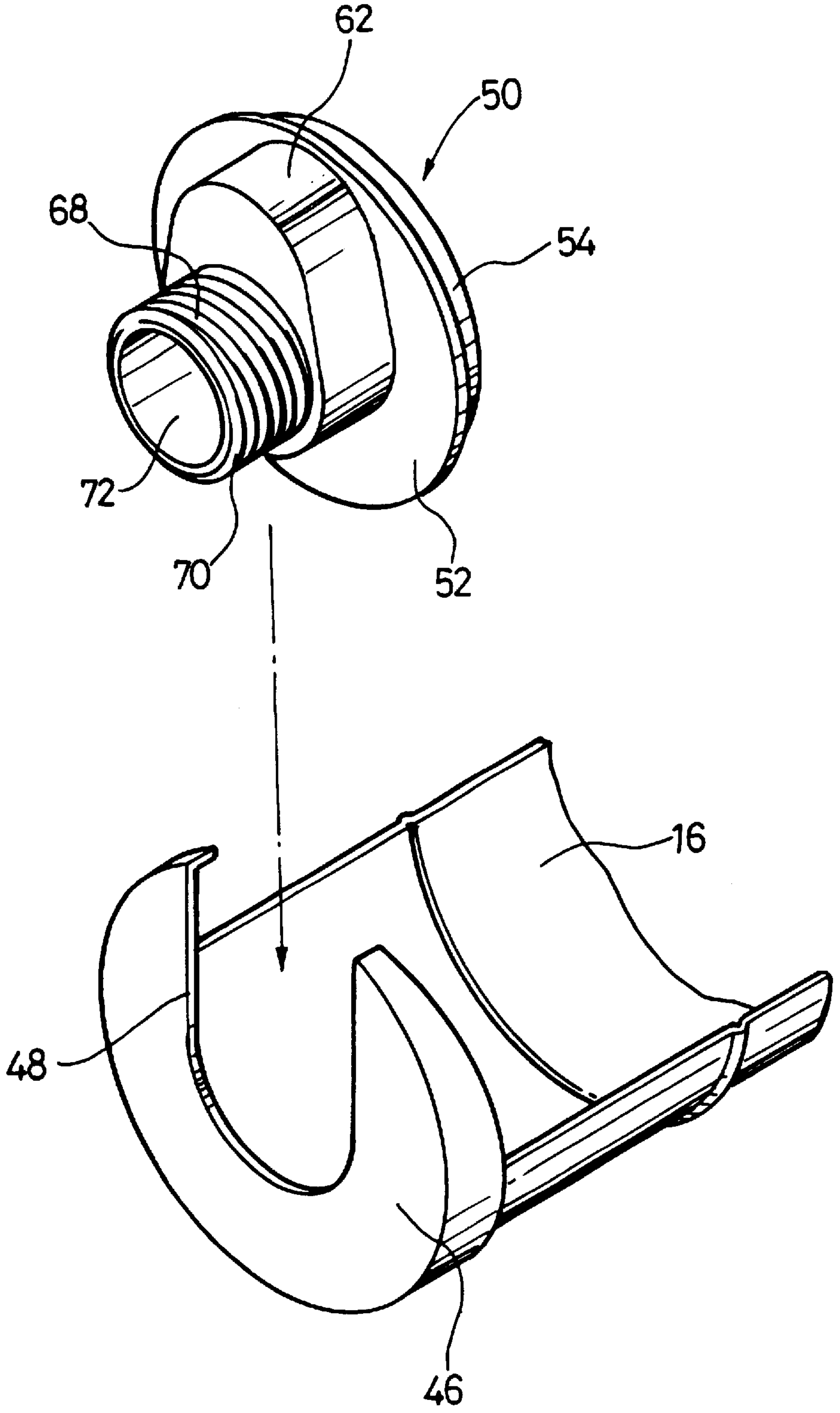
FIG. 49 is a perspective explanatory view showing a state in which the insertion and attachment operation of the nozzle body and the head adapter shown in FIG. 48 to the stationary holding plate is initiated.

For example, it is possible to adopt the head adapter as shown in FIGS. 47 to 49. The reference numerals used in FIGS. 47 to 49 are the same as those used in FIGS. 31 to 41. As far as there is no inconvenience with the contact condition between the base plate 52 and the cylindrical member 11, the provision of the annular flange 54 may be omitted.

Figure 50:
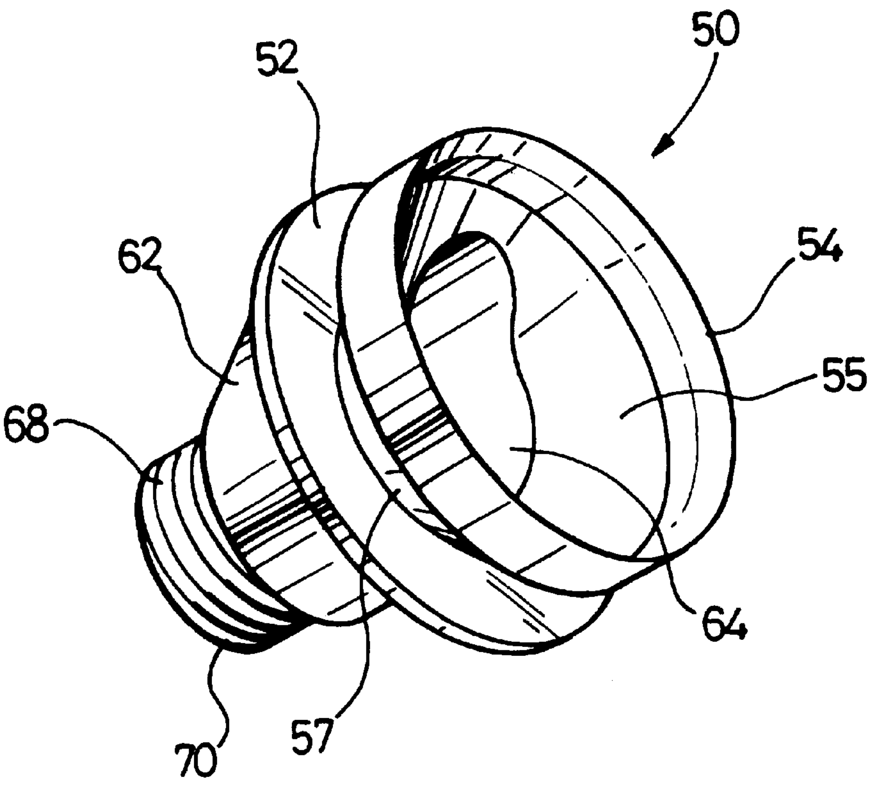
FIG. 50 is a perspective explanatory view showing a state in which the nozzle body and the head adapter shown in FIG. 48 are being inserted and attached to the stationary holding plate.
Figure 51:
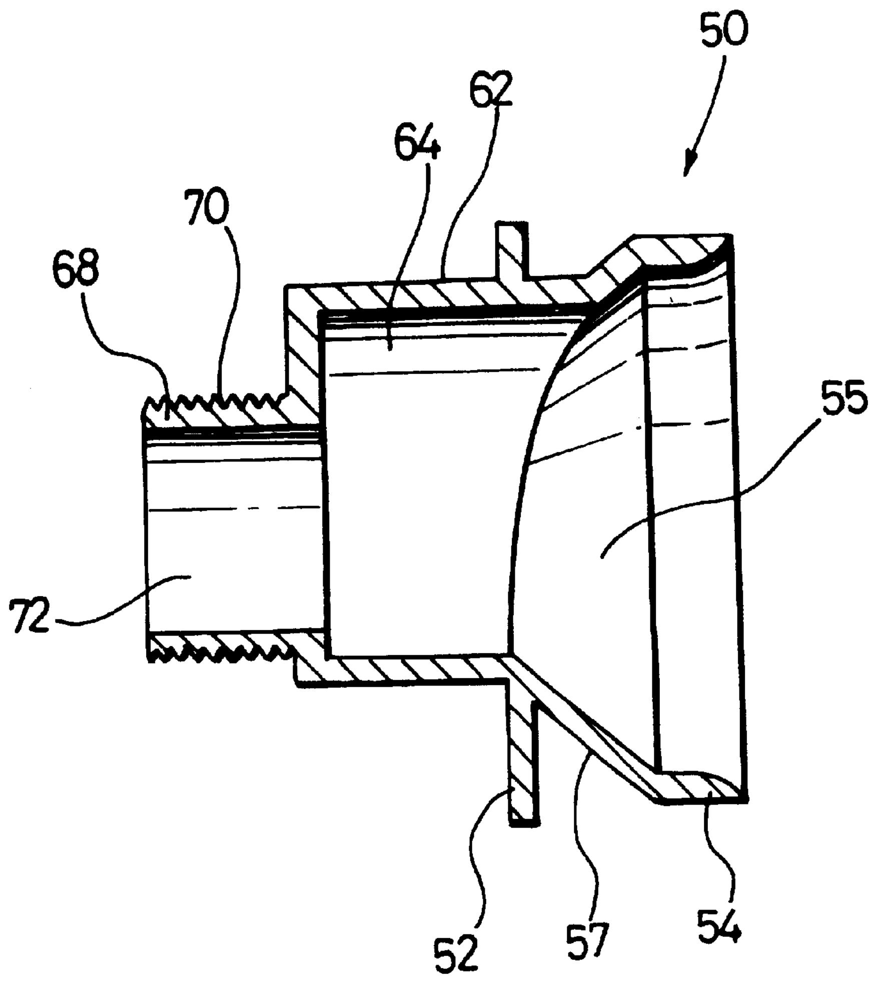
FIG. 51 is a perspective explanatory view showing a state in which the nozzle body and the head adapter shown in FIG. 48 are completely inserted and attached to the stationary holding plate.
Figure 52:
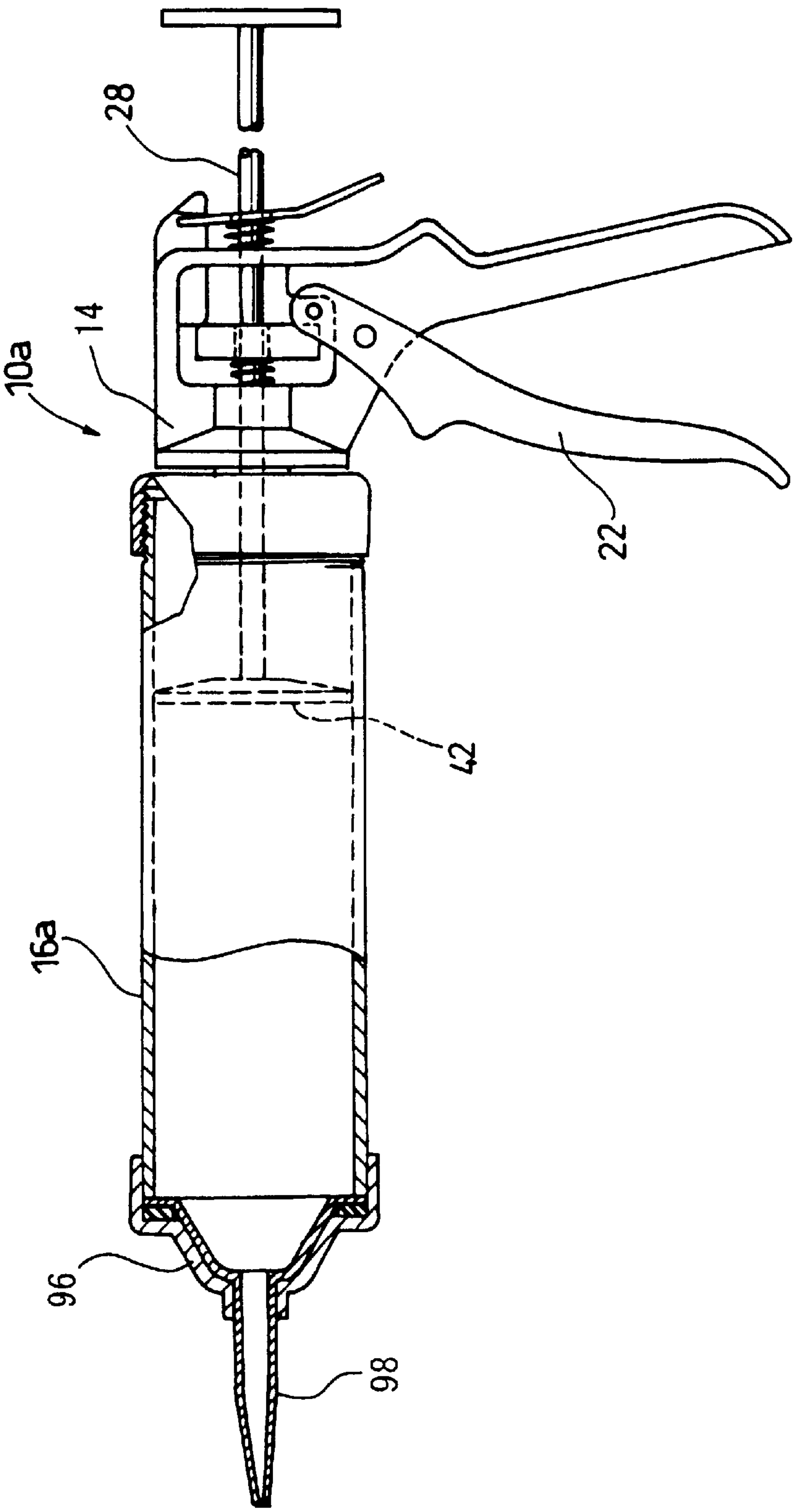
FIG. 52 PRIOR ART
FIG. 52 is a sectional explanatory view showing a state in which contents are extruded with a conventional extruding gun for a tubular bag.

As shown in FIGS. 50 to 51, if a wall surface connecting the annular flange portion 54 to the stepped portion space 64 is formed as a slope surface, and if a dome-like receiving slope surface 55 is formed to facilitate the receiving of the leading end circular portion of the tubular bag F, the leading end of the tubular bag F is smoothly received by the receiving slope surface 55, thereby making it smoother to carry out the extruding operations of the tubular bag F. In addition, although the annular flange portion 54 and the base plate 52 may be connected together through a planar outer circumferential surface as shown in FIG. 47, in order to avoid a disadvantage in which the receiving slope surface 55 portion becomes thick requiring the excess material accordingly, as shown in FIGS. 50 and 51 an annular carved portion 57 is formed at the outer circumferential side of the receiving slope surface 55, so that the thickness of the receiving slope surface 55 portion is reduced to save the material cost.

Industrial Applicability

As described above, according to the present invention, it is possible to extrude and discharge the sealing material or the like from the tubular bag using the extruding gun for the cartridge. Therefore, since the extruding gun for the cartridge can be commonly used as the extruding gun for the tubular bag, it is unnecessary to additionally purchase a conventional extruding gun for a tubular bag of a peculiar arrangement. Further, by making it possible to continuously use the cylindrical member made up of the cylinder body and the piston body, such an effect is realized that only the used up tubular bag is simply discarded similarly to the conventional extruding gun for the tubular bag.

Further, according to the present invention, if the arrangement in which the nozzle body is removably attached to the inner surface side of the head adapter is adopted, only the nozzle body is stained but there is no stain adhered on to the inner surface of the head adapter even after the contents of the tubular bag are extruded. Only the stained nozzle is discarded after the extruding operations of predetermined times, and the head adapter having no stain can be repeatedly used many times. Therefore, it is possible to reduce the waste material amount that is a factor of generating the poisonous gas such as dioxin when incinerating the waste material, to thereby very advantageously serve as one of the solutions for the environmental problems.

Additionally, according to the present invention, it is possible to attain such an effect that by adopting an arrangement in which the inner surface of a head adapter is turned obliquely upward, the insertion and attachment of the cylindrical member to the head adapter inner surface as well as the setting of the cylindrical member to the holding base can be made remarkably easy, and since the length of the holding base can be set close to the length of the cylindrical member, the material cost can be saved and the entire length of the extruding gun can be shortened, which contributes to facilitating the handling thereof, and further the biting of the tubular bag can be effectively prevented to make it possible to efficiently use the tubular bag, and moreover the narrowing and the clogging of the flow path of the through discharge passage by the caulking portion of the tubular bag is prevented to avoid the liquid leakage of the contents as well as the squashed and used up tubular bag can be easily taken out and discarded.

What is claimed is:

1. An extruding mechanism for a tubular bag, used for discharging contents filled in the tubular bag, comprising:

(a) an extruding gun having a holding base, a stationary holding plate disposed on a front end portion of the holding base and provided at a central portion with a notched portion opened upward, and an extruding rod equipped at a leading end with a pressing plate and arranged movably back and forth on the holding base;

(b) a cylindrical member having a cylinder body set on the holding base and accommodating the tubular bag therein and opened at both ends, and a piston body slidably inserted into the cylinder body, both end surfaces thereof serving as pressing surfaces;

(c) a head adapter including a base plate having an outer surface side thereof being located on an inner surface side of the stationary holding plate, an inner surface side thereof with which opening end portions of the cylinder body are brought into contact, and having an opening portion at a central portion;

(d) a nozzle body having a discharge hole at a leading end, and a through discharge passage formed therein for contents, the nozzle body being attached to the opening portion of the head adapter so as to communicate the through discharge passage with the cylinder body.

2. An extruding mechanism for a tubular bag according to claim 1, wherein the nozzle body is removably attached to the head adapter.

3. An extruding mechanism for a tubular bag according to claim 1 or 2, wherein the head adapter is rotatable up and down and is attached to both end edge portions of the notched portion of the stationary holding plate, and an inner surface of the base plate can be turned obliquely upward.

4. An extruding mechanism for a tubular bag according to claim 1 or 2, wherein a proximal outer surface portion of the nozzle body corresponds in configuration to an inner surface of the head adapter, and the nozzle body is attached to the head adapter such that the nozzle body is inserted into the opening portion of the head adapter from an inner side of the head adapter to fit the inner surface side of the head adapter with the proximal outer surface portion of the nozzle body.

5. An extruding mechanism for a tubular bag according to claim 1 or 2, wherein the head adapter includes a stepped portion formed on the outer surface side of the base plate such that the stepped portion is outward protruded to be insertable into the notched portion of the stationary holding member from the central portion of the base plate, and a stepped portion space formed inside the stepped portion integrally with the opening portion, an outer opening portion being formed at the leading end portion of the stepped portion.

6. An extruding mechanism for a tubular bag according to claim 1 or 2, wherein the head adapter further has a nozzle body mounting portion formed protrusively on the outer surface side of the base plate, and provided with a through hole apertured therein and communicated with the opening portion, the nozzle body being attached to the head adapter through the nozzle body mounting portion.

7. An extruding mechanism for a tubular bag according to claim 1 or 2, wherein the head adapter includes a stepped portion formed on the outer surface side of the base plate such that the stepped portion is outward protruded to be insertable into the notched portion of the stationary holding member from the central portion of the base plate, and a stepped portion space formed inside the stepped portion integrally with the opening portion, the nozzle body mounting portion being protrusively provided on the leading end portion of the stepped portion, communicating the stepped portion space with the through hole, and the stepped portion space being made larger than the through hole.

8. An extruding mechanism for a tubular bag according to claim 1 or 2, wherein the head adapter has an engagement member rotatably provided on the upper end portion of the base plate and engageable with both end edge portions of the notched portion of the stationary holding plate, and the inner surface of the base plate can be turned obliquely upward when the head adapter is attached to the stationary holding plate in a manner that the engagement member is engaged with both the end edge portions of the notched portion of the stationary holding plate.

9. An extruding mechanism for a tubular bag according to claim 1 or 2, wherein the head adapter has a bent spring piece attached to the upper end portion of the base plate and bent outward, and an engagement member provided on the leading end of the bent spring piece and engageable with both end edge portions of the notched portion of the stationary holding plate, and the inner surface of the base plate is constantly urged to be turned obliquely upward by a spring action of the bent spring piece when the head adapter is attached to the stationary holding plate in a manner that the engagement member is engaged with both the end edge portions of the notched portion of the stationary holding plate.

10. An extruding mechanism for a tubular bag according to claim 1 or 2, wherein the head adapter has an annular flange portion formed at the inner surface side of the base plate and insertable into and attachable to the opening end portion of the cylinder body.

11. An extruding mechanism for a tubular bag according to claim 10, wherein a wall surface connecting the annular flange portion to the stepped portion space is formed as a slope surface, and a dome-shaped receiving slope surface for receiving the leading end portion of the tubular bag is formed.

12. An extruding mechanism for a tubular bag according to claim 1 or 2, wherein a large number of protruding ribs are formed longitudinally on the inner circumferential surface of the cylinder body, and a large number of recessed grooves are formed in a sliding direction on the outer circumferential surface of the piston body correspondingly to the protruding ribs.

13. An extruding mechanism for a tubular bag according to claim 12, wherein protruding stoppers are protrusively provided in the vicinities of both the end portions of the inner circumferential surface of the cylinder body so that the piston body cannot be removed easily from the cylinder body when the piston body is inserted into and slidably attached to the inner circumferential surface of the cylinder body.

14. An extruding mechanism for a tubular bag according to claim 1 or 2, wherein both the end portions of the inner circumferential surface of the cylinder body are made smooth so that the piston body is easily inserted into and attached to the inner circumferential surface of the cylinder body.

15. An extruding mechanism for a tubular bag according to claim 1 or 2, wherein the piston body includes a circular plate having a hole apertured at its central portion and an annular rim provided on the outer circumferential surface of the circular plate.

16. An extruding mechanism for a tubular bag according to claim 1 or 2, wherein the nozzle body is attached integrally to the head adapter.

17. An extruding mechanism for a tubular bag according to claim 1, wherein the holding base is semi-cylindrical and extends at least the length of the cylindrical member.

18. A method of extruding contents from tubular bags with an extruding mechanism for a tubular bag said method comprising the steps of:

(a) positioning a piston body at a rear end opening portion of a cylinder body of a cylindrical member and (b) accommodating the tubular bag, a leading end portion of which is opened, through a front end opening portion of the cylinder body;

(c) preparing an extruding gun in which a head adapter is positioned on an inner surface side of a stationary holding plate, (d) setting the cylindrical member on a holding base of the extruding gun such that a leading end of the cylindrical member accommodating therein the tubular bag is brought into contact with an inner surface of the base plate;

(e) moving the piston body forward by moving an extruding rod forward to discharge the contents of the tubular bag from a first nozzle body;

(f) squashing the tubular bag and discharging all the contents of the tubular bag as the piston body reaches the front end opening portion of the cylinder body;

(g) discarding the used tubular bag that is pressed against the head adapter;

(h) reversing an empty cylindrical member to replace the front end opening portion with the rear end opening portion such that a beginning state of use is set in a manner such that the piston body is located at the rear end opening portion of the cylinder body;

(i) accommodating a new tubular bag, the leading end portion of which is opened, within the cylinder body through the front end opening portion; and (j) setting the cylindrical member again on the extruding gun, and repeating steps (a) through (i) recited above to extrude the contents of the new tubular bag, wherein the contents of a plurality of tubular bags are consecutively extruded by the same cylindrical member.

19. The method according to claim 18, wherein after performing steps (a) through (j), said method further comprising the steps of:

discarding only the first nozzle body;

attaching a second nozzle body to the head adapter; and repeating steps (a) through (i).

* * * * *